United States Patent
Lin et al.

(10) Patent No.: US 11,215,798 B2
(45) Date of Patent: Jan. 4, 2022

(54) PHOTOGRAPHING OPTICAL LENS SYSTEM, IMAGE CAPTURING UNIT AND ELECTRONIC DEVICE

(71) Applicant: LARGAN PRECISION CO., LTD., Taichung (TW)

(72) Inventors: Cheng-Chen Lin, Taichung (TW); Yu Jui Lin, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 183 days.

(21) Appl. No.: 16/673,685

(22) Filed: Nov. 4, 2019

(65) Prior Publication Data
US 2021/0072508 A1 Mar. 11, 2021

(30) Foreign Application Priority Data

Sep. 6, 2019 (TW) ................... 108132276

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC ... G02B 3/04; G02B 9/62; G02B 9/64; G02B 13/18; G02B 13/0045; G02B 27/646; G02B 27/0012; G02B 15/173
USPC .................. 359/713, 756, 757, 759
See application file for complete search history.

(56) References Cited

U.S. PATENT DOCUMENTS

| 5,440,429 A | 8/1995 | Kim |
| 8,879,166 B2 * | 11/2014 | Tsai .................. G02B 13/0045 359/713 |
| 9,013,807 B1 | 4/2015 | Tsai et al. |
| 9,488,808 B1 | 11/2016 | Chen et al. |
| 9,857,563 B2 | 1/2018 | Liao et al. |
| 9,977,224 B2 | 5/2018 | Tang et al. |
| 10,073,251 B2 | 9/2018 | Lin et al. |
| 10,095,007 B1 | 10/2018 | Jhang et al. |

(Continued)

FOREIGN PATENT DOCUMENTS

| CN | 107092082 A | 8/2017 |
| CN | 107367824 A | 11/2017 |

(Continued)

OTHER PUBLICATIONS

IN Office Action in Application No. 201934048456 dated Jun. 23, 2021.

*Primary Examiner* — Travis S Fissel
(74) *Attorney, Agent, or Firm* — Maschoff Brennan

(57) ABSTRACT

A photographing optical lens system includes six lens elements which are, in order from an object side to an image side: a first lens element, a second lens element, a third lens element, a fourth lens element, a fifth lens element and a sixth lens element. Each of the six lens elements has an object-side surface facing toward the object side and an image-side surface facing toward the image side. The first lens element has positive refractive power. The second lens element has negative refractive power. The sixth lens element has negative refractive power. At least one lens surface of at least one lens element of the photographing optical lens system has at least one critical point in an off-axis region thereof.

22 Claims, 26 Drawing Sheets

(56) References Cited

U.S. PATENT DOCUMENTS

| | | | |
|---|---|---|---|
| 10,175,456 B2 | 1/2019 | Wu et al. | |
| 2015/0036230 A1 | 2/2015 | Bone et al. | |
| 2016/0103300 A1 | 4/2016 | Fang et al. | |
| 2017/0351064 A1 | 12/2017 | Chang et al. | |
| 2018/0059377 A1 | 3/2018 | Fukaya et al. | |
| 2018/0067283 A1 | 3/2018 | Jhang et al. | |
| 2018/0120538 A1 | 5/2018 | Gong et al. | |
| 2018/0172956 A1 | 6/2018 | Son | |
| 2018/0321468 A1 | 11/2018 | Shih et al. | |
| 2019/0033556 A1 | 1/2019 | Tang et al. | |
| 2019/0113715 A1 | 4/2019 | Li et al. | |
| 2019/0121061 A1 | 4/2019 | Jung et al. | |
| 2019/0137735 A1 | 5/2019 | Jung et al. | |
| 2019/0250378 A1* | 8/2019 | Son ................... | G02B 13/0045 |
| 2019/0302414 A1 | 10/2019 | Jhang et al. | |
| 2019/0302419 A1 | 10/2019 | Jhang et al. | |
| 2020/0233181 A1 | 7/2020 | Fukaya | |
| 2020/0333560 A1 | 10/2020 | Wenren et al. | |

FOREIGN PATENT DOCUMENTS

| | | |
|---|---|---|
| CN | 108469668 A | 8/2018 |
| CN | 108802970 A | 11/2018 |
| CN | 208297813 U | 12/2018 |
| CN | 109283664 A | 1/2019 |
| CN | 109343204 A | 2/2019 |
| CN | 109459841 A | 3/2019 |
| CN | 109459842 A | 3/2019 |
| CN | 109613681 A | 4/2019 |
| CN | 109613683 A | 4/2019 |
| CN | 208795916 U | 4/2019 |
| CN | 109839728 A | 6/2019 |
| CN | 109856764 A | 6/2019 |
| CN | 109856780 A | 6/2019 |
| CN | 110045485 A | 7/2019 |
| CN | 110262011 A | 9/2019 |
| CN | 110333590 A | 10/2019 |
| CN | 110426819 A | 11/2019 |
| CN | 110471171 A | 11/2019 |
| CN | 209690602 U | 11/2019 |
| CN | 209746251 U | 12/2019 |
| CN | 209746255 U | 12/2019 |
| JP | 2014115431 A | 6/2014 |
| JP | 2015052674 A | 3/2015 |
| KR | 970010211 B1 | 6/1997 |
| KR | 100835108 B1 | 6/2008 |
| TW | 201839442 A | 11/2018 |
| TW | 201839443 A | 11/2018 |
| TW | 201843487 A | 12/2018 |
| TW | 201910848 A | 3/2019 |
| WO | 2019114366 A1 | 6/2019 |

* cited by examiner

PHOTOGRAPHING OPTICAL LENS SYSTEM, IMAGE CAPTURING UNIT AND ELECTRONIC DEVICE

RELATED APPLICATIONS

This application claims priority to Taiwan Application 108132276, filed on Sep. 6, 2019, which is incorporated by reference herein in its entirety.

BACKGROUND

Technical Field

The present disclosure relates to a photographing optical lens system, an image capturing unit and an electronic device, more particularly to a photographing optical lens system and an image capturing unit applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, a photographing optical lens system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The image-side surface of the fifth lens element is concave in a paraxial region thereof. The sixth lens element has negative refractive power. At least one lens surface of at least one lens element of the photographing optical lens system has at least one critical point in an off-axis region thereof.

When an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fifth lens element is CT5, a central thickness of the sixth lens element is CT6, an axial distance between the second lens element and the third lens element is T23, an axial distance between the fifth lens element and the sixth lens element is T56, and half of a maximum field of view of the photographing optical lens system is HFOV, the following conditions are satisfied:

$30.0 < V2+V3+V4 < 90.0$;

$1.00 < CT1/(CT2+T23+CT3)$;

$30.0 \text{ [deg.]} < HFOV$; and $(CT5+CT6)/T56 < 10.0$.

According to another aspect of the present disclosure, a photographing optical lens system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power, and the image-side surface of the first lens element is convex in a paraxial region thereof. The second lens element has negative refractive power. The sixth lens element has negative refractive power. At least one lens surface of at least one lens element of the photographing optical lens system has at least one critical point in an off-axis region thereof.

When an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, and half of a maximum field of view of the photographing optical lens system is HFOV, the following conditions are satisfied:

$30.0 < V2+V3+V4 < 90.0$;

$1.00 < CT1/(CT2+T23+CT3)$;

$30.0 \text{ [deg.]} < HFOV$; and $CT5/CT4 < 1.80$.

According to another aspect of the present disclosure, a photographing optical lens system includes six lens elements. The six lens elements are, in order from an object side to an image side, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has negative refractive power. The sixth lens element has negative refractive power. At least one lens surface of at least one lens element of the photographing optical lens system has at least one critical point in an off-axis region thereof.

When an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, and half of a maximum field of view of the photographing optical lens system is HFOV, the following conditions are satisfied:

$30.0 < V2+V3+V4 < 90.0$;

$1.00 < CT1/(CT2+T23+CT3)$;

$35.0 \text{ [deg.]} < HFOV$; and $CT5/CT4 < 1.35$.

According to another aspect of the present disclosure, an image capturing unit includes one of the aforementioned photographing optical lens systems and an image sensor, wherein the image sensor is disposed on an image surface of the photographing optical lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
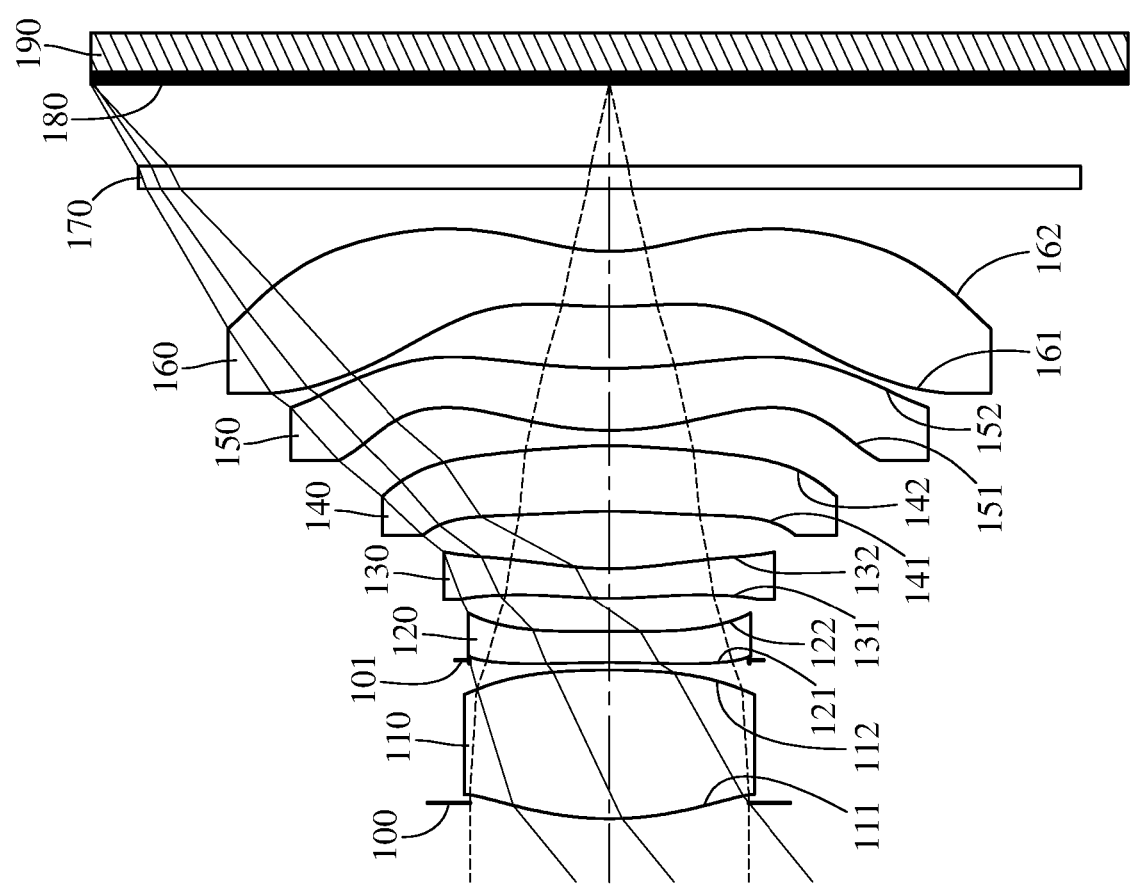
FIG. 1 is a schematic view of an image capturing unit according to the 1st embodiment of the present disclosure.

A photographing optical lens system includes six lens elements. The six lens elements are, in order from an object side to an image side, a first lens element, a second lens element, a third lens element, a fourth lens element, a fifth lens element and a sixth lens element. Each of the six lens elements of the photographing optical lens system has an object-side surface facing toward the object side and an image-side surface facing toward the image side.

The first lens element has positive refractive power. Therefore, it is favorable for reducing the total track length. The image-side surface of the first lens element can be convex in a paraxial region thereof. Therefore, it is favorable for adjusting the shape of the first lens element so as to adjust the refractive power of the first lens element and reduce the outer diameter of the first lens element. The object-side surface of the first lens element can be convex in a paraxial region thereof. Therefore, it is favorable for adjusting incident angles of light from various regions within the field of view on the first lens element so as to obtain a wide angle configuration.

The second lens element has negative refractive power. Therefore, it is favorable for balancing aberrations such as spherical aberration generated due to the miniaturization of the photographing optical lens system.

The object-side surface of the third lens element can be convex in a paraxial region thereof. Therefore, it is favorable for adjusting the travelling direction of light so as to reduce the object-side outer diameter of the photographing optical lens system. The image-side surface of the third lens element can be concave in a paraxial region thereof. Therefore, it is favorable for adjusting the surface shape of the third lens element so as to correct aberrations such as astigmatism.

The object-side surface of the fourth lens element can be concave in a paraxial region thereof. Therefore, it is favorable for adjusting the size distribution of the object side and image side of the photographing optical lens system. The image-side surface of the fourth lens element can be convex in a paraxial region thereof. Therefore, it is favorable for adjusting the refraction direction of light from the fourth lens element so as to increase illuminance.

The image-side surface of the fifth lens element can be concave in a paraxial region thereof. Therefore, it is favorable for the surface shape of the fifth lens element to be in collaboration with that of the sixth lens element so as to correct off-axis aberrations. The object-side surface of the fifth lens element can be convex in a paraxial region thereof. Therefore, it is favorable for the surface shape of the fifth lens element to be in collaboration with that of the fourth lens element so as to correct off-axis aberrations.

The sixth lens element has negative refractive power. Therefore, it is favorable for balancing the refractive power distribution of the photographing optical lens system so as to correct aberrations. The image-side surface of the sixth lens element can be concave in a paraxial region thereof. Therefore, it is favorable for adjusting the back focal length.

Figure 25:
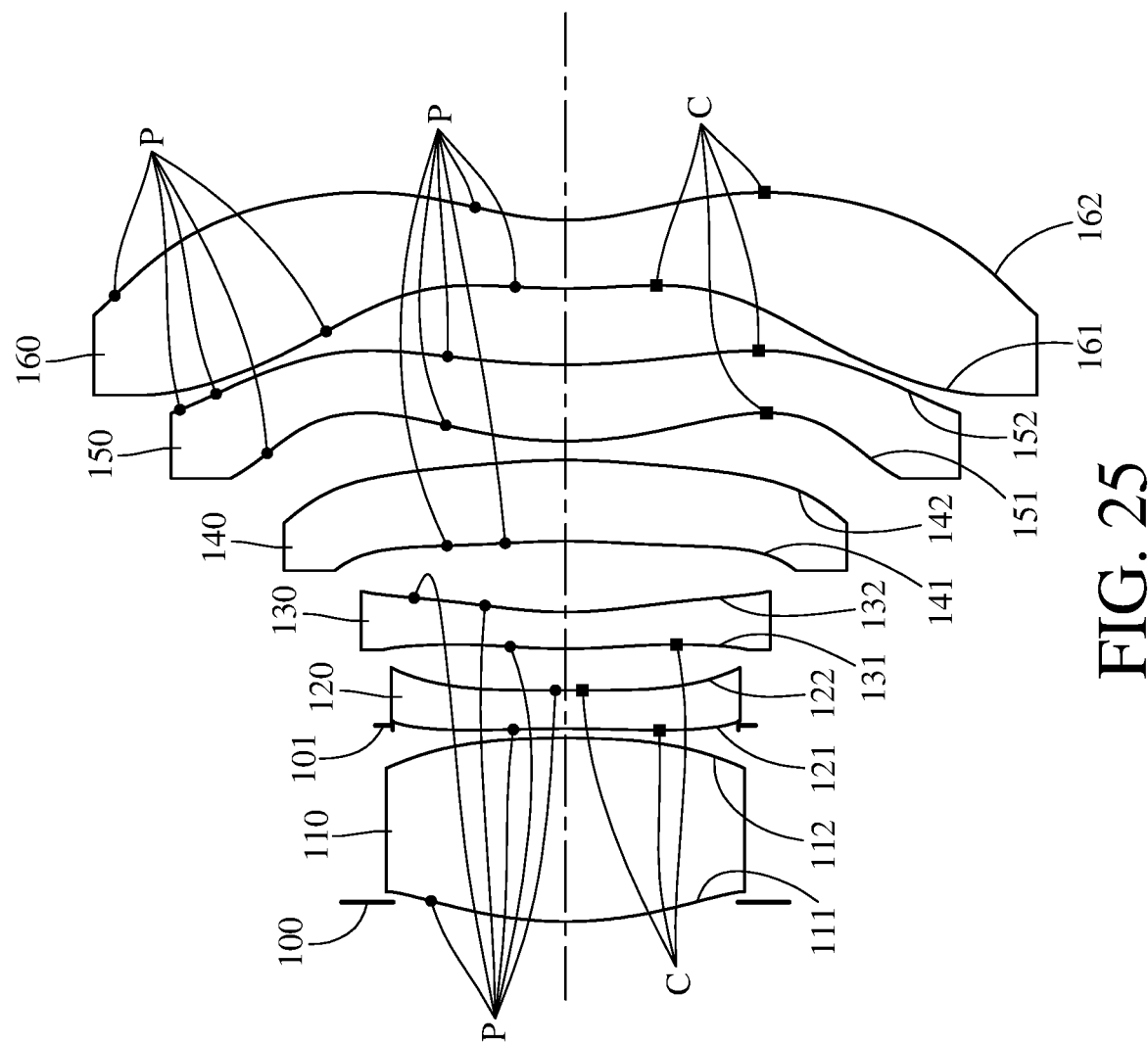
FIG. 25 shows a schematic view of inflection points and critical points of the lens elements according to the 1st embodiment of the present disclosure.
Figure 26:
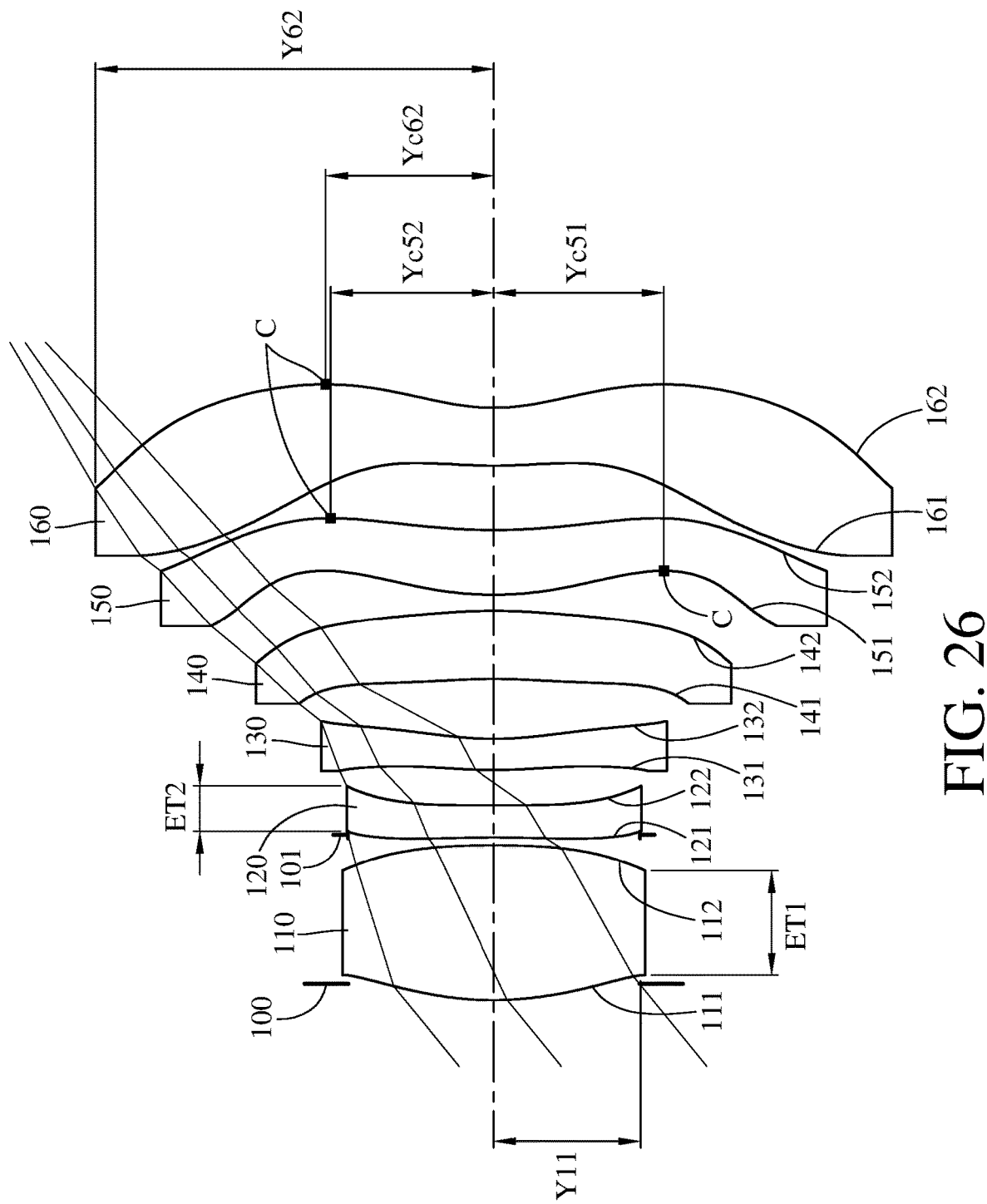
FIG. 26 shows a schematic view of Y11, Y62, Yc51, Yc52, Yc62, ET1 and ET2 according to the 1st embodiment of the present disclosure.

According to the present disclosure, at least one of the object-side surface and the image-side surface of at least one lens element of the photographing optical lens system has at least one critical point in an off-axis region thereof. Therefore, it is favorable for increasing the shape variation of the lens element(s) so as to miniaturize the photographing optical lens system and improve peripheral image quality. Moreover, at least one of the object-side surface and the image-side surface of each of at least two lens elements of the photographing optical lens system can have at least one critical point in an off-axis region thereof. Moreover, the object-side surface of the fifth lens element can have at least one critical point in an off-axis region thereof. Therefore, it is favorable for adjusting the incident angle of light on the fifth lens element so as to reduce stray light. Moreover, the image-side surface of the fifth lens element can have at least one critical point in an off-axis region thereof. Therefore, it is favorable for adjusting the surface shape of the fifth lens element so as to correct off-axis aberrations and enlarging the image surface. Moreover, when a vertical distance between the critical point on the object-side surface of the fifth lens element and an optical axis is Yc51, and a vertical distance between the critical point on the image-side surface of the fifth lens element and the optical axis is Yc52, the at least one critical point in the off-axis region of the object-side surface and the at least one critical point in the off-axis region of the image-side surface of the fifth lens element can satisfy the following condition: 0.70<Yc51/Yc52<1.4. Therefore, it is favorable for further adjusting the surface shape of the fifth lens element so as to improve peripheral image quality. Moreover, the image-side surface of the sixth lens element can have at least one critical point in an off-axis region thereof. Therefore, it is favorable for adjusting the incident angle of light on the image surface so as to improve the response efficiency of the image sensor and increase peripheral illuminance of the image surface. Moreover, when a vertical distance between the critical point on the image-side surface of the sixth lens element and the optical axis is Yc62, and a maximum effective radius of the image-side surface of the sixth lens element is Y62, the at least one critical point in the off-axis region of the image-side surface of the sixth lens element can satisfy the following condition: 0.15<Yc62/Y62<0.65. Therefore, it is favorable for further improving peripheral image quality, improving the response efficiency of the image sensor and increasing peripheral illuminance of the image surface. Please refer to FIG. 25 and FIG. 26. FIG. 25 shows a schematic view of critical points C of the second lens element 120, the third lens element 130, the fifth lens element 150 and the sixth lens element 160 according to the 1st embodiment of the present disclosure, and FIG. 26 shows a schematic view of Yc51, Yc52, Y62 and Yc62 according to the 1st embodiment of the present disclosure.

According to the present disclosure, at least one of the object-side surface and the image-side surface of at least one lens element of the photographing optical lens system can have at least one inflection point. Therefore, it is favorable for increasing the shape variation of the lens element(s) so as to miniaturize the photographing optical lens system and improve image quality. Moreover, at least one of the object-side surface and the image-side surface of each of at least two lens elements of the photographing optical lens system can have at least one inflection point. Moreover, at least one of the object-side surface and the image-side surface of each of at least three lens elements of the photographing optical lens system can have at least one inflection point. Moreover, at least one of the object-side surface and the image-side surface of each of at least four lens elements of the photographing optical lens system can have at least one inflection point. Moreover, both of the object-side surface and the image-side surface of each lens element of the photographing optical lens system can have at least one inflection point. Therefore, it is favorable for adjusting the surface shape of a single lens element so as to further improve image quality. Please refer to FIG. 25, which shows a schematic view of inflection points P of the first lens element 110, the second lens element 120, the third lens element 130, the fourth lens element 140, the fifth lens element 150 and the sixth lens element 160 according to the 1st embodiment of the present disclosure.

When an Abbe number of the second lens element is V2, an Abbe number of the third lens element is V3, and an Abbe number of the fourth lens element is V4, the following condition is satisfied: 30.0<V2+V3+V4<90.0. Therefore, it is favorable for the materials of the lens elements to collaborate with one another for correcting chromatic aberration and for reducing color cast. Moreover, the following condition can also be satisfied: 40.0<V2+V3+V4<85.0.

When a central thickness of the first lens element is CT1, a central thickness of the second lens element is CT2, a central thickness of the third lens element is CT3, and an axial distance between the second lens element and the third lens element is T23, the following condition is satisfied: 1.00<CT1/(CT2+T23+CT3). Therefore, it is favorable for adjusting the size distribution of the object side of the photographing optical lens system so as to reduce the object-side outer diameter of the photographing optical lens system. Moreover, the following condition can also be satisfied: 1.10<CT1/(CT2+T23+CT3). Moreover, the following condition can also be satisfied: CT1/(CT2+T23+CT3)<2.40. Therefore, it is favorable for adjusting the size distribution of the object side of the photographing optical lens system so as to reduce the total track length. Moreover, the following condition can also be satisfied: CT1/(CT2+T23+CT3)<2.00. Moreover, the following condition can also be satisfied: 1.10<CT1/(CT2+T23+CT3)<2.40. Moreover, the following condition can also be satisfied: 1.10<CT1/(CT2+T23+CT3)<2.00.

When half of a maximum field of view of the photographing optical lens system is HFOV, the following condition is satisfied: 30.0 [deg.]<HFOV. Therefore, it is favorable for the photographing optical lens system to have a wide angle configuration. Moreover, the following condition can also be satisfied: 35.0 [deg.]<HFOV. Moreover, the following condition can also be satisfied: HFOV<80.0 [deg.]. Therefore, it is favorable for preventing aberrations such as distortion caused by an overly large field of view. Moreover, the following condition can also be satisfied: HFOV<60.0 [deg.]. Moreover, the following condition can also be satisfied: HFOV<45.0 [deg.]. Moreover, the following condition can also be satisfied: 35.0 [deg.]<HFOV<45.0 [deg.].

When a central thickness of the fifth lens element is CT5, a central thickness of the sixth lens element is CT6, and an axial distance between the fifth lens element and the sixth lens element is T56, the following condition can be satisfied: (CT5+CT6)/T56<10.0. Therefore, it is favorable for the fifth and sixth lens elements to collaborate with each other to correct aberrations and reduce the total track length. Moreover, the following condition can also be satisfied: 0.60<(CT5+CT6)/T56<6.0. Moreover, the following condition can also be satisfied: 0.75<(CT5+CT6)/T56<3.0.

When a central thickness of the fourth lens element is CT4, and the central thickness of the fifth lens element is CT5, the following condition can be satisfied: CT5/CT4<1.80. Therefore, it is favorable for the fourth and fifth lens elements to collaborate with each other to correct aberrations. Moreover, the following condition can also be satisfied: CT5/CT4<1.55. Moreover, the following condition can also be satisfied: CT5/CT4<1.35. Moreover, the following condition can also be satisfied: CT5/CT4<1.25. Moreover, the following condition can also be satisfied: 0.30<CT5/CT4. Therefore, it is favorable for the fourth and fifth lens elements to collaborate with each other to reduce the size of the photographing optical lens system. Moreover, the following condition can also be satisfied: 0.60<CT5/CT4. Moreover, the following condition can also be satisfied: 0.75<CT5/CT4. Moreover, the following condition can also be satisfied: 0.60<CT5/CT4<1.55. Moreover, the following condition can also be satisfied: 0.75<CT5/CT4<1.25.

When an Abbe number of the first lens element is V1, the Abbe number of the second lens element is V2, the Abbe number of the third lens element is V3, the Abbe number of the fourth lens element is V4, an Abbe number of the fifth lens element is V5, an Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the i-th lens element is Ni, and a minimum value of Vi/Ni is (Vi/Ni)min, the following condition can be satisfied: 6.0<(Vi/Ni)min<12.0, wherein i=1, 2, 3, 4, 5 or 6. Therefore, it is favorable for adjusting the material distribution so as to correct aberrations such as chromatic aberration.

When a maximum effective radius of the object-side surface of the first lens element is Y11, and the maximum effective radius of the image-side surface of the sixth lens element is Y62, the following condition can be satisfied: 2.2<Y62/Y11<5.0. Therefore, it is favorable for adjusting the object-side outer diameter and image-side outer diameter of the photographing optical lens system so as to obtain a balance among the size, field of view, aperture size and image surface size of the photographing optical lens system. Moreover, the following condition can also be satisfied: 2.5<Y62/Y11<4.0. Please refer to FIG. 26, which shows a schematic view of Y11 and Y62 according to the 1st embodiment of the present disclosure.

When a focal length of the photographing optical lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, and a focal length of the i-th lens element is fi, the following condition can be satisfied: Σ|f/fi|<5.0, wherein i=1, 2, 3, 4, 5 and 6. Therefore, it is favorable for adjusting the refractive power of the lens elements so as to obtain a balance between the field of view and size of the photographing optical lens system. Moreover, the following condition can also be satisfied: 2.0<Σ|f/fi|<4.5, wherein i=1, 2, 3, 4, 5 and 6.

When an f-number of the photographing optical lens system is Fno, the following condition can be satisfied: 1.40<Fno<2.80. Therefore, it is favorable for obtaining a balance between the depth of field and illuminance on the image surface. Moreover, the following condition can also be satisfied: 1.70<Fno<2.50.

When the central thickness of the first lens element is CT1, and the central thickness of the second lens element is CT2, the following condition can be satisfied: 3.5<CT1/CT2<10. Therefore, it is favorable for the first and second lens elements to collaborate with each other to correct aberrations and reduce the object-side outer diameter of the photographing optical lens system.

When the central thickness of the first lens element is CT1, and a distance in parallel with the optical axis between a maximum effective radius position of the object-side surface of the first lens element and a maximum effective radius position of the image-side surface of the first lens element is ET1, the following condition can be satisfied: 1.10<CT1/ET1<1.80. Therefore, it is favorable for adjusting the surface shape of the first lens element so as to reduce the outer diameter of the first lens element and the total track length of the photographing optical lens system. Please refer to FIG. 26, which shows a schematic view of ET1 according to the 1st embodiment of the present disclosure.

When a curvature radius of the object-side surface of the fifth lens element is R9, and a curvature radius of the image-side surface of the fifth lens element is R10, the following condition can be satisfied: 0.50<R10/R9<2.2. Therefore, it is favorable for adjusting the surface shape of the fifth lens element so as to correct astigmatism and off-axis field curvature.

When an axial distance between the object-side surface of the first lens element and the image-side surface of the sixth lens element is TD, and the central thickness of the first lens element is CT1, the following condition can be satisfied: 2.5<TD/CT1<5.0. Therefore, it is favorable for adjusting the size distribution of the lens elements. Moreover, the following condition can also be satisfied: 3.2<TD/CT1<4.6.

When an entrance pupil diameter of the photographing optical lens system is EPD, and the central thickness of the first lens element is CT1, the following condition can be satisfied: 1.4<EPD/CT1<2.5. Therefore, it is favorable for obtaining a balance among the aperture size, the thickness of the lens element and the outer diameter of the lens element. Moreover, the following condition can also be satisfied: 1.6<EPD/CT1<2.2.

When the maximum effective radius of the object-side surface of the first lens element is Y11, and the distance in parallel with the optical axis between the maximum effective radius position of the object-side surface of the first lens element and the maximum effective radius position of the image-side surface of the first lens element is ET1, the following condition can be satisfied: 0.60<Y11/ET1<3.0. Therefore, it is favorable for adjusting the surface shape of the first lens element so as to adjust the size distribution at the object side of the photographing optical lens system. Moreover, the following condition can also be satisfied: 0.80<Y11/ET1<2.2. Moreover, the following condition can also be satisfied: 1.0<Y11/ET1<1.7.

When the focal length of the photographing optical lens system is f, and a curvature radius of the object-side surface of the first lens element is R1, the following condition can be satisfied: 1.0<f/R1<2.0. Therefore, it is favorable for adjusting the refractive power of the first lens element so as to reduce the size of the photographing optical lens system.

When a minimum value among Abbe numbers of all lens elements of the photographing optical lens system is Vmin, the following condition can be satisfied: 10.0<Vmin<20.0. Therefore, it is favorable for adjusting Abbe number distribution of the photographing optical lens system so as to correct chromatic aberration.

When a maximum value among refractive indices of all lens elements of the photographing optical lens system is Nmax, the following condition can be satisfied: $1.66 < Nmax < 1.75$. Therefore, it is favorable for adjusting refractive index distribution of the photographing optical lens system so as to correct aberrations and reduce the size of the photographing optical lens system.

When the central thickness of the first lens element is CT1, the central thickness of the second lens element is CT2, and the central thickness of the third lens element is CT3, the following condition can be satisfied: $1.5 < CT1/(CT2+CT3) < 5.0$. Therefore, it is favorable for adjusting the size distribution of the object side of the photographing optical lens system so as to reduce the object-side outer diameter of the photographing optical lens system.

When the central thickness of the first lens element is CT1, and the central thickness of the fifth lens element is CT5, the following condition can be satisfied: $1.8 < CT1/CT5 < 3.2$. Therefore, it is favorable for adjusting the size distribution of the object side and image side of the photographing optical lens system.

When the curvature radius of the object-side surface of the first lens element is R1, and a curvature radius of the image-side surface of the first lens element is R2, the following condition can be satisfied: $-0.75 < (R1+R2)/(R1-R2) < 0$. Therefore, it is favorable for adjusting the surface shape of the first lens element so as to reduce the total track length and the object-side outer diameter of the photographing optical lens system. Moreover, the following condition can also be satisfied: $-0.60 < (R1+R2)/(R1-R2) < -0.10$.

When a sum of central thicknesses of all lens elements of the photographing optical lens system is $\Sigma CT$, and a sum of axial distances between each of all adjacent lens elements of the photographing optical lens system is $\Sigma AT$, the following condition can be satisfied: $1.50 < \Sigma CT/\Sigma AT < 3.50$. Therefore, it is favorable for adjusting the distribution of the lens elements so as to reduce the total track length. Moreover, the following condition can also be satisfied: $1.65 < \Sigma CT/\Sigma AT < 2.70$.

When the distance in parallel with the optical axis between the maximum effective radius position of the object-side surface of the first lens element and the maximum effective radius position of the image-side surface of the first lens element is ET1, and a distance in parallel with the optical axis between a maximum effective radius position of the object-side surface of the second lens element and a maximum effective radius position of the image-side surface of the second lens element is ET2, the following condition can be satisfied: $1.2 < ET1/ET2 < 6.0$. Therefore, it is favorable for adjusting the peripheral surface shape of the first and second lens elements so as to correct off-axis aberrations and reduce the object-side outer diameter of the photographing optical lens system. Moreover, the following condition can also be satisfied: $1.6 < ET1/ET2 < 4.0$. Please refer to FIG. 26, which shows a schematic view of ET1 and ET2 according to the 1st embodiment of the present disclosure.

When the maximum effective radius of the object-side surface of the first lens element is Y11, and the central thickness of the first lens element is CT1, the following condition can be satisfied: $0.70 < Y11/CT1 < 1.2$. Therefore, it is favorable for adjusting the surface shape of the first lens element so as to reduce the size of the object side of the photographing optical lens system. Moreover, the following condition can also be satisfied: $0.80 < Y11/CT1 < 1.1$.

According to the present disclosure, the photographing optical lens system further includes an aperture stop, and the aperture stop can be disposed between the second lens element and an imaged object. Therefore, it is favorable for adjusting the position of the aperture stop so as to obtain a balance between the field of view and size of the photographing optical lens system. Moreover, the aperture stop can also be disposed between the first lens element and the imaged object.

When an axial distance between the object-side surface of the first lens element and the image surface is TL, and the focal length of the photographing optical lens system is f, the following condition can be satisfied: $1.05 < TL/f < 1.50$. Therefore, it is favorable for obtaining a balance between the size and field of view of the photographing optical lens system. Moreover, the following condition can also be satisfied: $1.10 < TL/f < 1.30$.

When the axial distance between the object-side surface of the first lens element and the image surface is TL, and a maximum image height of the photographing optical lens system (half of a diagonal length of an effective photosensitive area of the image sensor) is ImgH, the following condition can be satisfied: $1.0 < TL/ImgH < 1.6$. Therefore, it is favorable for obtaining a balance between the reduction of the total track length and the enlargement of the image surface.

When the focal length of the photographing optical lens system is f, the focal length of the third lens element is f3, and the focal length of the fourth lens element is f4, the following condition can be satisfied: $|f/f3|+|f/f4| < 0.70$. Therefore, it is favorable for balancing the refractive power distribution of the object side and image side of the photographing optical lens system. Moreover, the following condition can also be satisfied: $|f/f3|+|f/f4| < 0.60$. Moreover, the following condition can also be satisfied: $|f/f3|+|f/f4| < 0.40$.

According to the present disclosure, the aforementioned features and conditions can be utilized in numerous combinations so as to achieve corresponding effects.

According to the present disclosure, the lens elements of the photographing optical lens system can be made of either glass or plastic material. When the lens elements are made of glass material, the refractive power distribution of the photographing optical lens system may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the photographing optical lens system can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the photographing optical lens system, based on the corresponding image sensor, can be flat or curved, especially a curved surface being concave facing towards the object side of the photographing optical lens system.

According to the present disclosure, an image correction unit, such as a field flattener, can be optionally disposed between the lens element closest to the image side of the photographing optical lens system and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

According to the present disclosure, the photographing optical lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing optical lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing optical lens system and thereby provides a wider field of view for the same.

According to the present disclosure, the photographing optical lens system can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 2:
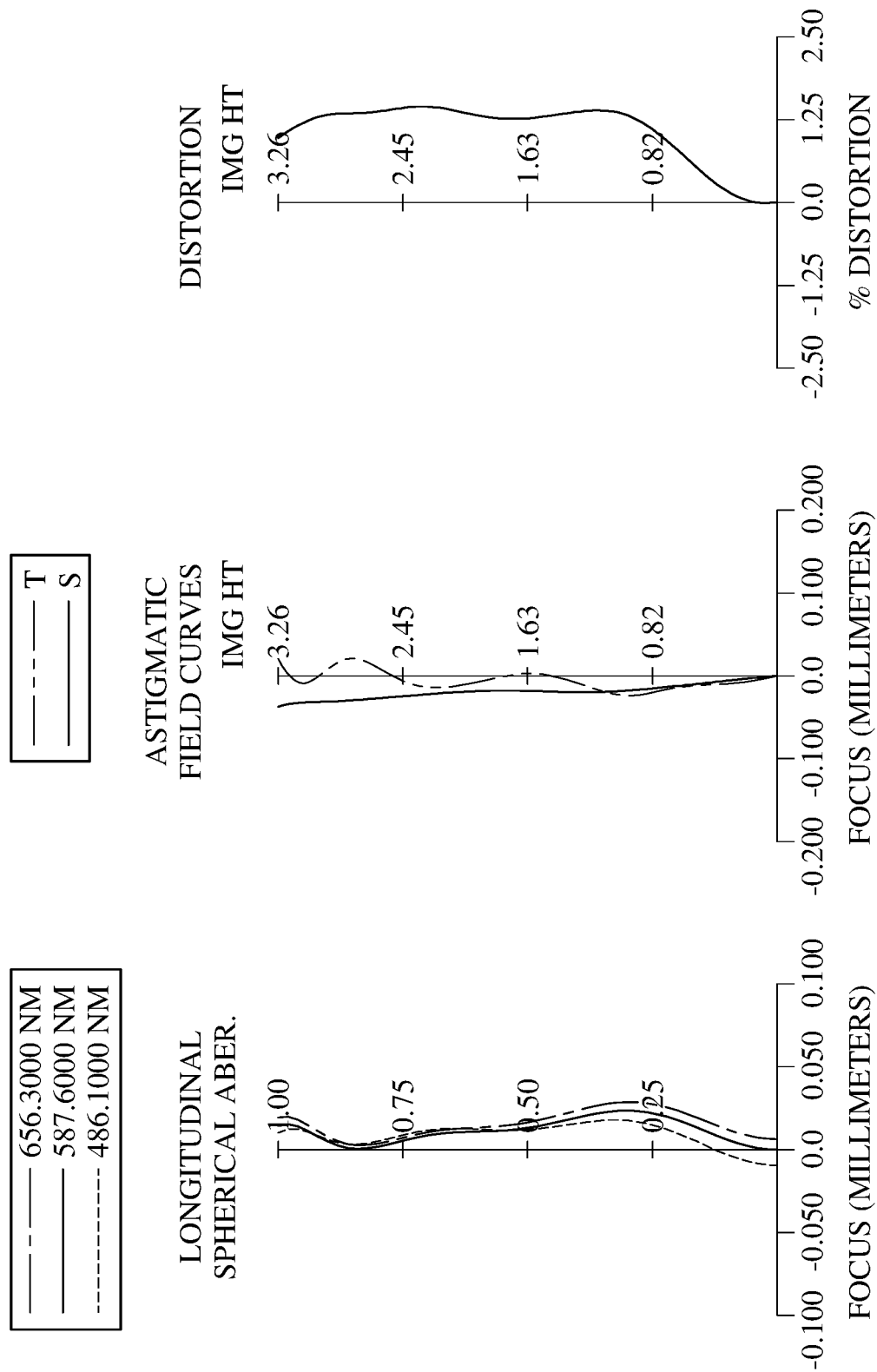
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing optical lens system (its reference numeral is omitted) of the present disclosure and an image sensor 190. The photographing optical lens system includes, in order from an object side to an image side, an aperture stop 100, a first lens element 110, a stop 101, a second lens element 120, a third lens element 130, a fourth lens element 140, a fifth lens element 150, a sixth lens element 160, a filter 170 and an image surface 180. The photographing optical lens system includes six lens elements (110, 120, 130, 140, 150 and 160) with no additional lens element disposed between each of the adjacent six lens elements.

The first lens element 110 with positive refractive power has an object-side surface 111 being convex in a paraxial region thereof and an image-side surface 112 being convex in a paraxial region thereof. The first lens element 110 is made of glass material and has the object-side surface 111 and the image-side surface 112 being both aspheric. The object-side surface 111 of the first lens element 110 has one inflection point.

The second lens element 120 with negative refractive power has an object-side surface 121 being concave in a paraxial region thereof and an image-side surface 122 being convex in a paraxial region thereof. The second lens element 120 is made of plastic material and has the object-side surface 121 and the image-side surface 122 being both aspheric. The object-side surface 121 of the second lens element 120 has one inflection point. The image-side surface 122 of the second lens element 120 has one inflection point. The object-side surface 121 of the second lens element 120 has one critical point in an off-axis region thereof. The image-side surface 122 of the second lens element 120 has one critical point in an off-axis region thereof.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric. The object-side surface 131 of the third lens element 130 has one inflection point. The image-side surface 132 of the third lens element 130 has two inflection points. The object-side surface 131 of the third lens element 130 has one critical point in an off-axis region thereof.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric. The object-side surface 141 of the fourth lens element 140 has two inflection points.

The fifth lens element 150 with positive refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The object-side surface 151 of the fifth lens element 150 has two inflection points. The image-side surface 152 of the fifth lens element 150 has three inflection points. The object-side surface 151 of the fifth lens element 150 has one critical point in an off-axis region thereof. The image-side surface 152 of the fifth lens element 150 has one critical point in an off-axis region thereof.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The object-side surface 161 of the sixth lens element 160 has two inflection points. The image-side surface 162 of the sixth lens element 160 has two inflection points. The object-side surface 161 of the sixth lens element 160 has one critical point in an off-axis region thereof. The image-side surface 162 of the sixth lens element 160 has one critical point in an off-axis region thereof.

The filter 170 is made of glass material and located between the sixth lens element 160 and the image surface 180, and will not affect the focal length of the photographing optical lens system. The image sensor 190 is disposed on or near the image surface 180 of the photographing optical lens system.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing optical lens system of the image capturing unit according to the 1st embodiment, when a focal length of the photographing optical lens system is f, an f-number of the photographing optical lens system is Fno, and half of a maximum field of view of the photographing optical lens system is HFOV, these parameters have the following values: f=3.89 millimeters (mm), Fno=2.24, HFOV=39.2 degrees (deg.).

When a maximum value among refractive indices of all lens elements of the photographing optical lens system is Nmax, the following condition is satisfied: Nmax=1.686. In this embodiment, among the six lens elements (110, 120, 130, 140, 150 and 160) of the photographing optical lens system, a refractive index of the third lens element 130 and a refractive index of the fourth lens element 140 are the same and are both larger than refractive indices of the other lens elements, so Nmax is equal to the refractive index of the third lens element 130 and the refractive index of the fourth lens element 140.

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, an Abbe number of the i-th is Vi, a refractive index of the first lens element 110 is N1, a refractive index of the second lens element 120 is N2, the refractive index of the third lens element 130 is N3, the refractive index of the fourth lens element 140 is N4, a refractive index of the fifth lens element 150 is N5, a refractive index of the sixth lens element 160 is N6, a refractive index of the i-th lens element is Ni, and a minimum value of Vi/Ni is (Vi/Ni)min, the following condition is satisfied: (V/N)min=10.90. In this embodiment, (Vi/Ni)min is equal to V3/N3 and V4/N4.

When the Abbe number of the second lens element 120 is V2, the Abbe number of the third lens element 130 is V3, and the Abbe number of the fourth lens element 140 is V4, the following condition is satisfied: V2+V3+V4=62.7.

When a minimum value among Abbe numbers of all lens elements of the photographing optical lens system is Vmin, the following condition is satisfied: Vmin=18.4. In this embodiment, among the six lens elements (110, 120, 130, 140, 150 and 160) of the photographing optical lens system, the Abbe number of the third lens element 130 and the Abbe number of the fourth lens element 140 are the same and are both smaller than Abbe numbers of the other lens elements, so Vmin is equal to the Abbe number of the third lens element 130 and the Abbe number of the fourth lens element 140.

When a sum of central thicknesses of all lens elements of the photographing optical lens system is ΣCT, and a sum of axial distances between each of all adjacent lens elements of the photographing optical lens system is ΣAT, the following condition is satisfied: ΣCT/ΣAT=2.23. In this embodiment, an axial distance between two adjacent lens elements is an axial distance between two adjacent lens surfaces of the two adjacent lens elements; ΣCT is a sum of central thicknesses of the first lens element 110, the second lens element 120, the third lens element 130, the fourth lens element 140, the fifth lens element 150 and the sixth lens element 160; and ΣAT is a sum of axial distances between the first lens element 110 and the second lens element 120, the second lens element 120 and the third lens element 130, the third lens element 130 and the fourth lens element 140, the fourth lens element 140 and the fifth lens element 150, and the fifth lens element 150 and the sixth lens element 160.

When the central thickness of the first lens element 110 is CT1, and the central thickness of the second lens element 120 is CT2, the following condition is satisfied: CT1/CT2=4.78.

When the central thickness of the first lens element 110 is CT1, and the central thickness of the fifth lens element 150 is CT5, the following condition is satisfied: CT1/CT5=2.40.

When the central thickness of the first lens element 110 is CT1, the central thickness of the second lens element 120 is CT2, and the central thickness of the third lens element 130 is CT3, the following condition is satisfied: CT1/(CT2+CT3)=2.44.

When the central thickness of the first lens element 110 is CT1, the central thickness of the second lens element 120 is CT2, the central thickness of the third lens element 130 is CT3, and the axial distance between the second lens element 120 and the third lens element 130 is T23, the following condition is satisfied: CT1/(CT2+T23+CT3)=1.57.

When the central thickness of the first lens element 110 is CT1, and a distance in parallel with the optical axis between a maximum effective radius position of the object-side surface 111 of the first lens element 110 and a maximum effective radius position of the image-side surface 112 of the first lens element 110 is ET1, the following condition is satisfied: CT1/ET1=1.49.

When the central thickness of the fifth lens element 150 is CT5, the central thickness of the sixth lens element 160 is CT6, and the axial distance between the fifth lens element 150 and the sixth lens element 160 is T56, the following condition is satisfied: (CT5+CT6)/T56=1.90.

When the central thickness of the fourth lens element 140 is CT4, and the central thickness of the fifth lens element 150 is CT5, the following condition is satisfied: CT5/CT4=0.94.

When an axial distance between the object-side surface 111 of the first lens element 110 and the image-side surface 162 of the sixth lens element 160 is TD, and the central thickness of the first lens element 110 is CT1, the following condition is satisfied: TD/CT1=3.82.

When an axial distance between the object-side surface 111 of the first lens element 110 and the image surface 180 is TL, and the focal length of the photographing optical lens system is f, the following condition is satisfied: TL/f=1.20.

When the axial distance between the object-side surface 111 of the first lens element 110 and the image surface 180 is TL, and a maximum image height of the photographing optical lens system is ImgH, the following condition is satisfied: TL/ImgH=1.43.

When a curvature radius of the object-side surface 111 of the first lens element 110 is R1, and a curvature radius of the image-side surface 112 of the first lens element 110 is R2, the following condition is satisfied: (R1+R2)/(R1−R2)=−0.46.

When a curvature radius of the object-side surface 151 of the fifth lens element 150 is R9, and a curvature radius of the image-side surface 152 of the fifth lens element 150 is R10, the following condition is satisfied: R10/R9=1.62.

When the focal length of the photographing optical lens system is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, a focal length of the sixth lens element 160 is f6, and a focal length of the i-th lens element is fi, the following condition is satisfied: Σ|f/fi|=3.59, wherein i=1, 2, 3, 4, 5 and 6.

When the focal length of the photographing optical lens system is f, the focal length of the third lens element 130 is f3, and the focal length of the fourth lens element 140 is f4, the following condition is satisfied: |f/f3|+|f/f4|=0.56.

When the focal length of the photographing optical lens system is f, and the curvature radius of the object-side surface 111 of the first lens element 110 is R1, the following condition is satisfied: f/R1=1.91.

When an entrance pupil diameter of the photographing optical lens system is EPD, and the central thickness of the first lens element 110 is CT1, the following condition is satisfied: EPD/CT1=1.87.

When the distance in parallel with the optical axis between the maximum effective radius position of the object-side surface 111 of the first lens element 110 and the maximum effective radius position of the image-side surface 112 of the first lens element 110 is ET1, and a distance in parallel with the optical axis between a maximum effective radius position of the object-side surface 121 of the second lens element 120 and a maximum effective radius position of the image-side surface 122 of the second lens element 120 is ET2, the following condition is satisfied: ET1/ET2=2.28.

When a maximum effective radius of the object-side surface 111 of the first lens element 110 is Y11, and the central thickness of the first lens element 110 is CT1, the following condition is satisfied: Y11/CT1=0.95.

When the maximum effective radius of the object-side surface 111 of the first lens element 110 is Y11, and the distance in parallel with the optical axis between the maximum effective radius position of the object-side surface 111 of the first lens element 110 and the maximum effective radius position of the image-side surface 112 of the first lens element 110 is ET1, the following condition is satisfied: Y11/ET1=1.41.

When the maximum effective radius of the object-side surface 111 of the first lens element 110 is Y11, and a maximum effective radius of the image-side surface 162 of the sixth lens element 160 is Y62, the following condition is satisfied: Y62/Y11=2.71.

When a vertical distance between the critical point on the object-side surface 151 of the fifth lens element 150 and the optical axis is Yc51, and a vertical distance between the critical point on the image-side surface 152 of the fifth lens element 150 and the optical axis is Yc52, the following condition is satisfied: Yc51/Yc52=1.04.

When a vertical distance between the critical point on the image-side surface 162 of the sixth lens element 160 and the optical axis is Yc62, and the maximum effective radius of the image-side surface 162 of the sixth lens element 160 is Y62, the following condition is satisfied: Yc62/Y62=0.42.

The detailed optical data of the 1st embodiment are shown in Table 1 and the aspheric surface data are shown in Table 2 below.

TABLE 1

1st Embodiment
f = 3.89 mm, Fno = 2.24, HFOV = 39.2 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.100 | | | | |
| 2 | Lens 1 | 2.035 | (ASP) | 0.941 | Glass | 1.542 | 62.9 | 2.86 |
| 3 | | −5.460 | (ASP) | 0.064 | | | | |
| 4 | Stop | Plano | | −0.016 | | | | |
| 5 | Lens 2 | −7.238 | (ASP) | 0.197 | Plastic | 1.614 | 26.0 | −12.23 |
| 6 | | −202.840 | (ASP) | 0.213 | | | | |
| 7 | Lens 3 | 3.038 | (ASP) | 0.188 | Plastic | 1.686 | 18.4 | −10.11 |

TABLE 1-continued

1st Embodiment
f = 3.89 mm, Fno = 2.24, HFOV = 39.2 deg.

| Surface # | | Curvature Radius | | Thickness | Material | Index | Abbe # | Focal Length |
|---|---|---|---|---|---|---|---|---|
| 8 | | 2.060 | (ASP) | 0.363 | | | | |
| 9 | Lens 4 | −3.631 | (ASP) | 0.416 | Plastic | 1.686 | 18.4 | 21.85 |
| 10 | | −3.059 | (ASP) | 0.097 | | | | |
| 11 | Lens 5 | 2.066 | (ASP) | 0.392 | Plastic | 1.534 | 55.9 | 9.15 |
| 12 | | 3.344 | (ASP) | 0.391 | | | | |
| 13 | Lens 6 | 3.216 | (ASP) | 0.350 | Plastic | 1.534 | 55.9 | −4.24 |
| 14 | | 1.277 | (ASP) | 0.400 | | | | |
| 15 | Filter | Plano | | 0.145 | Glass | 1.517 | 64.2 | — |
| 16 | | Plano | | 0.518 | | | | |
| 17 | Image | Plano | | — | | | | |

Note:
Reference wavelength is 587.6 nm (d-line).
An effective radius of the stop 101 (Surface 4) is 0.885 mm.

TABLE 2

Aspheric Coefficients

| Surface # | 2 | 3 | 5 | 6 | 7 | 8 |
|---|---|---|---|---|---|---|
| k = | −7.5410E+00 | −4.8108E+01 | 4.7991E+01 | 9.0000E+01 | −1.6785E+00 | −1.6055E+00 |
| A4 = | 4.3445E−02 | −1.3443E−01 | 1.8755E−01 | 1.5773E−01 | −3.8084E−01 | −2.7819E−01 |
| A6 = | 1.0210E−01 | −2.4175E−01 | −6.0783E−02 | 3.3870E−01 | 1.0763E−01 | −3.0521E−02 |
| A8 = | −7.8447E−01 | 1.0121E+00 | 5.7304E−02 | −9.3596E−01 | 8.7786E−01 | 6.9261E−01 |
| A10 = | 1.8427E+00 | −2.1213E+00 | −2.0467E−01 | 1.2370E+00 | −1.7544E+00 | −1.0392E+00 |
| A12 = | −2.4179E+00 | 2.6494E+00 | 3.6712E−01 | −1.0580E+00 | 1.4464E+00 | 7.0308E−01 |
| A14 = | 1.6256E+00 | −1.7956E+00 | −1.3743E−01 | 4.8305E−01 | −4.9057E−01 | −1.8642E−01 |
| A16 = | −4.3458E−01 | 5.0823E−01 | — | — | — | 1.9989E−03 |

| Surface # | 9 | 10 | 11 | 12 | 13 | 14 |
|---|---|---|---|---|---|---|
| k = | 1.3177E+00 | 2.5273E−01 | −4.5806E−01 | −8.4354E+01 | 4.4503E−01 | −1.1061E+00 |
| A4 = | 3.8740E−01 | 3.2956E−01 | −1.2089E−02 | 9.1257E−02 | −4.3052E−01 | −4.3073E−01 |
| A6 = | −7.3061E−01 | −7.2203E−01 | −2.5690E−01 | −1.8039E−01 | 2.2019E−01 | 3.0697E−01 |
| A8 = | 9.1121E−01 | 1.0283E+00 | 3.5709E−01 | 1.4493E−01 | −7.9400E−02 | −1.7707E−01 |
| A10 = | −7.7023E−01 | −9.5815E−01 | −3.4327E−01 | −9.4375E−02 | 4.0355E−02 | 7.8161E−02 |
| A12 = | 3.6939E−01 | 5.6696E−01 | 2.2401E−01 | 4.6866E−02 | −1.9833E−02 | −2.4343E−02 |
| A14 = | −9.2374E−02 | −2.1130E−01 | −9.7561E−02 | −1.5189E−02 | 6.0486E−03 | 5.0168E−03 |
| A16 = | 9.0101E−03 | 4.5838E−02 | 2.6800E−02 | 2.9219E−03 | −1.0477E−03 | −6.4483E−04 |
| A18 = | — | −4.4031E−03 | −4.0929E−03 | −2.9864E−04 | 9.5709E−05 | 4.6658E−05 |
| A20 = | — | — | 2.5935E−04 | 1.2284E−05 | −3.6000E−06 | −1.4471E−06 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
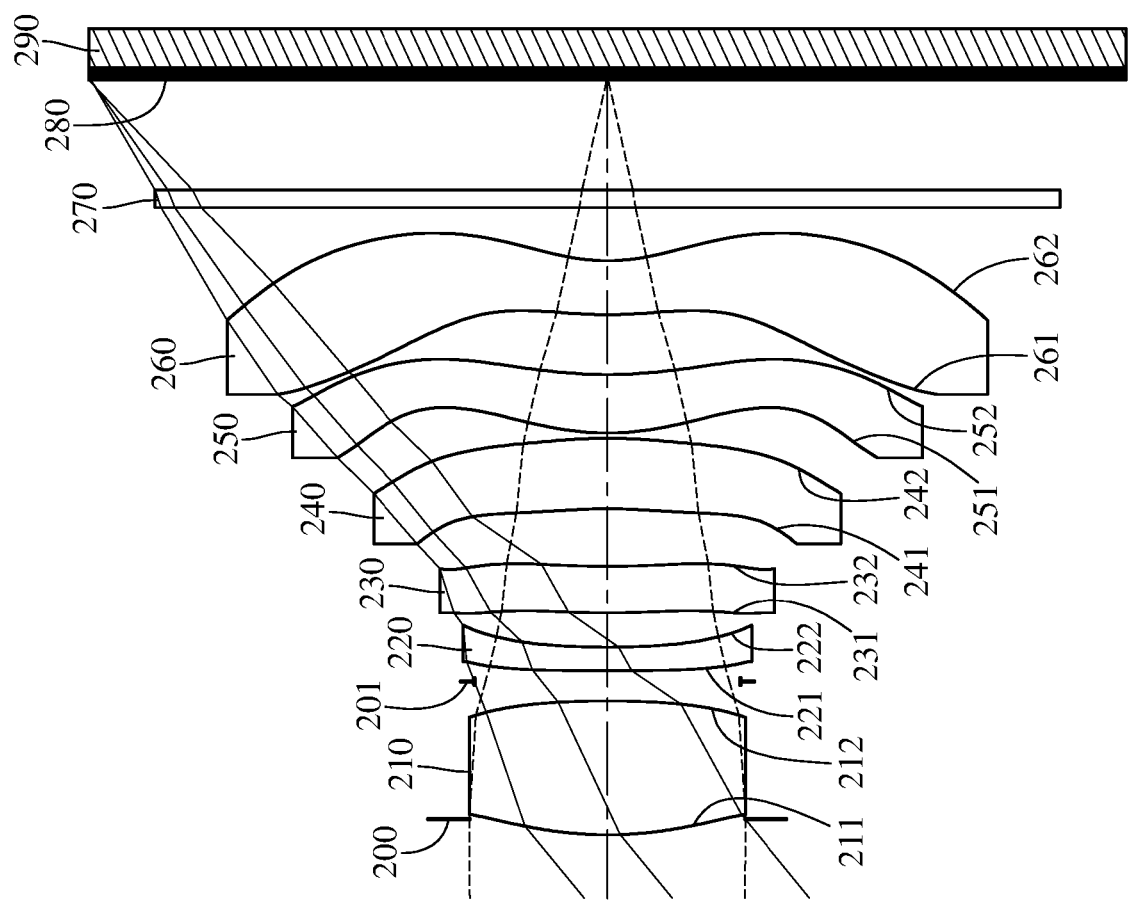
FIG. 3 is a schematic view of an image capturing unit according to the 2nd embodiment of the present disclosure.
Figure 4:
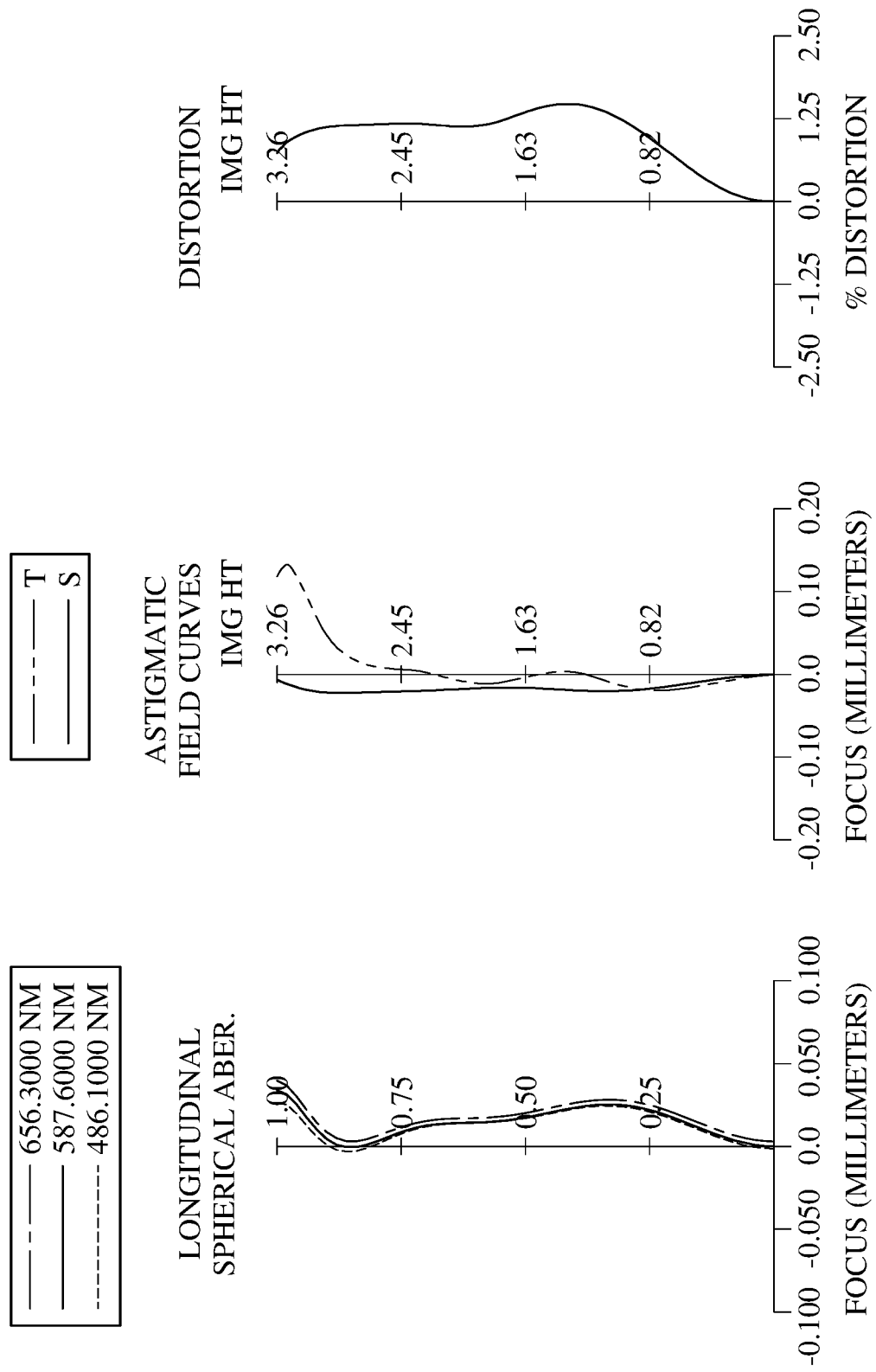
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing optical lens system (its reference numeral is omitted) of the present disclosure and an image sensor 290. The photographing optical lens system includes, in order from an object side to an image side, an aperture stop 200, a first lens element 210, a stop 201, a second lens element 220, a third lens element 230, a fourth lens element 240, a fifth lens element 250, a sixth lens element 260, a filter 270 and an image surface 280. The photographing optical lens system includes six lens elements (210, 220, 230, 240, 250 and 260) with no additional lens element disposed between each of the adjacent six lens elements.

The first lens element 210 with positive refractive power has an object-side surface 211 being convex in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has one inflection point.

The second lens element 220 with negative refractive power has an object-side surface 221 being planar in a paraxial region thereof and an image-side surface 222 being concave in a paraxial region thereof. The second lens element 220 is made of plastic material and has the object-side surface 221 and the image-side surface 222 being both aspheric.

The third lens element 230 with positive refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric. The object-side surface 231 of the third lens element 230 has two inflection points. The image-side surface 232 of the third lens element 230 has two inflection points. The object-side surface 231 of the third lens element 230 has two critical points in an off-axis region thereof. The image-side surface 232 of the third lens element 230 has two critical points in an off-axis region thereof.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric. The object-side surface 241 of the fourth lens element 240 has three inflection points. The image-side surface 242 of the fourth lens element 240 has two inflection points.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The object-side surface 251 of the fifth lens element 250 has three inflection points. The image-side surface 252 of the fifth lens element 250 has two inflection points. The object-side surface 251 of the fifth lens element 250 has one critical point in an off-axis region thereof. The image-side surface 252 of the fifth lens element 250 has one critical point in an off-axis region thereof.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The object-side surface 261 of the sixth lens element 260 has two inflection points. The image-side surface 262 of the sixth lens element 260 has one inflection point. The object-side surface 261 of the sixth lens element 260 has one critical point in an off-axis region thereof. The image-side surface 262 of the sixth lens element 260 has one critical point in an off-axis region thereof.

The filter 270 is made of glass material and located between the sixth lens element 260 and the image surface 280, and will not affect the focal length of the photographing optical lens system. The image sensor 290 is disposed on or near the image surface 280 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2. In addition, an Abbe number of the second lens element 220 is V2, and a refractive index of the second lens element 220 is N2.

The detailed optical data of the 2nd embodiment are shown in Table 3 and the aspheric surface data are shown in Table 4 below.

TABLE 3

2nd Embodiment
f = 3.89 mm, Fno = 2.27, HFOV = 39.3 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.100 | | | | |
| 2 | Lens 1 | 2.341 | (ASP) | 0.845 | Plastic | 1.545 | 56.1 | 3.24 |
| 3 | | −6.298 | (ASP) | 0.123 | | | | |
| 4 | Stop | Plano | | 0.069 | | | | |
| 5 | Lens 2 | ∞ | (ASP) | 0.148 | Plastic | 1.701 | 14.7 | −8.34 |
| 6 | | 5.847 | (ASP) | 0.217 | | | | |
| 7 | Lens 3 | 5.480 | (ASP) | 0.297 | Plastic | 1.614 | 26.0 | 196.25 |
| 8 | | 5.623 | (ASP) | 0.364 | | | | |
| 9 | Lens 4 | −2.934 | (ASP) | 0.445 | Plastic | 1.614 | 26.0 | 53.16 |
| 10 | | −2.848 | (ASP) | 0.033 | | | | |
| 11 | Lens 5 | 1.708 | (ASP) | 0.369 | Plastic | 1.544 | 56.0 | 7.04 |
| 12 | | 2.848 | (ASP) | 0.378 | | | | |
| 13 | Lens 6 | 2.607 | (ASP) | 0.340 | Plastic | 1.534 | 55.9 | −4.11 |
| 14 | | 1.138 | (ASP) | 0.341 | | | | |
| 15 | Filter | Plano | | 0.110 | Glass | 1.517 | 64.2 | — |
| 16 | | Plano | | 0.695 | | | | |
| 17 | Image | Plano | | — | | | | |

Note:
Reference wavelength is 587.6 nm (d-line).
An effective radius of the stop 201 (Surface 4) is 0.840 mm.

TABLE 4

| Aspheric Coefficients | | | | | | |
|---|---|---|---|---|---|---|
| Surface # | 2 | 3 | 5 | 6 | 7 | 8 |
| k = | −9.1788E+00 | −5.9086E+01 | 0.0000E+00 | −9.8554E+01 | 1.6386E+01 | 1.3736E+01 |
| A4 = | 3.0735E−02 | −5.8728E−02 | 1.5896E−01 | 2.0247E−01 | −1.2141E−01 | −1.3722E−02 |
| A6 = | 3.9704E−02 | −3.3810E−01 | −4.6696E−01 | −4.5413E−01 | −5.8919E−01 | −6.2314E−01 |
| A8 = | −3.3759E−01 | 1.4498E+00 | 1.7025E+00 | 1.5477E+00 | 2.0490E+00 | 1.1887E+00 |
| A10 = | 5.5437E−01 | −3.5201E+00 | −3.7265E+00 | −3.0296E+00 | −3.3245E+00 | −1.0773E+00 |

TABLE 4-continued

| Aspheric Coefficients | | | | | |
|---|---|---|---|---|---|
| A12 = | −3.9220E−01 | 4.8674E+00 | 4.4982E+00 | 2.9543E+00 | 2.7872E+00 | 2.6891E−01 |
| A14 = | 1.5971E−02 | −3.5360E+00 | −2.6713E+00 | −1.0958E+00 | −9.0602E−01 | 2.7164E−01 |
| A16 = | 7.4381E−02 | 1.0498E+00 | 5.9492E−01 | — | — | −1.3834E−01 |

| Surface # | 9 | 10 | 11 | 12 | 13 | 14 |
|---|---|---|---|---|---|---|
| k = | 2.7996E−01 | −3.0584E+00 | −6.8233E−01 | −3.9901E+01 | 4.6412E−02 | −1.1697E+00 |
| A4 = | 4.8901E−01 | 3.0922E−01 | −7.4141E−02 | 9.1858E−02 | −3.9082E−01 | −4.5678E−01 |
| A6 = | −8.4713E−01 | −5.4847E−01 | −1.7843E−01 | −1.9369E−01 | 1.1480E−01 | 3.3279E−01 |
| A8 = | 7.2330E−01 | 4.3891E−01 | 2.3598E−01 | 1.5401E−01 | 4.1444E−02 | −1.8894E−01 |
| A10 = | −2.2992E−01 | −1.1111E−01 | −2.2956E−01 | −8.6003E−02 | −4.0949E−02 | 7.8871E−02 |
| A12 = | −1.8719E−01 | −9.4595E−02 | 1.6841E−01 | 3.5496E−02 | 1.3406E−02 | −2.2823E−02 |
| A14 = | 1.7413E−01 | 8.1454E−02 | −8.5061E−02 | −1.0025E−02 | −2.3190E−03 | 4.3556E−03 |
| A16 = | −3.7889E−02 | −2.2403E−02 | 2.6681E−02 | 1.7382E−03 | 2.1751E−04 | −5.1804E−04 |
| A18 = | — | 2.0535E−03 | −4.5476E−03 | −1.5973E−04 | −9.2969E−06 | 3.4624E−05 |
| A20 = | — | — | 3.1714E−04 | 5.6409E−06 | 5.9337E−08 | −9.8989E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 3.89 | TD/CT1 | 4.29 |
| Fno | 2.27 | TL/f | 1.23 |
| HFOV [deg.] | 39.3 | TL/ImgH | 1.46 |
| Nmax | 1.701 | (R1 + R2)/(R1 − R2) | −0.46 |
| (Vi/Ni)min | 8.64 | R10/R9 | 1.67 |
| V2 + V3 + V4 | 66.6 | Σ|f/fi| | 3.26 |
| Vmin | 14.7 | |f/f3| + |f/f4| | 0.09 |
| ΣCT/ΣAT | 2.06 | f/R1 | 1.66 |
| CT1/CT2 | 5.71 | EPD/CT1 | 2.06 |
| CT1/CT5 | 2.29 | ET1/ET2 | 2.65 |
| CT1/(CT2 + CT3) | 1.90 | Y11/CT1 | 1.03 |
| CT1/(CT2 + T23 + CT3) | 1.28 | Y11/ET1 | 1.42 |
| CT1/ET1 | 1.38 | Y62/Y11 | 2.75 |
| (CT5 + CT6)/T56 | 1.88 | Yc51/Yc52 | 0.97 |
| CT5/CT4 | 0.83 | Yc62/Y62 | 0.45 |

3rd Embodiment

Figure 5:
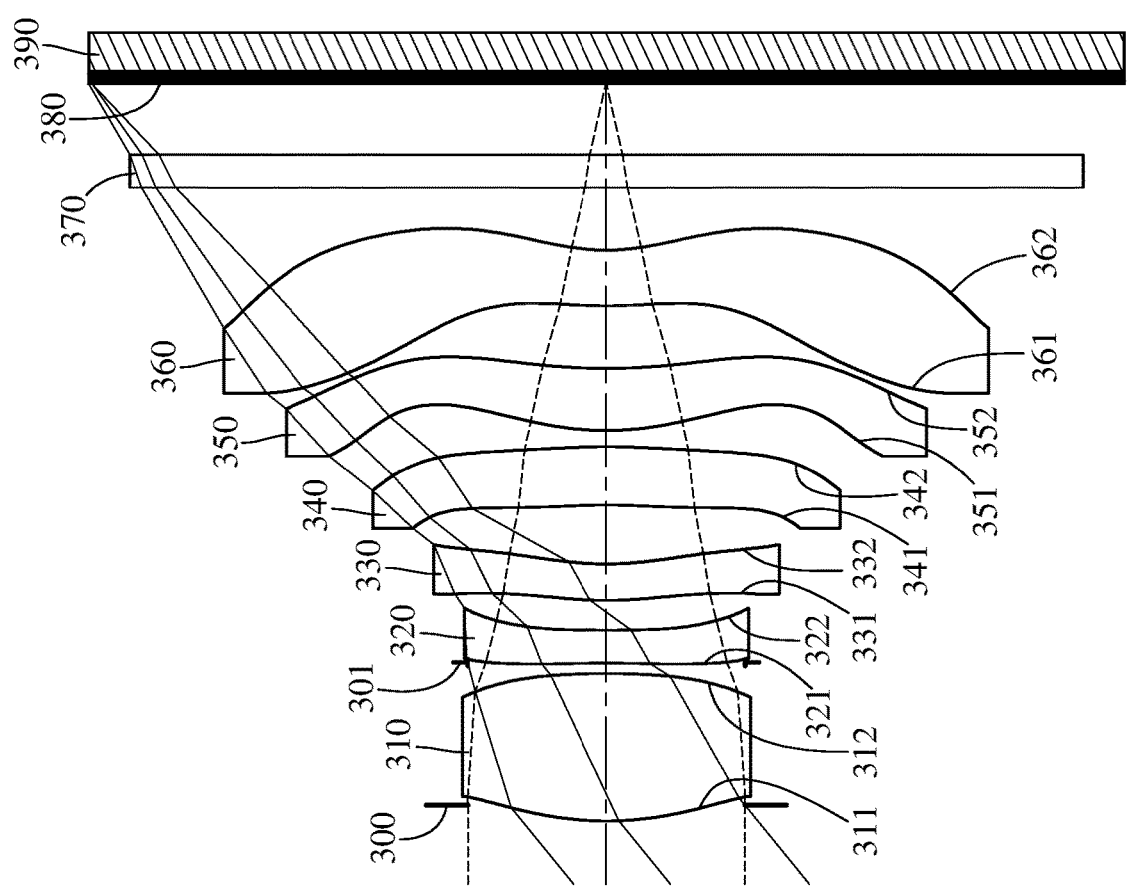
FIG. 5 is a schematic view of an image capturing unit according to the 3rd embodiment of the present disclosure.
Figure 6:
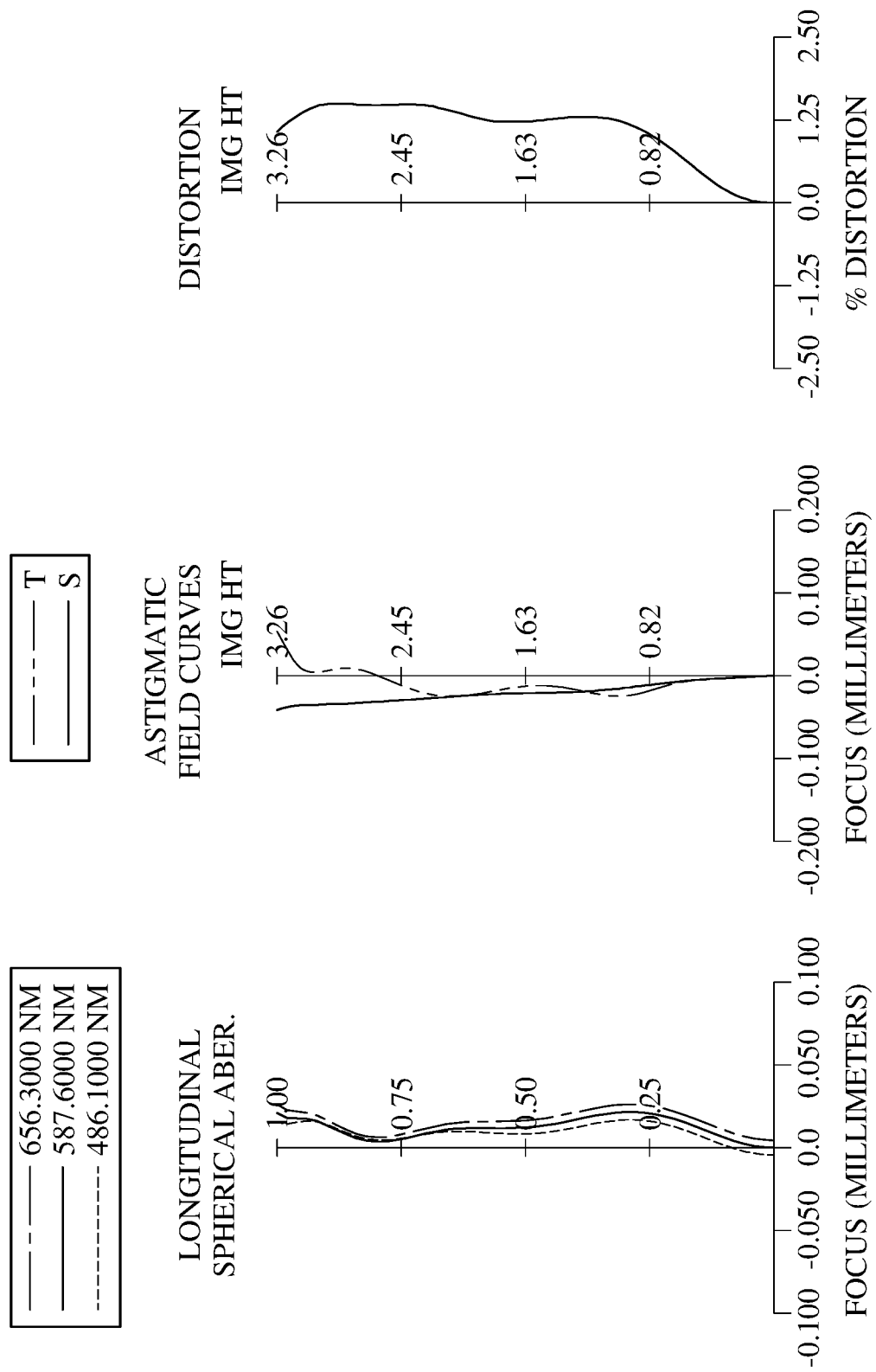
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing optical lens system (its reference numeral is omitted) of the present disclosure and an image sensor 390. The photographing optical lens system includes, in order from an object side to an image side, an aperture stop 300, a first lens element 310, a stop 301, a second lens element 320, a third lens element 330, a fourth lens element 340, a fifth lens element 350, a sixth lens element 360, a filter 370 and an image surface 380. The photographing optical lens system includes six lens elements (310, 320, 330, 340, 350 and 360) with no additional lens element disposed between each of the adjacent six lens elements.

The first lens element 310 with positive refractive power has an object-side surface 311 being convex in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has one inflection point.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has one inflection point. The object-side surface 321 of the second lens element 320 has one critical point in an off-axis region thereof.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric. The object-side surface 331 of the third lens element 330 has one inflection point. The image-side surface 332 of the third lens element 330 has two inflection points. The object-side surface 331 of the third lens element 330 has one critical point in an off-axis region thereof.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric. The object-side surface 341 of the fourth lens element 340 has two inflection points. The image-side surface 342 of the fourth lens element 340 has two inflection points.

The fifth lens element 350 with positive refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The object-side surface 351 of the fifth lens element 350 has three inflection points. The image-side surface 352 of the fifth lens element 350 has three inflection points. The object-side surface 351 of the fifth lens element 350 has one critical point in an off-axis region thereof. The image-side surface 352 of the fifth lens element 350 has one critical point in an off-axis region thereof.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The object-side surface 361 of the sixth lens element 360 has two inflection points. The image-side surface 362 of the sixth lens element 360 has two inflection points. The object-side surface 361 of the sixth lens element 360 has one critical point in an off-axis region thereof. The image-side surface 362 of the sixth lens element 360 has one critical point in an off-axis region thereof.

The filter 370 is made of glass material and located between the sixth lens element 360 and the image surface 380, and will not affect the focal length of the photographing optical lens system. The image sensor 390 is disposed on or near the image surface 380 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2 and V4/N4. In addition, an Abbe number of the second lens element 320 is V2, an Abbe number of the fourth lens element 340 is V4, a refractive index of the second lens element 320 is N2, and a refractive index of the fourth lens element 340 is N4.

The detailed optical data of the 3rd embodiment are shown in Table 5 and the aspheric surface data are shown in Table 6 below.

TABLE 5

3rd Embodiment
f = 3.90 mm, Fno = 2.25, HFOV = 39.2 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.100 | | | | |
| 2 | Lens 1 | 2.040 | (ASP) | 0.941 | Plastic | 1.545 | 56.1 | 2.80 |
| 3 | | −5.098 | (ASP) | 0.070 | | | | |
| 4 | Stop | Plano | | −0.004 | | | | |
| 5 | Lens 2 | −7.348 | (ASP) | 0.210 | Plastic | 1.669 | 19.5 | −6.83 |
| 6 | | 12.240 | (ASP) | 0.189 | | | | |
| 7 | Lens 3 | 2.326 | (ASP) | 0.230 | Plastic | 1.587 | 28.3 | −25.08 |
| 8 | | 1.936 | (ASP) | 0.375 | | | | |
| 9 | Lens 4 | −3.979 | (ASP) | 0.373 | Plastic | 1.669 | 19.5 | 65.85 |
| 10 | | −3.787 | (ASP) | 0.103 | | | | |
| 11 | Lens 5 | 1.947 | (ASP) | 0.393 | Plastic | 1.544 | 56.0 | 7.47 |
| 12 | | 3.472 | (ASP) | 0.397 | | | | |
| 13 | Lens 6 | 3.217 | (ASP) | 0.354 | Plastic | 1.534 | 55.9 | −4.32 |
| 14 | | 1.292 | (ASP) | 0.400 | | | | |
| 15 | Filter | Plano | | 0.210 | Glass | 1.517 | 64.2 | — |
| 16 | | Plano | | 0.451 | | | | |
| 17 | Image | Plano | | — | | | | |

Note:
Reference wavelength is 587.6 nm (d-line).
An effective radius of the stop 301 (Surface 4) is 0.881 mm.

TABLE 6

Aspheric Coefficients

| Surface # | 2 | 3 | 5 | 6 | 7 | 8 |
|---|---|---|---|---|---|---|
| k = | −7.3427E+00 | −7.1650E+01 | 5.2015E+01 | 6.2044E+01 | −1.3706E+00 | −1.9916E+00 |
| A4 = | 3.5737E−02 | −1.0507E−01 | 2.7057E−01 | 1.4597E−01 | −4.0036E−01 | −2.4145E−01 |
| A6 = | 1.8118E−01 | −6.6448E−02 | −2.5489E−01 | 3.0117E−01 | 3.3854E−01 | −3.6847E−02 |
| A8 = | −1.1489E+00 | −4.9828E−01 | −3.1361E−01 | −1.0931E+00 | 1.3780E−01 | 5.7195E−01 |
| A10 = | 2.8289E+00 | 1.9885E+00 | 1.3364E+00 | 1.6197E+00 | −6.7251E−01 | −9.1617E−01 |
| A12 = | −3.9187E+00 | −2.8472E+00 | −1.3511E+00 | −1.2086E+00 | 6.5035E−01 | 7.2421E−01 |
| A14 = | 2.8351E+00 | 1.8863E+00 | 4.9888E−01 | 4.0601E−01 | −2.3232E−01 | −2.7479E−01 |
| A16 = | −8.3803E−01 | −4.8530E−01 | — | — | — | 3.7462E−02 |

| Surface # | 9 | 10 | 11 | 12 | 13 | 14 |
|---|---|---|---|---|---|---|
| k = | −2.6126E+00 | −1.8237E−01 | −5.3301E−01 | −8.1073E+01 | 4.3897E−01 | −1.0991E+00 |
| A4 = | 4.0717E−01 | 3.5541E−01 | −1.3070E−02 | 9.6390E−02 | −4.3090E−01 | −4.3999E−01 |
| A6 = | −7.9065E−01 | −7.8706E−01 | −2.4857E−01 | −1.9038E−01 | 2.2067E−01 | 3.2948E−01 |
| A8 = | 9.9424E−01 | 1.0954E+00 | 3.4412E−01 | 1.5900E−01 | −7.9545E−02 | −1.9916E−01 |
| A10 = | −8.3784E−01 | −9.8416E−01 | −3.3310E−01 | −1.0664E−01 | 4.0035E−02 | 9.0571E−02 |
| A12 = | 4.0201E−01 | 5.5526E−01 | 2.2207E−01 | 5.3211E−02 | −1.9504E−02 | −2.8645E−02 |
| A14 = | −1.0209E−01 | −1.9611E−01 | −9.9451E−02 | −1.7137E−02 | 5.9100E−03 | 5.9482E−03 |
| A16 = | 1.1053E−02 | 4.0562E−02 | 2.8073E−02 | 3.2650E−03 | −1.0171E−03 | −7.6767E−04 |
| A18 = | — | −3.7767E−03 | −4.4049E−03 | −3.2976E−04 | 9.2243E−05 | 5.5697E−05 |
| A20 = | — | — | 2.8817E−04 | 1.3351E−05 | −3.4399E−06 | −1.7322E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 3.90 | TD/CT1 | 3.86 |
| Fno | 2.25 | TL/f | 1.20 |
| HFOV [deg.] | 39.2 | TL/ImgH | 1.44 |
| Nmax | 1.669 | (R1 + R2)/(R1 − R2) | −0.43 |
| (Vi/Ni)min | 11.65 | R10/R9 | 1.78 |
| V2 + V3 + V4 | 67.2 | Σ|f/fi| | 3.60 |
| Vmin | 19.5 | |f/f3| + |f/f4| | 0.21 |
| ΣCT/ΣAT | 2.21 | f/R1 | 1.91 |
| CT1/CT2 | 4.48 | EPD/CT1 | 1.87 |
| CT1/CT5 | 2.39 | ET1/ET2 | 1.97 |
| CT1/(CT2 + CT3) | 2.14 | Y11/CT1 | 0.94 |
| CT1/(CT2 + T23 + CT3) | 1.50 | Y11/ET1 | 1.40 |
| CT1/ET1 | 1.48 | Y62/Y11 | 2.73 |
| (CT5 + CT6)/T56 | 1.88 | Yc51/Yc52 | 1.07 |
| CT5/CT4 | 1.05 | Yc62/Y62 | 0.42 |

4th Embodiment

Figure 7:
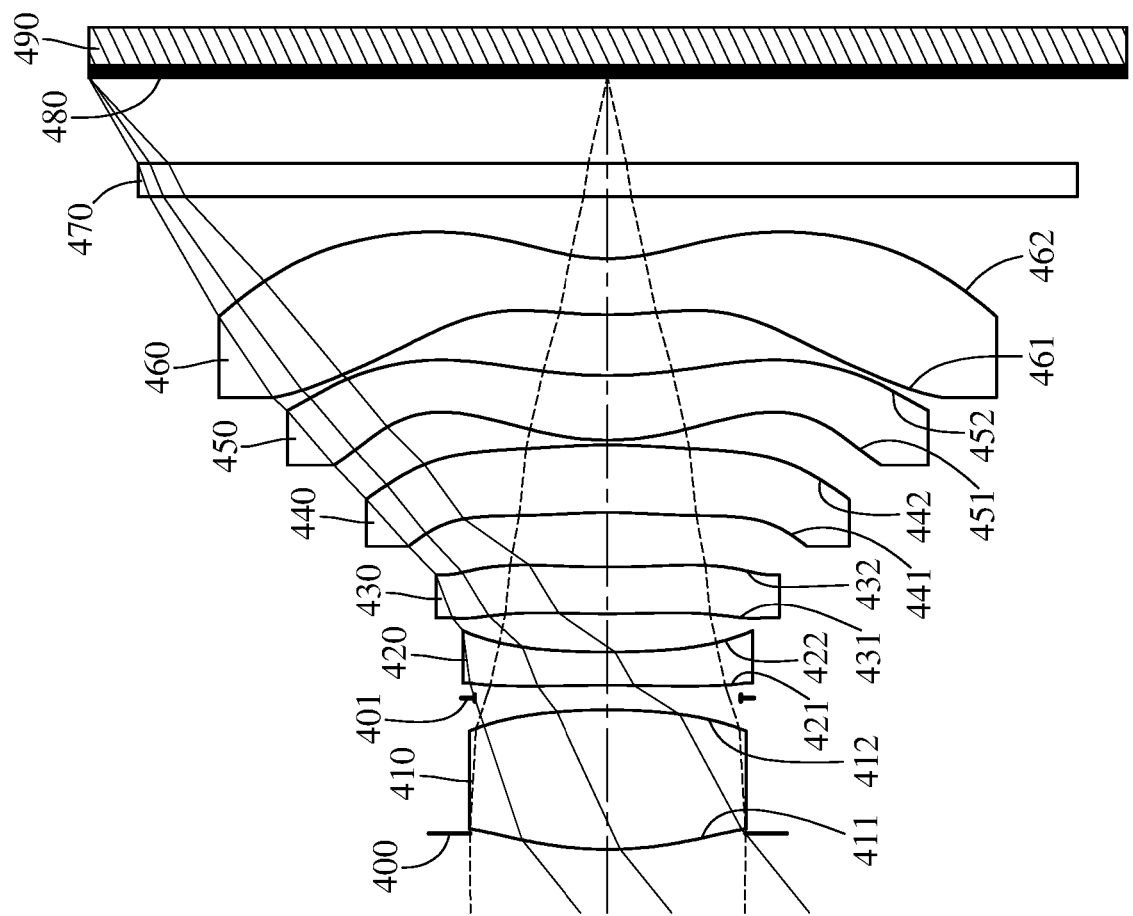
FIG. 7 is a schematic view of an image capturing unit according to the 4th embodiment of the present disclosure.
Figure 8:
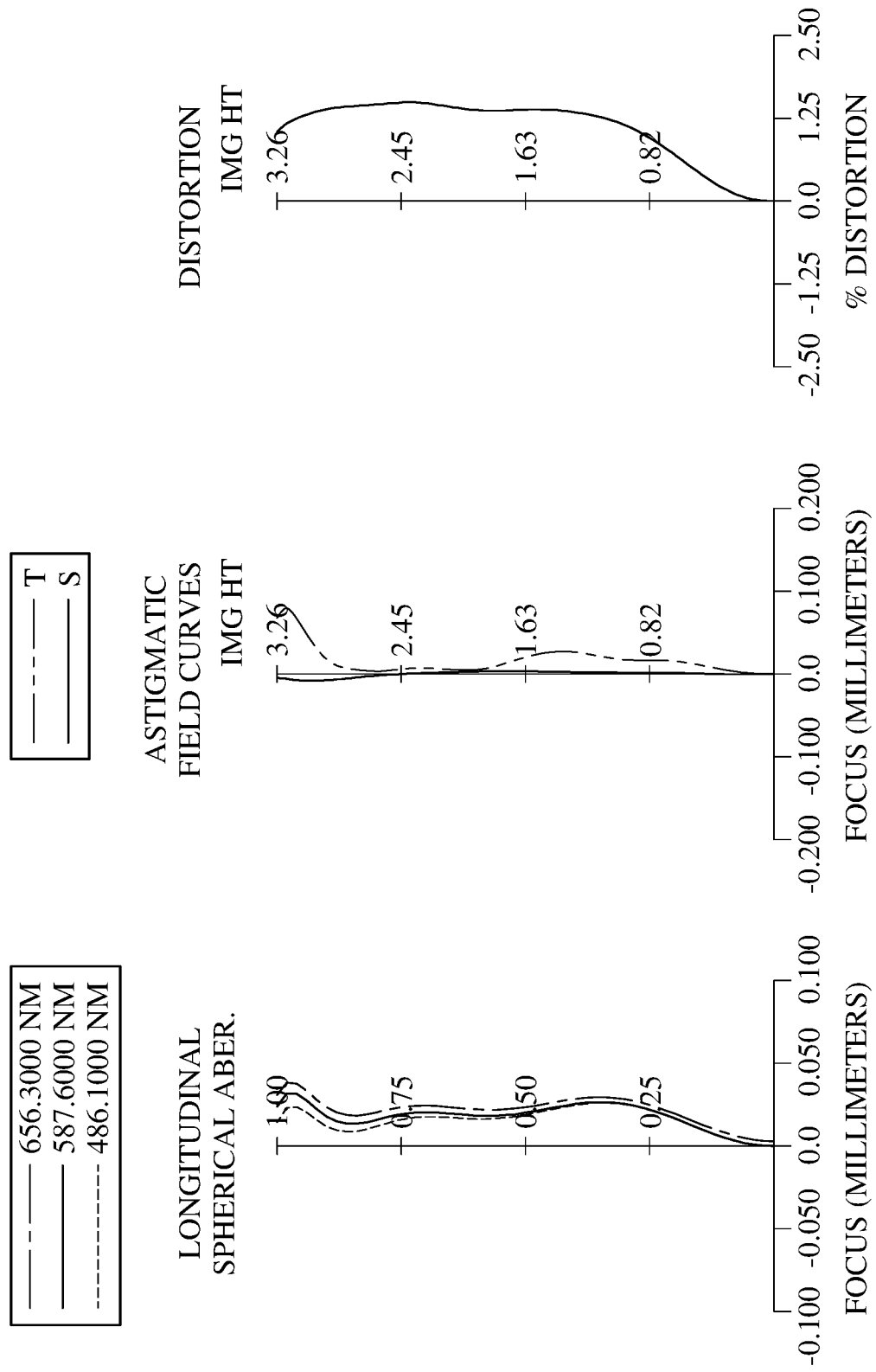
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing optical lens system (its reference numeral is omitted) of the present disclosure and an image sensor 490. The photographing optical lens system includes, in order from an object side to an image side, an aperture stop 400, a first lens element 410, a stop 401, a second lens element 420, a third lens element 430, a fourth lens element 440, a fifth lens element 450, a sixth lens element 460, a filter 470 and an image surface 480. The photographing optical lens system includes six lens elements (410, 420, 430, 440, 450 and 460) with no additional lens element disposed between each of the adjacent six lens elements.

The first lens element 410 with positive refractive power has an object-side surface 411 being convex in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has one inflection point.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has one inflection point. The object-side surface 421 of the second lens element 420 has one critical point in an off-axis region thereof.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric. The object-side surface 431 of the third lens element 430 has two inflection points. The image-side surface 432 of the third lens element 430 has two inflection points. The object-side surface 431 of the third lens element 430 has two critical points in an off-axis region thereof. The image-side surface 432 of the third lens element 430 has two critical points in an off-axis region thereof.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric. The object-side surface 441 of the fourth lens element 440 has two inflection points. The image-side surface 442 of the fourth lens element 440 has two inflection points.

The fifth lens element 450 with positive refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric. The object-side surface 451 of the fifth lens element 450 has three inflection points. The image-side surface 452 of the fifth lens element 450 has three inflection points. The object-side surface 451 of the fifth lens element 450 has one critical point in an off-axis region thereof. The image-side surface 452 of the fifth lens element 450 has one critical point in an off-axis region thereof.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The object-side surface 461 of the sixth lens element 460 has two inflection points. The image-side surface 462 of the sixth lens element 460 has two inflection points. The object-side surface 461 of the sixth lens element 460 has one critical point in an off-axis region thereof. The image-side surface 462 of the sixth lens element 460 has one critical point in an off-axis region thereof.

The filter 470 is made of glass material and located between the sixth lens element 460 and the image surface 480, and will not affect the focal length of the photographing optical lens system. The image sensor 490 is disposed on or near the image surface 480 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2. In addition, an Abbe number of the second lens element 420 is V2, and a refractive index of the second lens element 420 is N2.

The detailed optical data of the 4th embodiment are shown in Table 7 and the aspheric surface data are shown in Table 8 below.

TABLE 7

4th Embodiment
f = 3.92 mm, Fno = 2.29, HFOV = 39.0 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Ape. Stop | Plano | | −0.100 | | | | |
| 2 | Lens 1 | 2.311 | (ASP) | 0.880 | Plastic | 1.545 | 56.1 | 2.84 |
| 3 | | −4.038 | (ASP) | 0.075 | | | | |
| 4 | Stop | Plano | | 0.080 | | | | |
| 5 | Lens 2 | −9.763 | (ASP) | 0.210 | Plastic | 1.669 | 19.5 | −5.91 |
| 6 | | 6.703 | (ASP) | 0.241 | | | | |
| 7 | Lens 3 | 7.529 | (ASP) | 0.299 | Plastic | 1.566 | 37.4 | −86.69 |
| 8 | | 6.434 | (ASP) | 0.344 | | | | |
| 9 | Lens 4 | −3.242 | (ASP) | 0.426 | Plastic | 1.639 | 23.5 | 356.74 |
| 10 | | −3.360 | (ASP) | 0.030 | | | | |
| 11 | Lens 5 | 1.644 | (ASP) | 0.408 | Plastic | 1.544 | 56.0 | 6.69 |
| 12 | | 2.735 | (ASP) | 0.383 | | | | |
| 13 | Lens 6 | 2.553 | (ASP) | 0.354 | Plastic | 1.534 | 55.9 | −4.41 |
| 14 | | 1.166 | (ASP) | 0.391 | | | | |
| 15 | Filter | Plano | | 0.210 | Glass | 1.517 | 64.2 | — |
| 16 | | Plano | | 0.539 | | | | |
| 17 | Image | Plano | | — | | | | |

Note:
Reference wavelength is 587.6 nm (d-line).
An effective radius of the stop 401 (Surface 4) is 0.840 mm.

TABLE 8

Aspheric Coefficients

| Surface # | 2 | 3 | 5 | 6 | 7 | 8 |
|---|---|---|---|---|---|---|
| k = | −9.1119E+00 | −4.0406E+01 | 0.0000E+00 | −9.9000E+01 | 2.1798E+01 | 5.5200E+00 |
| A4 = | 4.1487E−02 | −1.0118E−01 | 1.4874E−01 | 1.8139E−01 | −1.4958E−01 | −1.7180E−02 |
| A6 = | −2.0522E−02 | −1.1362E−01 | −1.2064E−01 | −2.0991E−01 | −4.4894E−01 | −6.2604E−01 |
| A8 = | −1.0654E−01 | 5.2939E−01 | −9.7104E−02 | 5.4061E−01 | 1.7043E+00 | 1.1978E+00 |
| A10 = | −7.9307E−02 | −1.3835E+00 | 5.8813E−01 | −1.0721E+00 | −2.8042E+00 | −1.1189E+00 |
| A12 = | 6.5815E−01 | 2.0911E+00 | −9.5925E−01 | 1.1248E+00 | 2.3575E+00 | 3.6744E−01 |
| A14 = | −9.3527E−01 | −1.6685E+00 | 8.2919E−01 | −4.3838E−01 | −7.5633E−01 | 1.6805E−01 |
| A16 = | 4.2794E−01 | 5.4576E−01 | −3.0143E−01 | — | — | −1.0103E−01 |

| Surface # | 9 | 10 | 11 | 12 | 13 | 14 |
|---|---|---|---|---|---|---|
| k = | −9.9694E−01 | −3.4314E+00 | −7.1596E−01 | −4.0342E+01 | 0.0000E+00 | −1.1343E+00 |
| A4 = | 5.0576E−01 | 3.4529E−01 | −7.5599E−02 | 9.5036E−02 | −4.0175E−01 | −4.5704E−01 |
| A6 = | −8.5524E−01 | −5.8820E−01 | −1.6933E−01 | −2.0612E−01 | 1.2290E−01 | 3.2696E−01 |
| A8 = | 6.7014E−01 | 4.8305E−01 | 2.3970E−01 | 1.7209E−01 | 3.9322E−02 | −1.7614E−01 |
| A10 = | −1.2449E−01 | −1.8245E−01 | −2.5163E−01 | −1.0135E−01 | −4.1111E−02 | 6.9443E−02 |
| A12 = | −2.6745E−01 | −2.1749E−02 | 1.9058E−01 | 4.3832E−02 | 1.3570E−02 | −1.9153E−02 |
| A14 = | 2.0686E−01 | 4.2202E−02 | −9.6326E−02 | −1.2882E−02 | −2.3349E−03 | 3.5134E−03 |
| A16 = | −4.4636E−02 | −1.2093E−02 | 2.9914E−02 | 2.3304E−03 | 2.1303E−04 | −4.0350E−04 |
| A18 = | — | 1.0253E−03 | −5.0507E−03 | −2.2735E−04 | −8.1705E−06 | 2.6085E−05 |
| A20 = | — | — | 3.5062E−04 | 8.9074E−06 | −1.6817E−08 | −7.2132E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 3.92 | TD/CT1 | 4.24 |
| Fno | 2.29 | TL/f | 1.24 |
| HFOV [deg.] | 39.0 | TL/ImgH | 1.49 |
| Nmax | 1.669 | (R1 + R2)/(R1 − R2) | −0.27 |

-continued

| 4th Embodiment | | | |
|---|---|---|---|
| (Vi/Ni)min | 11.65 | R10/R9 | 1.66 |
| V2 + V3 + V4 | 80.4 | Σ|f/fi| | 3.58 |
| Vmin | 19.5 | |f/f3| + |f/f4| | 0.06 |
| ΣCT/ΣAT | 2.24 | f/R1 | 1.70 |
| CT1/CT2 | 4.19 | EPD/CT1 | 1.97 |
| CT1/CT5 | 2.16 | ET1/ET2 | 1.85 |
| CT1/(CT2 + CT3) | 1.73 | Y11/CT1 | 0.99 |
| CT1/(CT2 + T23 + CT3) | 1.17 | Y11/ET1 | 1.42 |
| CT1/ET1 | 1.43 | Y62/Y11 | 2.82 |
| (CT5 + CT6)/T56 | 1.99 | Yc51/Yc52 | 1.00 |
| CT5/CT4 | 0.96 | Yc62/Y62 | 0.45 |

5th Embodiment

Figure 9:
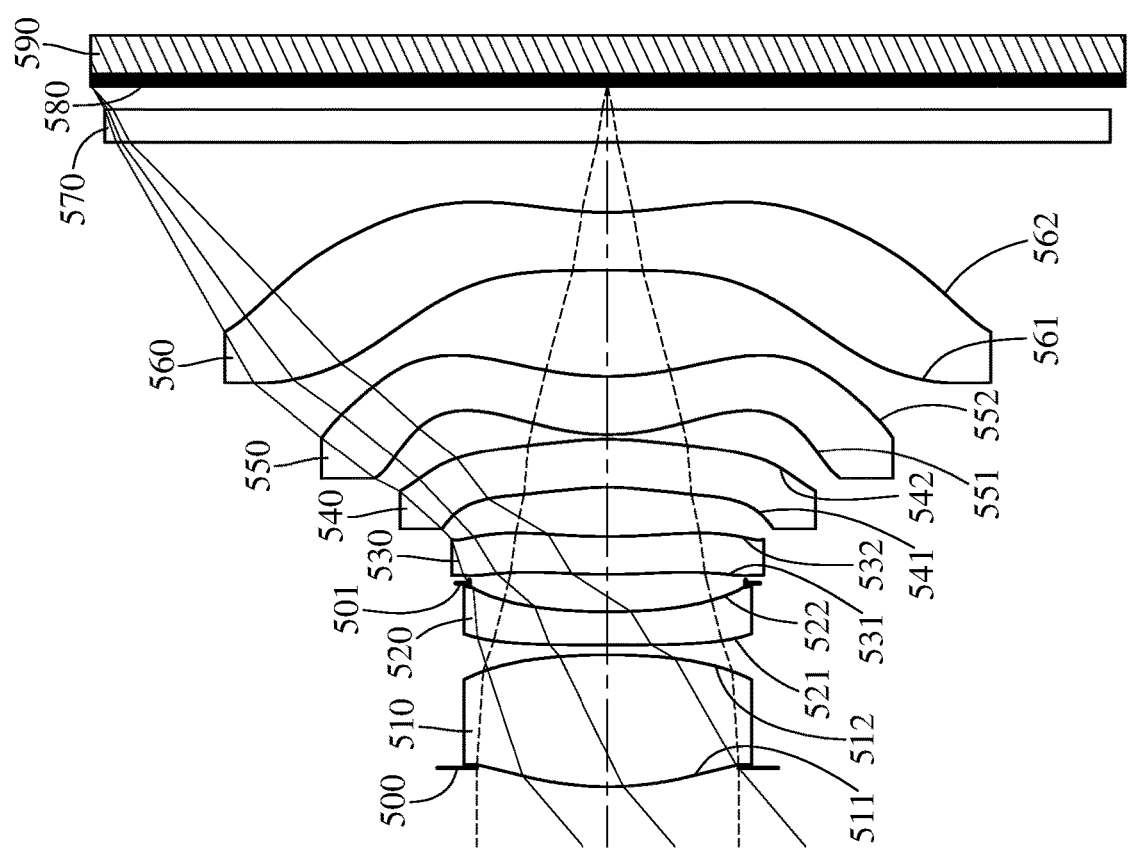
FIG. 9 is a schematic view of an image capturing unit according to the 5th embodiment of the present disclosure.
Figure 10:
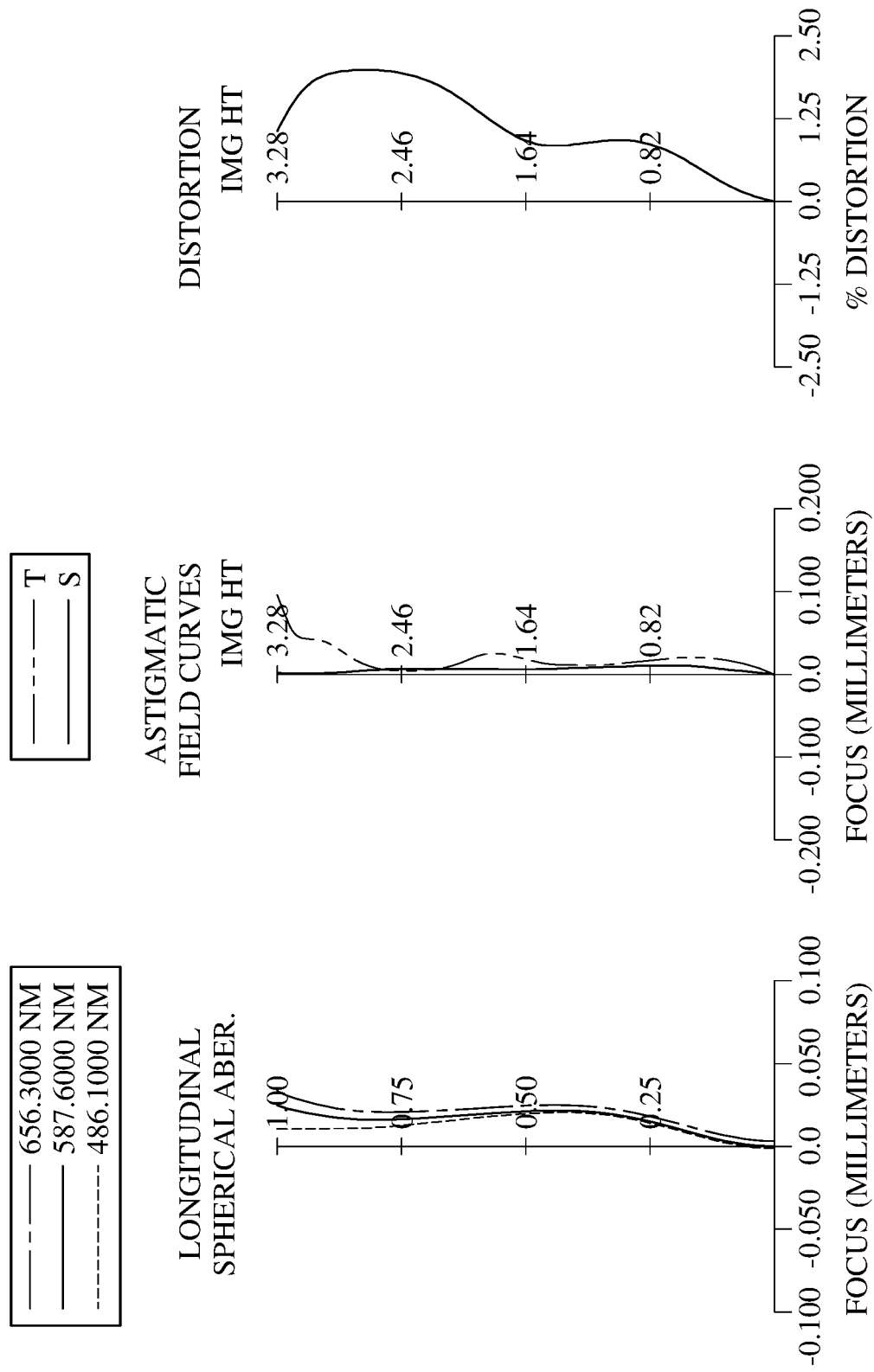
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing optical lens system (its reference numeral is omitted) of the present disclosure and an image sensor 590. The photographing optical lens system includes, in order from an object side to an image side, an aperture stop 500, a first lens element 510, a second lens element 520, a stop 501, a third lens element 530, a fourth lens element 540, a fifth lens element 550, a sixth lens element 560, a filter 570 and an image surface 580. The photographing optical lens system includes six lens elements (510, 520, 530, 540, 550 and 560) with no additional lens element disposed between each of the adjacent six lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has one inflection point.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric.

The third lens element 530 with positive refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric. The object-side surface 531 of the third lens element 530 has two inflection points. The image-side surface 532 of the third lens element 530 has two inflection points. The object-side surface 531 of the third lens element 530 has two critical points in an off-axis region thereof. The image-side surface 532 of the third lens element 530 has two critical points in an off-axis region thereof.

The fourth lens element 540 with negative refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric. The object-side surface 541 of the fourth lens element 540 has two inflection points. The image-side surface 542 of the fourth lens element 540 has one inflection point.

The fifth lens element 550 with positive refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The object-side surface 551 of the fifth lens element 550 has two inflection points. The image-side surface 552 of the fifth lens element 550 has one inflection point. The object-side surface 551 of the fifth lens element 550 has one critical point in an off-axis region thereof. The image-side surface 552 of the fifth lens element 550 has one critical point in an off-axis region thereof.

The sixth lens element 560 with negative refractive power has an object-side surface 561 being concave in a paraxial region thereof and an image-side surface 562 being concave in a paraxial region thereof. The sixth lens element 560 is made of plastic material and has the object-side surface 561 and the image-side surface 562 being both aspheric. The object-side surface 561 of the sixth lens element 560 has one inflection point. The image-side surface 562 of the sixth lens element 560 has two inflection points. The object-side surface 561 of the sixth lens element 560 has one critical point in an off-axis region thereof. The image-side surface 562 of the sixth lens element 560 has one critical point in an off-axis region thereof.

The filter 570 is made of glass material and located between the sixth lens element 560 and the image surface 580, and will not affect the focal length of the photographing optical lens system. The image sensor 590 is disposed on or near the image surface 580 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2 and V4/N4. In addition, an Abbe number of the second lens element 520 is V2, an Abbe number of the fourth lens element 540 is V4, a refractive index of the second lens element 520 is N2, and a refractive index of the fourth lens element 540 is N4.

The detailed optical data of the 5th embodiment are shown in Table 9 and the aspheric surface data are shown in Table 10 below.

TABLE 9

5th Embodiment
f = 3.79 mm, Fno = 2.28, HFOV = 40.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.120 | | | | |
| 2 | Lens 1 | 2.004 | (ASP) | 0.844 | Plastic | 1.545 | 56.1 | 2.68 |
| 3 | | −4.563 | (ASP) | 0.063 | | | | |
| 4 | Lens 2 | 200.000 | (ASP) | 0.210 | Plastic | 1.669 | 19.5 | −6.21 |
| 5 | | 4.070 | (ASP) | 0.180 | | | | |
| 6 | Stop | Plano | | 0.057 | | | | |
| 7 | Lens 3 | 4.350 | (ASP) | 0.240 | Plastic | 1.565 | 33.8 | 4255.75 |
| 8 | | 4.271 | (ASP) | 0.312 | | | | |
| 9 | Lens 4 | −1.791 | (ASP) | 0.310 | Plastic | 1.669 | 19.5 | −36.52 |
| 10 | | −2.066 | (ASP) | 0.030 | | | | |
| 11 | Lens 5 | 1.418 | (ASP) | 0.371 | Plastic | 1.544 | 56.0 | 7.91 |

TABLE 9-continued

5th Embodiment
f = 3.79 mm, Fno = 2.28, HFOV = 40.4 deg.

| Surface # | | Curvature Radius | | Thickness | Material | Index | Abbe # | Focal Length |
|---|---|---|---|---|---|---|---|---|
| 12 | | 1.920 | (ASP) | 0.672 | | | | |
| 13 | Lens 6 | −100.000 | (ASP) | 0.368 | Plastic | 1.534 | 55.9 | −4.08 |
| 14 | | 2.232 | (ASP) | 0.450 | | | | |
| 15 | Filter | Plano | | 0.210 | Glass | 1.517 | 64.2 | — |
| 16 | | Plano | | 0.145 | | | | |
| 17 | Image | Plano | | — | | | | |

Note:
Reference wavelength is 587.6 nm (d-line).
An effective radius of the stop 501 (Surface 6) is 0.878 mm.

TABLE 10

Aspheric Coefficients

| Surface # | 2 | 3 | 4 | 5 | 7 | 8 |
|---|---|---|---|---|---|---|
| k = | −1.5496E+01 | −5.5585E+01 | 9.0000E+01 | −1.2264E+01 | 8.5710E+00 | 2.1263E+00 |
| A4 = | 1.8357E−01 | −1.4801E−01 | 8.7412E−02 | 8.8556E−02 | −2.3534E−01 | −3.1099E−02 |
| A6 = | −3.5294E−01 | 9.7138E−02 | 1.7267E−01 | 2.0865E−01 | −3.4314E−01 | −8.1851E−01 |
| A8 = | 4.2154E−01 | −4.4872E−01 | −8.8701E−01 | −4.6652E−01 | 1.6533E+00 | 2.2779E+00 |
| A10 = | −4.7411E−01 | 9.3516E−01 | 1.6434E+00 | 3.1536E−01 | −2.9072E+00 | −3.8957E+00 |
| A12 = | 2.9160E−01 | −8.7037E−01 | −1.2929E+00 | 1.4248E−01 | 2.4479E+00 | 4.0985E+00 |
| A14 = | −7.7511E−02 | 3.0741E−01 | 3.8418E−01 | −1.3808E−01 | −7.2029E−01 | −2.4906E+00 |
| A16 = | — | — | — | — | — | 7.2004E−01 |

| Surface # | 9 | 10 | 11 | 12 | 13 | 14 |
|---|---|---|---|---|---|---|
| k = | −7.2602E+00 | −1.3595E+01 | −1.1865E+00 | −1.8425E+01 | −9.9000E+01 | −4.5671E−01 |
| A4 = | 6.0771E−01 | 3.6393E−01 | −8.4673E−02 | 1.7458E−01 | −2.0551E−01 | −2.6130E−01 |
| A6 = | −1.3400E+00 | −9.4860E−01 | −3.9170E−01 | −3.6362E−01 | 5.6991E−02 | 1.4240E−01 |
| A8 = | 1.5904E+00 | 1.3402E+00 | 7.4002E−01 | 2.2311E−01 | −4.3622E−03 | −8.7934E−02 |
| A10 = | −1.1342E+00 | −1.1594E+00 | −1.0018E+00 | −3.6420E−02 | 3.1197E−03 | 4.5044E−02 |
| A12 = | 2.0114E−01 | 5.2802E−01 | 9.1434E−01 | −3.7963E−02 | −1.8584E−03 | −1.5301E−02 |
| A14 = | 1.3908E−01 | −1.0628E−01 | −5.1212E−01 | 2.6861E−02 | 4.1316E−04 | 3.2370E−03 |
| A16 = | −5.4312E−02 | 5.8347E−03 | 1.5031E−01 | −7.3716E−03 | −4.0515E−05 | −4.1329E−04 |
| A18 = | — | — | −1.5630E−02 | 9.2674E−04 | 1.4787E−06 | 2.9383E−05 |
| A20 = | — | — | −6.3808E−04 | −4.2823E−05 | — | −8.9869E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 3.79 | TD/CT1 | 4.33 |
| Fno | 2.28 | TL/f | 1.18 |
| HFOV [deg.] | 40.4 | TL/ImgH | 1.36 |
| Nmax | 1.669 | (R1 + R2)/(R1 − R2) | −0.39 |
| (Vi/Ni)min | 11.65 | R10/R9 | 1.35 |
| V2 + V3 + V4 | 72.7 | Σ\|f/fi\| | 3.54 |
| Vmin | 19.5 | \|f/f3\| + \|f/f4\| | 0.10 |
| ΣCT/ΣAT | 1.78 | f/R1 | 1.89 |
| CT1/CT2 | 4.02 | EPD/CT1 | 1.97 |
| CT1/CT5 | 2.27 | ET1/ET2 | 1.82 |
| CT1/(CT2 + CT3) | 1.88 | Y11/CT1 | 0.99 |
| CT1/(CT2 + T23 + CT3) | 1.23 | Y11/ET1 | 1.54 |
| CT1/ET1 | 1.55 | Y62/Y11 | 2.90 |
| (CT5 + CT6)/T56 | 1.10 | Yc51/Yc52 | 0.92 |
| CT5/CT4 | 1.20 | Yc62/Y62 | 0.34 |

6th Embodiment

Figure 11:
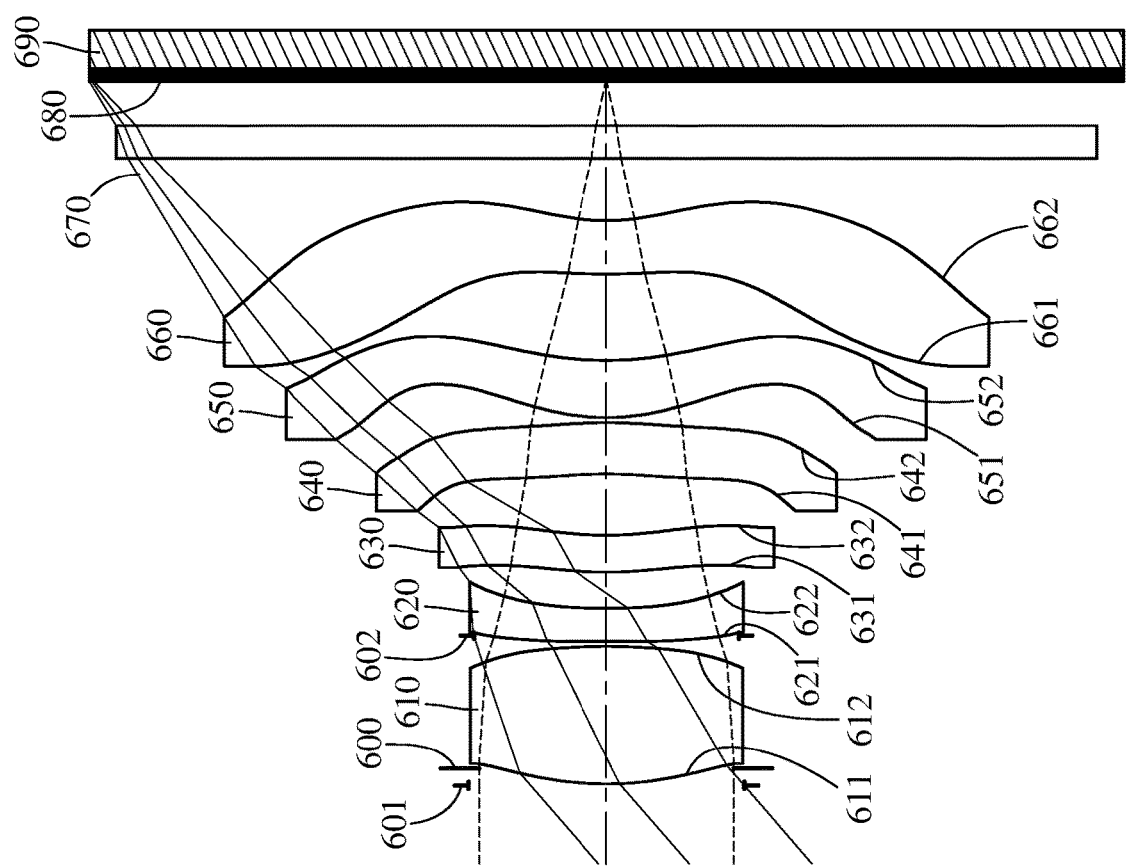
FIG. 11 is a schematic view of an image capturing unit according to the 6th embodiment of the present disclosure.
Figure 12:
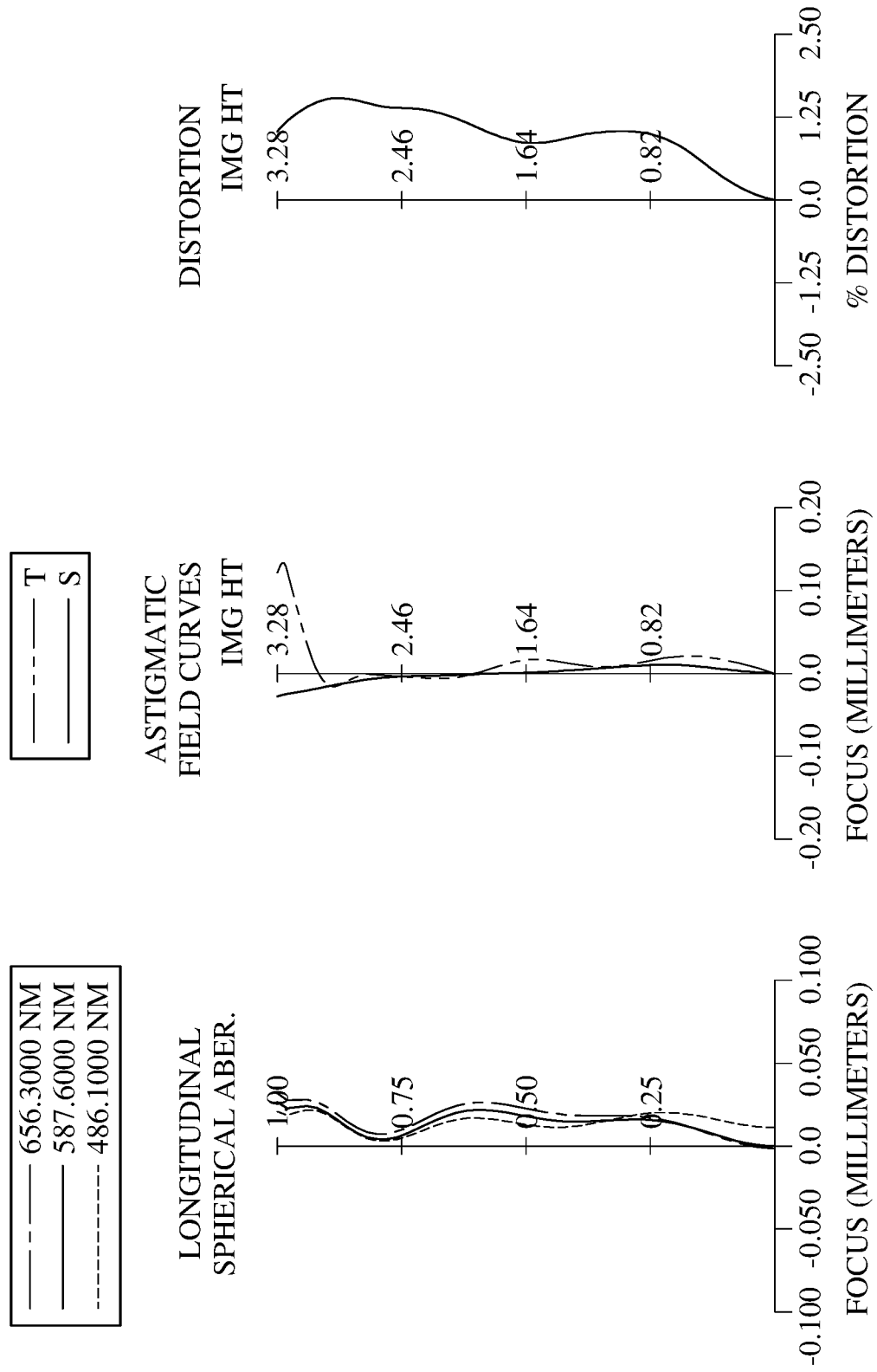
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing optical lens system (its reference numeral is omitted) of the present disclosure and an image sensor 690. The photographing optical lens system includes, in order from an object side to an image side, a stop 601, an aperture stop 600, a first lens element 610, a stop 602, a second lens element 620, a third lens element 630, a fourth lens element 640, a fifth lens element 650, a sixth lens element 660, a filter 670 and an image surface 680. The photographing optical lens system includes six lens elements (610, 620, 630, 640, 650 and 660) with no additional lens element disposed between each of the adjacent six lens elements.

The first lens element 610 with positive refractive power has an object-side surface 611 being convex in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has one inflection point.

The second lens element 620 with negative refractive power has an object-side surface 621 being concave in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has one inflection point. The object-side surface 621 of the second lens element 620 has one critical point in an off-axis region thereof.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric. The object-side surface 631 of the third lens element 630 has one inflection point. The image-side surface 632 of the third lens element 630 has two inflection points. The object-side surface 631 of the third lens element 630 has one critical point in an off-axis region thereof. The image-side surface 632 of the third lens element 630 has two critical points in an off-axis region thereof.

The fourth lens element 640 with negative refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric. The object-side surface 641 of the fourth lens element 640 has three inflection points. The image-side surface 642 of the fourth lens element 640 has two inflection points.

The fifth lens element 650 with positive refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The object-side surface 651 of the fifth lens element 650 has three inflection points. The image-side surface 652 of the fifth lens element 650 has three inflection points. The object-side surface 651 of the fifth lens element 650 has one critical point in an off-axis region thereof. The image-side surface 652 of the fifth lens element 650 has one critical point in an off-axis region thereof.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The object-side surface 661 of the sixth lens element 660 has two inflection points. The image-side surface 662 of the sixth lens element 660 has two inflection points. The object-side surface 661 of the sixth lens element 660 has one critical point in an off-axis region thereof. The image-side surface 662 of the sixth lens element 660 has one critical point in an off-axis region thereof.

The filter 670 is made of glass material and located between the sixth lens element 660 and the image surface 680, and will not affect the focal length of the photographing optical lens system. The image sensor 690 is disposed on or near the image surface 680 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2 and V4/N4. In addition, an Abbe number of the second lens element 620 is V2, an Abbe number of the fourth lens element 640 is V4, a refractive index of the second lens element 620 is N2, and a refractive index of the fourth lens element 640 is N4.

The detailed optical data of the 6th embodiment are shown in Table 11 and the aspheric surface data are shown in Table 12 below.

TABLE 11

6th Embodiment
f = 3.67 mm, Fno = 2.30, HFOV = 40.9 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Stop | Plano | | 0.110 | | | | |
| 2 | Ape. Stop | Plano | | −0.100 | | | | |
| 3 | Lens 1 | 2.077 | (ASP) | 0.882 | Plastic | 1.545 | 56.1 | 2.47 |
| 4 | | −3.248 | (ASP) | 0.068 | | | | |
| 5 | Stop | Plano | | −0.036 | | | | |
| 6 | Lens 2 | −10.043 | (ASP) | 0.210 | Plastic | 1.669 | 19.5 | −4.69 |
| 7 | | 4.603 | (ASP) | 0.230 | | | | |
| 8 | Lens 3 | 2.432 | (ASP) | 0.235 | Plastic | 1.584 | 28.2 | −122.64 |
| 9 | | 2.268 | (ASP) | 0.390 | | | | |
| 10 | Lens 4 | −2.616 | (ASP) | 0.332 | Plastic | 1.669 | 19.5 | −54.06 |
| 11 | | −2.963 | (ASP) | 0.032 | | | | |
| 12 | Lens 5 | 1.426 | (ASP) | 0.366 | Plastic | 1.544 | 56.0 | 6.65 |
| 13 | | 2.140 | (ASP) | 0.549 | | | | |
| 14 | Lens 6 | 3.428 | (ASP) | 0.340 | Plastic | 1.534 | 55.9 | −4.19 |
| 15 | | 1.307 | (ASP) | 0.400 | | | | |
| 16 | Filter | Plano | | 0.210 | Glass | 1.517 | 64.2 | — |
| 17 | | Plano | | 0.284 | | | | |
| 18 | Image | Plano | | — | | | | |

Note:
Reference wavelength is 587.6 nm (d-line).
An effective radius of the stop 601 (Surface 1) is 0.880 mm.
An effective radius of the stop 602 (Surface 5) is 0.845 mm.

TABLE 12

Aspheric Coefficients

| Surface # | 3 | 4 | 6 | 7 | 8 | 9 |
|---|---|---|---|---|---|---|
| k = | −8.1564E+00 | −9.9000E+01 | −8.8922E+01 | 7.5624E+00 | −1.5157E+00 | −4.1931E+00 |
| A4 = | 4.6804E−02 | 1.6874E−01 | 7.4019E−01 | 2.2713E−01 | −2.9032E−01 | −1.3040E−01 |
| A6 = | 1.1788E−01 | −1.3618E+00 | −2.3959E+00 | −1.2723E−03 | −3.1681E−02 | −3.7235E−01 |
| A8 = | −1.3316E+00 | 1.4934E+00 | 4.0362E+00 | −1.0774E+00 | 8.7968E−01 | 1.1992E+00 |
| A10 = | 4.4482E+00 | 2.3464E+00 | −3.2965E+00 | 2.5331E+00 | −1.8801E+00 | −1.8751E+00 |
| A12 = | −8.1313E+00 | −7.4345E+00 | 1.0637E+00 | −2.4108E+00 | 1.7945E+00 | 1.5920E+00 |
| A14 = | 7.6364E+00 | 6.9179E+00 | 2.1623E−02 | 8.7741E−01 | −6.5939E−01 | −6.7849E−01 |
| A16 = | −2.8954E+00 | −2.2786E+00 | — | — | — | 1.1961E−01 |

| Surface # | 10 | 11 | 12 | 13 | 14 | 15 |
|---|---|---|---|---|---|---|
| k = | −1.6522E+00 | −4.7054E+00 | −9.5631E−01 | −2.4426E+01 | 4.5968E−01 | −1.1723E+00 |
| A4 = | 5.5095E−01 | 4.3211E−01 | −5.3205E−02 | 1.6569E−01 | −4.3845E−01 | −4.7783E−01 |
| A6 = | −8.8537E−01 | −8.7255E−01 | −2.8624E−01 | −2.9993E−01 | 2.3808E−01 | 3.8213E−01 |
| A8 = | 6.0388E−01 | 9.8081E−01 | 4.9075E−01 | 2.5254E−01 | −9.6969E−02 | −2.4748E−01 |
| A10 = | 1.7888E−01 | −6.1620E−01 | −5.7298E−01 | −1.6438E−01 | 5.1229E−02 | 1.1696E−01 |
| A12 = | −6.9275E−01 | 1.4737E−01 | 4.4690E−01 | 7.9295E−02 | −2.4346E−02 | −3.7041E−02 |
| A14 = | 4.3297E−01 | 2.5897E−02 | −2.2520E−01 | −2.5171E−02 | 7.3133E−03 | 7.4859E−03 |
| A16 = | −8.3693E−02 | −1.7314E−02 | 6.8983E−02 | 4.7966E−03 | −1.2742E−03 | −9.2050E−04 |
| A18 = | — | 1.8907E−03 | −1.1462E−02 | −4.8843E−04 | 1.1873E−04 | 6.2608E−05 |
| A20 = | — | — | 7.8257E−04 | 2.0062E−05 | −4.5954E−06 | −1.8031E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 3.67 | TD/CT1 | 4.08 |
| Fno | 2.30 | TL/f | 1.22 |
| HFOV [deg.] | 40.9 | TL/ImgH | 1.37 |
| Nmax | 1.669 | (R1 + R2)/(R1 − R2) | −0.22 |
| (Vi/Ni)min | 11.65 | R10/R9 | 1.50 |
| V2 + V3 + V4 | 67.1 | Σ|f/fi| | 3.80 |
| Vmin | 19.5 | |f/f3| + |f/f4| | 0.10 |
| ΣCT/ΣAT | 1.92 | f/R1 | 1.77 |
| CT1/CT2 | 4.20 | EPD/CT1 | 1.84 |
| CT1/CT5 | 2.41 | ET1/ET2 | 1.90 |
| CT1/(CT2 + CT3) | 1.98 | Y11/CT1 | 0.93 |
| CT1/(CT2 + T23 + CT3) | 1.31 | Y11/ET1 | 1.33 |
| CT1/ET1 | 1.44 | Y62/Y11 | 2.98 |
| (CT5 + CT6)/T56 | 1.29 | Yc51/Yc52 | 0.96 |
| CT5/CT4 | 1.10 | Yc62/Y62 | 0.38 |

7th Embodiment

Figure 13:
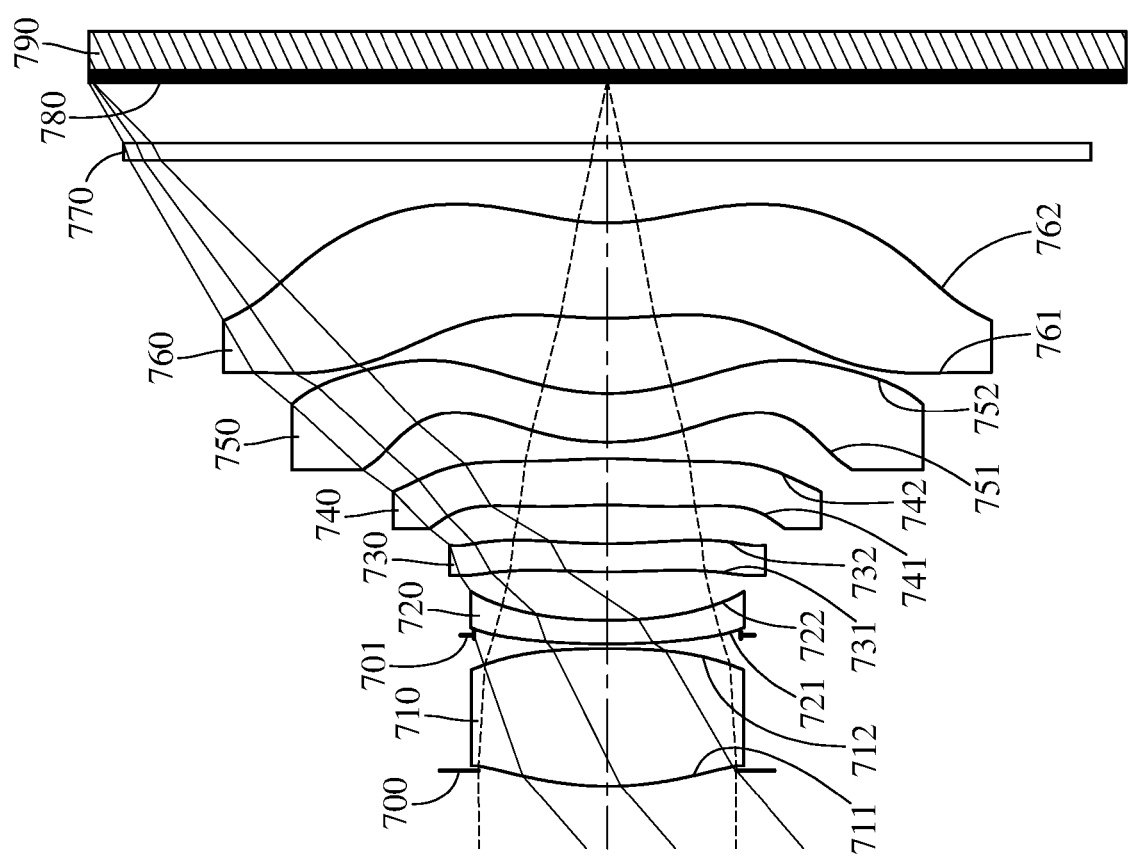
FIG. 13 is a schematic view of an image capturing unit according to the 7th embodiment of the present disclosure.
Figure 14:
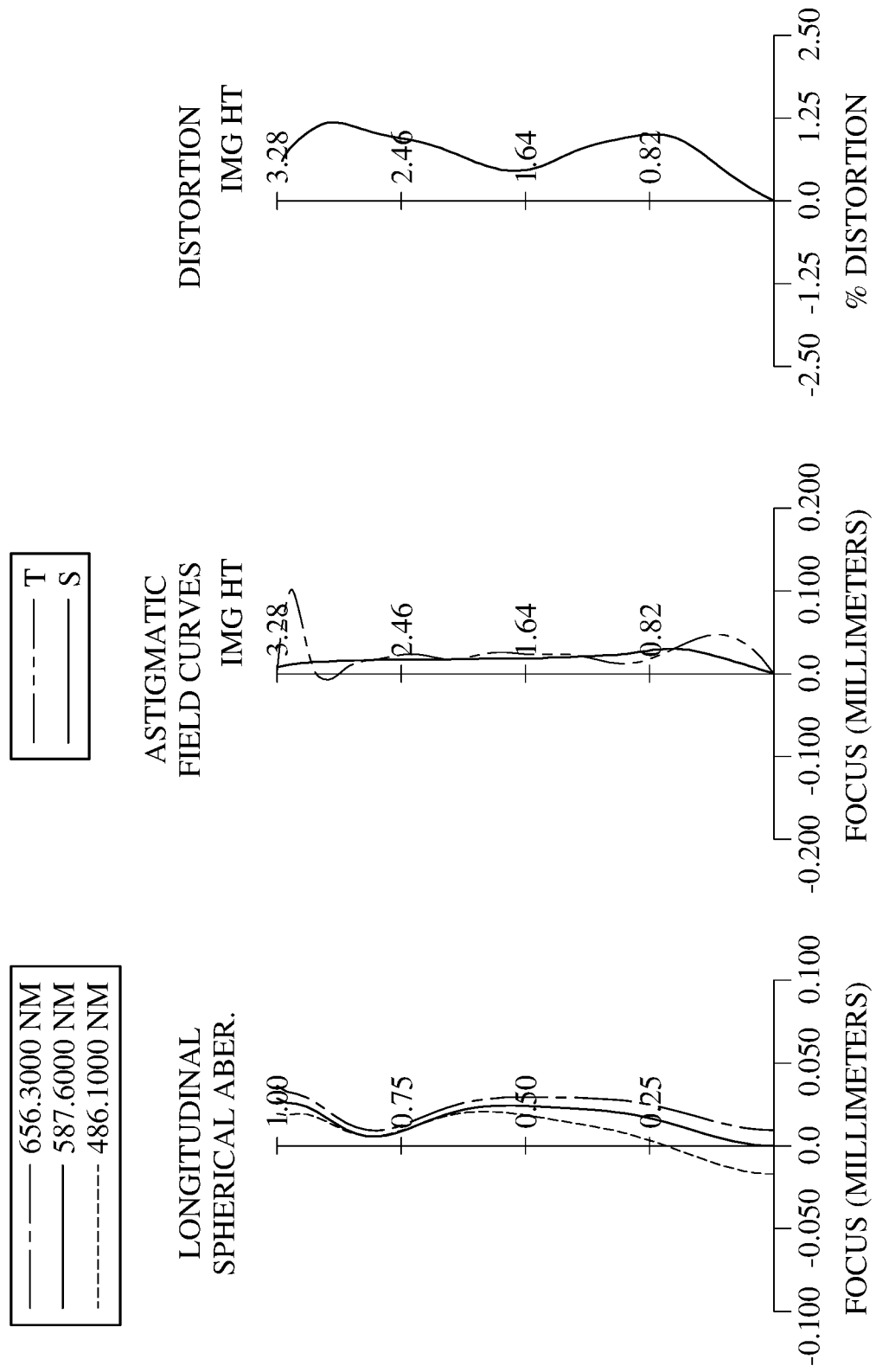
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing optical lens system (its reference numeral is omitted) of the present disclosure and an image sensor 790. The photographing optical lens system includes, in order from an object side to an image side, an aperture stop 700, a first lens element 710, a stop 701, a second lens element 720, a third lens element 730, a fourth lens element 740, a fifth lens element 750, a sixth lens element 760, a filter 770 and an image surface 780. The photographing optical lens system includes six lens elements (710, 720, 730, 740, 750 and 760) with no additional lens element disposed between each of the adjacent six lens elements.

The first lens element 710 with positive refractive power has an object-side surface 711 being convex in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has one inflection point.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric. The object-side surface 731 of the third lens element 730 has two inflection points. The image-side surface 732 of the third lens element 730 has two inflection points. The object-side surface 731 of the third lens element 730 has two critical points in an off-axis region thereof. The image-side surface 732 of the third lens element 730 has two critical points in an off-axis region thereof.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric. The object-side surface 741 of the fourth lens element 740 has three inflection points. The image-side surface 742 of the fourth lens element 740 has four inflection points. The object-side surface 741 of the fourth lens element 740 has two critical points in an off-axis region thereof.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The object-side surface 751 of the fifth lens element 750 has three inflection points. The image-side surface 752 of the fifth lens element 750 has one inflection point. The object-side surface 751 of the fifth lens element 750 has one critical point in an off-axis region thereof. The image-side surface 752 of the fifth lens element 750 has one critical point in an off-axis region thereof.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The object-side surface 761 of the sixth lens element 760 has three inflection points. The image-side surface 762 of the sixth lens element 760 has three inflection points. The object-side surface 761 of the sixth lens element 760 has three critical points in an off-axis region thereof. The image-side surface 762 of the sixth lens element 760 has one critical point in an off-axis region thereof.

The filter 770 is made of glass material and located between the sixth lens element 760 and the image surface 780, and will not affect the focal length of the photographing optical lens system. The image sensor 790 is disposed on or near the image surface 780 of the photographing optical lens system.

In this embodiment, an Abbe number of the i-th lens element is $V_i$, a refractive index of the i-th lens element is $N_i$, a minimum value of $V_i/N_i$ is $(V_i/N_i)min$, and $(V_i/N_i)min$ is equal to $V_2/N_2$, $V_3/N_3$ and $V_4/N_4$. In addition, an Abbe number of the second lens element 720 is $V_2$, an Abbe number of the third lens element 730 is $V_3$, an Abbe number of the fourth lens element 740 is $V_4$, a refractive index of the second lens element 720 is $N_2$, a refractive index of the third lens element 730 is $N_3$, and a refractive index of the fourth lens element 740 is $N_4$.

The detailed optical data of the 7th embodiment are shown in Table 13 and the aspheric surface data are shown in Table 14 below.

TABLE 13

7th Embodiment
f = 3.71 mm, Fno = 2.30, HFOV = 40.8 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.100 | | | | |
| 2 | Lens 1 | 2.087 | (ASP) | 0.878 | Plastic | 1.525 | 58.1 | 3.02 |
| 3 | | −5.679 | (ASP) | 0.085 | | | | |
| 4 | Stop | Plano | | −0.055 | | | | |
| 5 | Lens 2 | 5.810 | (ASP) | 0.150 | Plastic | 1.679 | 18.4 | −10.00 |
| 6 | | 3.099 | (ASP) | 0.309 | | | | |
| 7 | Lens 3 | 4.933 | (ASP) | 0.180 | Plastic | 1.679 | 18.4 | −34.21 |
| 8 | | 4.009 | (ASP) | 0.246 | | | | |
| 9 | Lens 4 | −3.443 | (ASP) | 0.296 | Plastic | 1.679 | 18.4 | 15.96 |
| 10 | | −2.704 | (ASP) | 0.105 | | | | |
| 11 | Lens 5 | 1.542 | (ASP) | 0.314 | Plastic | 1.562 | 44.6 | −123.02 |
| 12 | | 1.398 | (ASP) | 0.480 | | | | |
| 13 | Lens 6 | 2.814 | (ASP) | 0.607 | Plastic | 1.544 | 56.0 | −6.67 |
| 14 | | 1.465 | (ASP) | 0.400 | | | | |
| 15 | Filter | Plano | | 0.110 | Glass | 1.517 | 64.2 | — |
| 16 | | Plano | | 0.385 | | | | |
| 17 | Image | Plano | | — | | | | |

Note:
Reference wavelength is 587.6 nm (d-line).
An effective radius of the stop 701 (Surface 4) is 0.850 mm.

TABLE 14

Aspheric Coefficients

| Surface # | 2 | 3 | 5 | 6 | 7 | 8 |
|---|---|---|---|---|---|---|
| k = | −7.6376E+00 | −2.4578E+01 | −5.3584E+01 | −5.6143E+00 | 8.1745E+00 | 1.5754E+00 |
| A4 = | 5.4787E−02 | −1.4855E−01 | 9.1149E−02 | 1.1624E−01 | −2.3834E−01 | −4.3388E−02 |
| A6 = | −4.9341E−02 | −1.4496E−01 | 1.7402E−01 | 3.4257E−01 | −3.7007E−01 | −9.4347E−01 |
| A8 = | −4.8127E−01 | 8.0611E−01 | −1.4360E+00 | −1.7050E+00 | 2.0460E+00 | 2.6861E+00 |
| A10 = | 2.1290E+00 | −2.5979E+00 | 3.3863E+00 | 3.2058E+00 | −3.9968E+00 | −4.0359E+00 |
| A12 = | −4.5598E+00 | 5.2810E+00 | −3.2494E+00 | −2.6959E+00 | 3.6833E+00 | 3.1619E+00 |
| A14 = | 4.7228E+00 | −5.4718E+00 | 1.1537E+00 | 8.9358E−01 | −1.2547E+00 | −1.0756E+00 |
| A16 = | −1.9074E+00 | 2.1868E+00 | — | — | — | 1.1068E−01 |

| Surface # | 9 | 10 | 11 | 12 | 13 | 14 |
|---|---|---|---|---|---|---|
| k = | 2.5683E+00 | −7.0083E+01 | −6.3689E−01 | −1.4145E+01 | −5.9193E−01 | −1.0016E+00 |
| A4 = | 8.1402E−01 | 5.2875E−01 | 1.2459E−01 | 1.7108E−01 | −4.1473E−01 | −3.7540E−01 |
| A6 = | −2.0134E+00 | −1.5508E+00 | −8.8033E−01 | −2.3113E−01 | 2.2624E−01 | 2.5386E−01 |

TABLE 14-continued

| Aspheric Coefficients | | | | | | |
|---|---|---|---|---|---|---|
| A8 = | 2.9474E+00 | 2.4115E+00 | 1.6732E+00 | 5.2710E−02 | −7.7966E−02 | −1.4545E−01 |
| A10 = | −2.5631E+00 | −2.2816E+00 | −2.2670E+00 | 4.8024E−02 | 2.6306E−02 | 5.8206E−02 |
| A12 = | 9.6960E−01 | 1.2285E+00 | 2.0145E+00 | −3.9503E−02 | −8.3982E−03 | −1.4598E−02 |
| A14 = | −2.9465E−03 | −3.4702E−01 | −1.1329E+00 | 1.3373E−02 | 1.8815E−03 | 2.0799E−03 |
| A16 = | −5.6337E−02 | 4.4397E−02 | 3.8488E−01 | −2.4533E−03 | −2.5169E−04 | −1.3647E−04 |
| A18 = | — | −1.8947E−03 | −7.1280E−02 | 2.3768E−04 | 1.7869E−05 | 4.3110E−07 |
| A20 = | — | — | 5.4723E−03 | −9.4866E−06 | −5.1639E−07 | 2.5832E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 3.71 | TD/CT1 | 4.09 |
| Fno | 2.30 | TL/f | 1.21 |
| HFOV [deg.] | 40.8 | TL/ImgH | 1.37 |
| Nmax | 1.679 | (R1 + R2)/(R1 − R2) | −0.46 |
| (Vi/Ni)min | 10.98 | R10/R9 | 0.91 |
| V2 + V3 + V4 | 55.3 | Σ|f/fi| | 2.52 |
| Vmin | 18.4 | |f/f3| + |f/f4| | 0.34 |
| ΣCT/ΣAT | 2.07 | f/R1 | 1.78 |
| CT1/CT2 | 5.85 | EPD/CT1 | 1.87 |
| CT1/CT5 | 2.80 | ET1/ET2 | 2.62 |
| CT1/(CT2 + CT3) | 2.66 | Y11/CT1 | 0.94 |
| CT1/(CT2 + T23 + CT3) | 1.37 | Y11/ET1 | 1.35 |
| CT1/ET1 | 1.44 | Y62/Y11 | 2.97 |
| (CT5 + CT6)/T56 | 1.92 | Yc51/Yc52 | 0.84 |
| CT5/CT4 | 1.06 | Yc62/Y62 | 0.39 |

8th Embodiment

Figure 15:
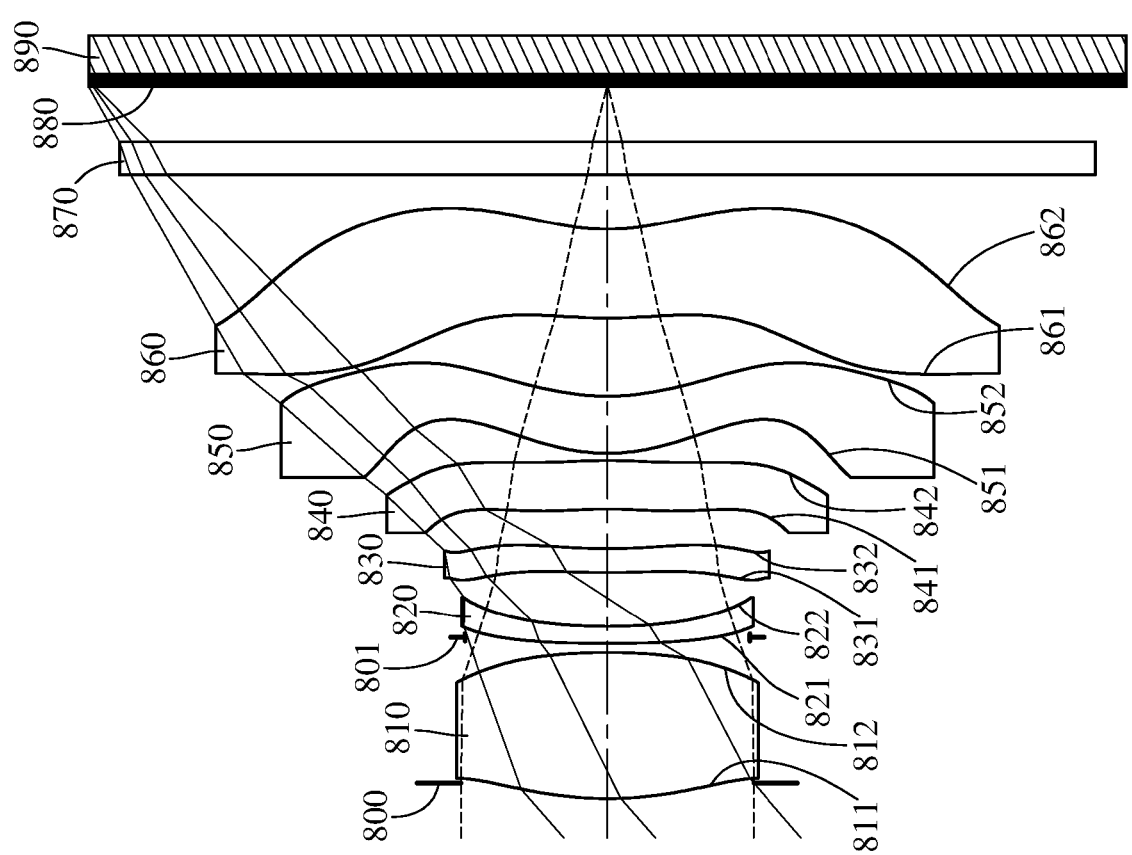
FIG. 15 is a schematic view of an image capturing unit according to the 8th embodiment of the present disclosure.
Figure 16:
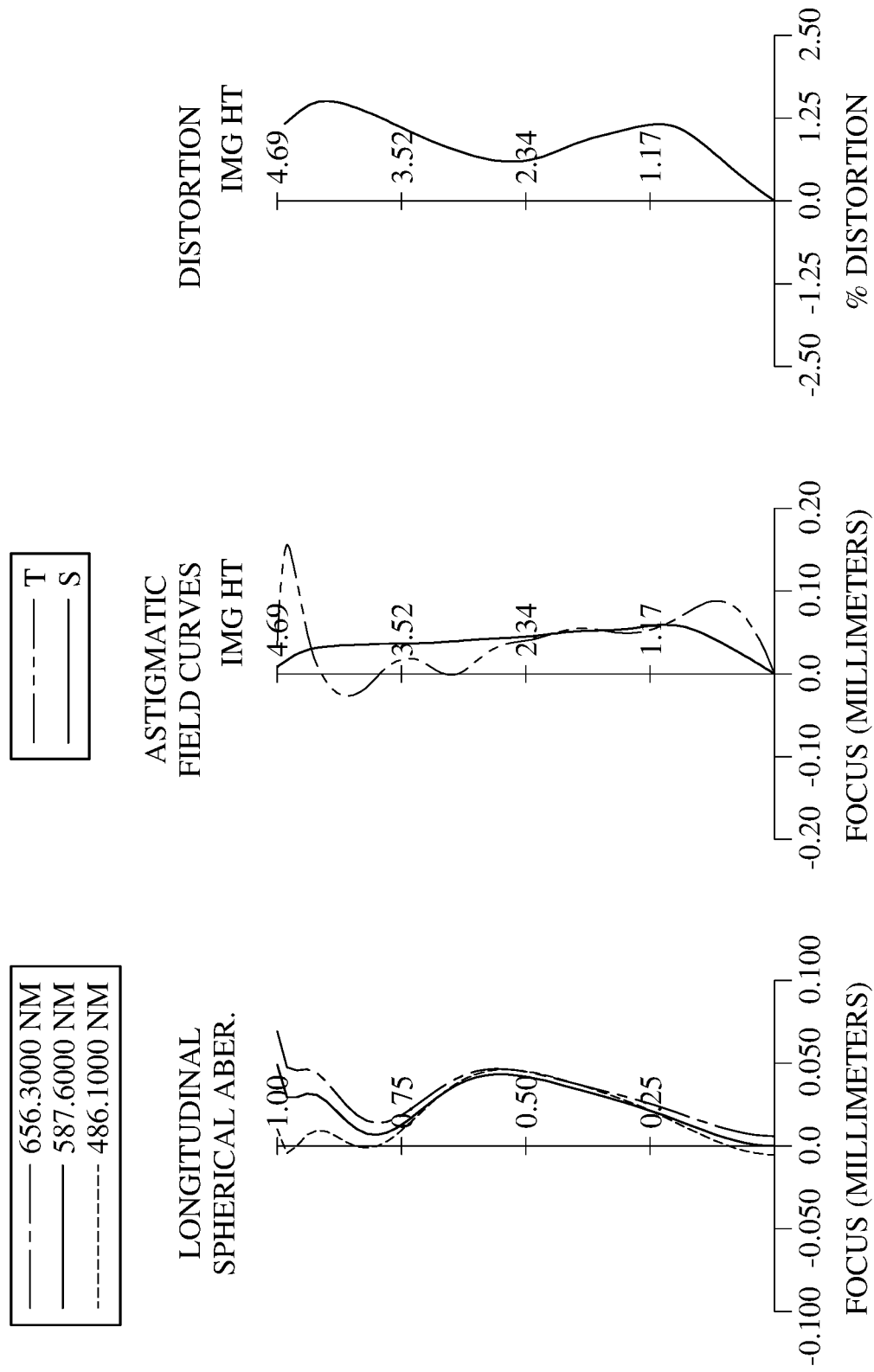
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing optical lens system (its reference numeral is omitted) of the present disclosure and an image sensor 890. The photographing optical lens system includes, in order from an object side to an image side, an aperture stop 800, a first lens element 810, a stop 801, a second lens element 820, a third lens element 830, a fourth lens element 840, a fifth lens element 850, a sixth lens element 860, a filter 870 and an image surface 880. The photographing optical lens system includes six lens elements (810, 820, 830, 840, 850 and 860) with no additional lens element disposed between each of the adjacent six lens elements.

The first lens element 810 with positive refractive power has an object-side surface 811 being convex in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has one inflection point.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric. The object-side surface 831 of the third lens element 830 has two inflection points. The image-side surface 832 of the third lens element 830 has two inflection points. The object-side surface 831 of the third lens element 830 has two critical points in an off-axis region thereof. The image-side surface 832 of the third lens element 830 has two critical points in an off-axis region thereof.

The fourth lens element 840 with negative refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric. The object-side surface 841 of the fourth lens element 840 has two inflection points. The image-side surface 842 of the fourth lens element 840 has two inflection points. The object-side surface 841 of the fourth lens element 840 has two critical points in an off-axis region thereof. The image-side surface 842 of the fourth lens element 840 has two critical points in an off-axis region thereof.

The fifth lens element 850 with positive refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The object-side surface 851 of the fifth lens element 850 has two inflection points. The image-side surface 852 of the fifth lens element 850 has one inflection point. The object-side surface 851 of the fifth lens element 850 has one critical point in an off-axis region thereof. The image-side surface 852 of the fifth lens element 850 has one critical point in an off-axis region thereof.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The object-side surface 861 of the sixth lens element 860 has three inflection points. The image-side surface 862 of the sixth lens element 860 has two inflection points. The object-side surface 861 of the sixth lens element 860 has two critical points in an off-axis region thereof. The image-side surface 862 of the sixth lens element 860 has one critical point in an off-axis region thereof.

The filter 870 is made of glass material and located between the sixth lens element 860 and the image surface 880, and will not affect the focal length of the photographing optical lens system. The image sensor 890 is disposed on or near the image surface 880 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2 and V4/N4. In addition, an Abbe number of the second lens element 820 is V2, an Abbe number of the fourth lens element 840 is V4, a refractive index of the second lens element 820 is N2, and a refractive index of the fourth lens element 840 is N4.

The detailed optical data of the 8th embodiment are shown in Table 15 and the aspheric surface data are shown in Table 16 below.

TABLE 15

8th Embodiment
f = 5.22 mm, Fno = 1.99, HFOV = 41.0 deg.

| Surface # | | Curvature Radius | | Thickness | Material | Index | Abbe # | Focal Length |
|---|---|---|---|---|---|---|---|---|
| 0 | Object | Plano | | 500.000 | | | | |
| 1 | Ape. Stop | Plano | | −0.143 | | | | |
| 2 | Lens 1 | 3.286 | (ASP) | 1.333 | Plastic | 1.535 | 57.2 | 4.20 |
| 3 | | −6.086 | (ASP) | 0.138 | | | | |
| 4 | Stop | Plano | | −0.055 | | | | |
| 5 | Lens 2 | 14.240 | (ASP) | 0.157 | Plastic | 1.690 | 16.5 | −14.90 |
| 6 | | 5.944 | (ASP) | 0.494 | | | | |
| 7 | Lens 3 | 8.392 | (ASP) | 0.219 | Plastic | 1.614 | 26.0 | −34.13 |
| 8 | | 5.932 | (ASP) | 0.360 | | | | |
| 9 | Lens 4 | −4.045 | (ASP) | 0.443 | Plastic | 1.690 | 16.5 | −174.22 |
| 10 | | −4.373 | (ASP) | 0.066 | | | | |
| 11 | Lens 5 | 1.817 | (ASP) | 0.519 | Plastic | 1.535 | 57.2 | 17.17 |
| 12 | | 2.039 | (ASP) | 0.713 | | | | |
| 13 | Lens 6 | 4.148 | (ASP) | 0.813 | Plastic | 1.535 | 57.2 | −8.20 |
| 14 | | 1.986 | (ASP) | 0.500 | | | | |
| 15 | Filter | Plano | | 0.300 | Glass | 1.517 | 64.2 | — |
| 16 | | Plano | | 0.502 | | | | |
| 17 | Image | Plano | | — | | | | |

Note:
Reference wavelength is 587.6 nm (d-line).
An effective radius of the stop 801 (Surface 4) is 1.297 mm.
An effective radius of the image-side surface 862 (Surface 14) is 3.571 mm.

TABLE 16

Aspheric Coefficients

| Surface # | 2 | 3 | 5 | 6 | 7 | 8 |
|---|---|---|---|---|---|---|
| k = | −7.9274E+00 | −3.0964E+01 | −2.1752E+01 | −8.0473E+00 | −3.1379E+00 | −7.5498E−01 |
| A4 = | 1.3526E−02 | −7.3183E−02 | 1.2913E−02 | 4.0334E−02 | −6.2544E−02 | 1.7234E−02 |
| A6 = | −1.4863E−02 | 5.9026E−02 | 7.9927E−02 | 4.4171E−02 | −1.4580E−01 | −2.3004E−01 |
| A8 = | −4.8826E−03 | −6.4595E−02 | −1.4611E−01 | −8.9044E−02 | 2.8325E−01 | 2.7549E−01 |
| A10 = | 1.8090E−02 | 3.5521E−02 | 1.1720E−01 | 6.3109E−02 | −2.3348E−01 | −1.6857E−01 |
| A12 = | −1.9493E−02 | −4.3888E−03 | −4.2217E−02 | −1.7949E−02 | 9.3015E−02 | 5.0382E−02 |
| A14 = | 8.9273E−03 | −3.1361E−03 | 5.7652E−03 | 1.8460E−03 | −1.3831E−02 | −4.9970E−03 |
| A16 = | −1.5176E−03 | 8.8359E−04 | — | — | — | −1.2779E−04 |

| Surface # | 9 | 10 | 11 | 12 | 13 | 14 |
|---|---|---|---|---|---|---|
| k = | −1.2641E+01 | −9.9000E+01 | −9.0200E−01 | −1.4803E+01 | −5.7790E−01 | −1.0312E+00 |
| A4 = | 2.9150E−01 | 1.5940E−01 | −1.8391E−02 | 4.8287E−02 | −1.3387E−01 | −1.2864E−01 |
| A6 = | −3.4082E−01 | −1.9862E−01 | −8.5083E−02 | −3.0499E−02 | 3.1151E−02 | 4.1449E−02 |
| A8 = | 2.2426E−01 | 1.2884E−01 | 9.4167E−02 | 3.1190E−03 | −3.1639E−03 | −1.1120E−02 |
| A10 = | −8.9761E−02 | −4.9962E−02 | −6.7790E−02 | 1.5131E−03 | 1.0008E−04 | 2.1655E−03 |
| A12 = | 1.8570E−02 | 1.0527E−02 | 3.0536E−02 | −5.8931E−04 | 9.4033E−06 | −2.8383E−04 |
| A14 = | −1.5636E−03 | −1.0174E−03 | −8.5054E−03 | 9.6374E−05 | −1.2416E−06 | 2.3843E−05 |
| A16 = | 1.9636E−05 | 2.1670E−05 | 1.4100E−03 | −8.5274E−06 | 7.0787E−08 | −1.2194E−06 |
| A18 = | — | 1.2282E−06 | −1.2624E−04 | 3.9532E−07 | −2.3568E−09 | 3.4513E−08 |
| A20 = | — | — | 4.6673E−06 | −7.4847E−09 | 3.5647E−11 | −4.1571E−10 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.22 | TD/CT1 | 3.90 |
| Fno | 1.99 | TL/f | 1.25 |
| HFOV [deg.] | 41.0 | TL/ImgH | 1.39 |
| Nmax | 1.690 | (R1 + R2)/(R1 − R2) | −0.30 |
| (Vi/Ni)min | 9.76 | R10/R9 | 1.12 |
| V2 + V3 + V4 | 59.0 | Σ|f/fi| | 2.72 |
| Vmin | 16.5 | |f/f3| + |f/f4| | 0.18 |
| ΣCT/ΣAT | 2.03 | f/R1 | 1.59 |
| CT1/CT2 | 8.49 | EPD/CT1 | 2.00 |
| CT1/CT5 | 2.57 | ET1/ET2 | 3.28 |
| CT1/(CT2 + CT3) | 3.55 | Y11/CT1 | 1.00 |
| CT1/(CT2 + T23 + CT3) | 1.53 | Y11/ET1 | 1.54 |
| CT1/ET1 | 1.53 | Y62/Y11 | 2.67 |
| (CT5 + CT6)/T56 | 1.87 | Yc51/Yc52 | 0.84 |
| CT5/CT4 | 1.17 | Yc62/Y62 | 0.40 |

9th Embodiment

Figure 17:
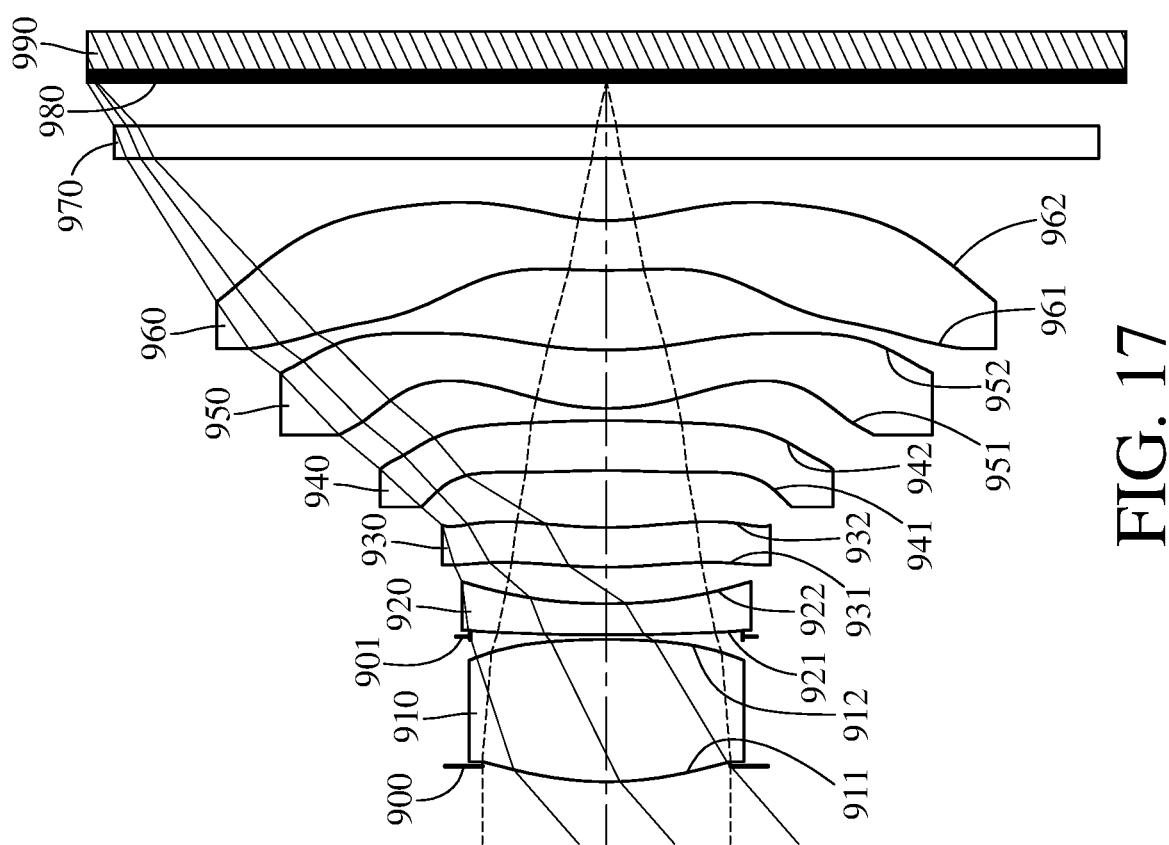
FIG. 17 is a schematic view of an image capturing unit according to the 9th embodiment of the present disclosure.
Figure 18:
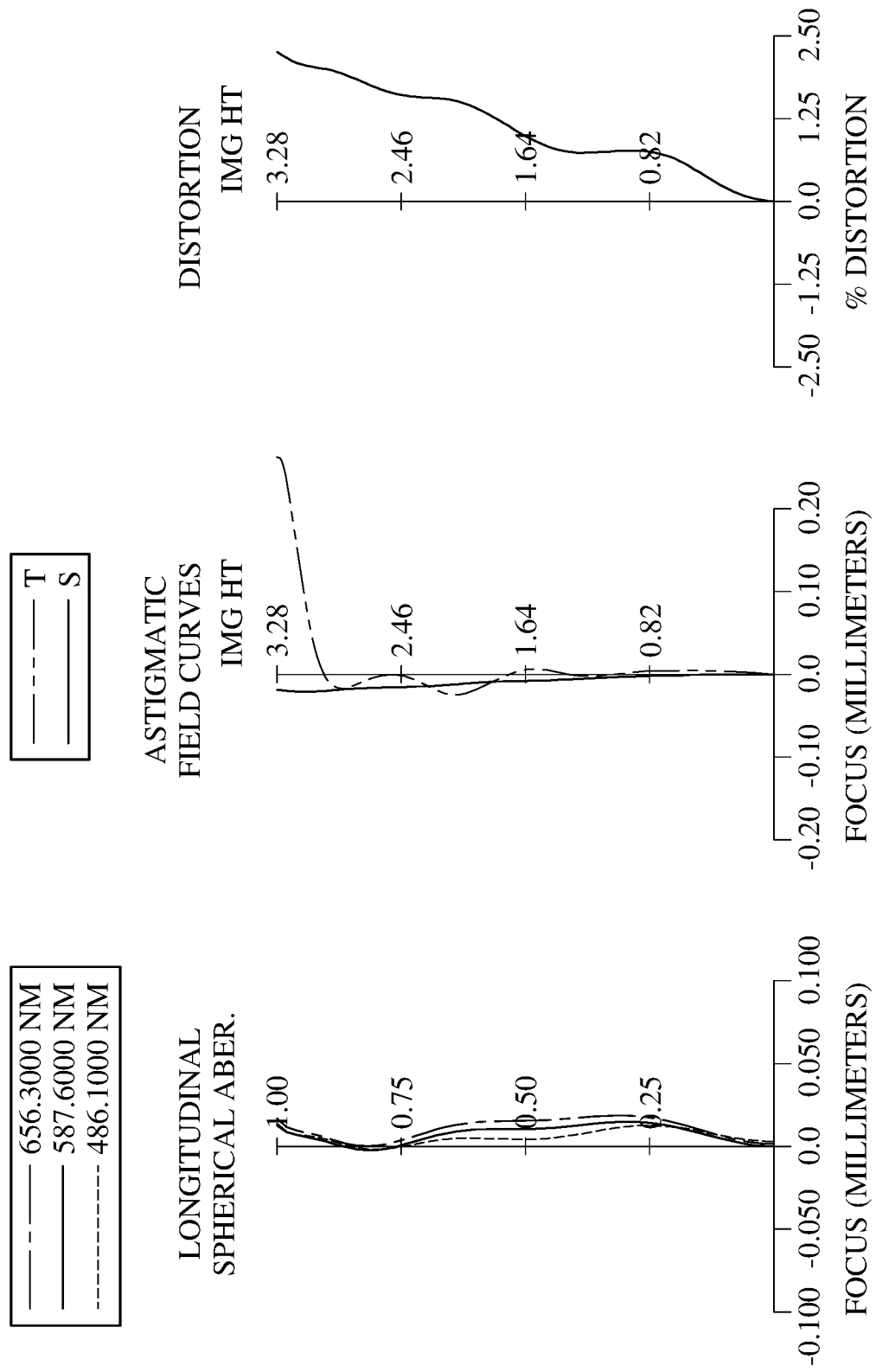
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing optical lens system (its reference numeral is omitted) of the present disclosure and an image sensor 990. The photographing optical lens system includes, in order from an object side to an image side, an aperture stop 900, a first lens element 910, a stop 901, a second lens element 920, a third lens element 930, a fourth lens element 940, a fifth lens element 950, a sixth lens element 960, a filter 970 and an image surface 980. The photographing optical lens system includes six lens elements (910, 920, 930, 940, 950 and 960) with no additional lens element disposed between each of the adjacent six lens elements.

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric. The object-side surface 911 of the first lens element 910 has one inflection point.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has three inflection points. The image-side surface 922 of the second lens element 920 has one inflection point. The object-side surface 921 of the second lens element 920 has one critical point in an off-axis region thereof.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric. The object-side surface 931 of the third lens element 930 has three inflection points. The image-side surface 932 of the third lens element 930 has two inflection points. The object-side surface 931 of the third lens element 930 has one critical point in an off-axis region thereof. The image-side surface 932 of the third lens element 930 has two critical points in an off-axis region thereof.

The fourth lens element 940 with negative refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric. The object-side surface 941 of the fourth lens element 940 has three inflection points. The image-side surface 942 of the fourth lens element 940 has two inflection points.

The fifth lens element 950 with positive refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The object-side surface 951 of the fifth lens element 950 has three inflection points. The image-side surface 952 of the fifth lens element 950 has three inflection points. The object-side surface 951 of the fifth lens element 950 has one critical point in an off-axis region thereof. The image-side surface 952 of the fifth lens element 950 has one critical point in an off-axis region thereof.

The sixth lens element 960 with negative refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The object-side surface 961 of the sixth lens element 960 has four inflection points. The image-side surface 962 of the sixth lens element 960 has two inflection points. The object-side surface 961 of the sixth lens element 960 has one critical point in an off-axis region thereof. The image-side surface 962 of the sixth lens element 960 has one critical point in an off-axis region thereof.

The filter 970 is made of glass material and located between the sixth lens element 960 and the image surface 980, and will not affect the focal length of the photographing optical lens system. The image sensor 990 is disposed on or near the image surface 980 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2. In addition, an Abbe number of the second lens element 920 is V2, and a refractive index of the second lens element 920 is N2.

The detailed optical data of the 9th embodiment are shown in Table 17 and the aspheric surface data are shown in Table 18 below.

TABLE 17

9th Embodiment
f = 3.61 mm, Fno = 2.31, HFOV = 41.1 deg.

| Surface # | | Curvature Radius | | Thickness | Material | Index | Abbe # | Focal Length |
|---|---|---|---|---|---|---|---|---|
| 0 | Object | Plano | | 350.000 | | | | |
| 1 | Ape. Stop | Plano | | −0.100 | | | | |
| 2 | Lens 1 | 2.152 | (ASP) | 0.914 | Plastic | 1.545 | 55.9 | 2.69 |
| 3 | | −3.905 | (ASP) | 0.019 | | | | |
| 4 | Stop | Plano | | 0.011 | | | | |
| 5 | Lens 2 | −42.595 | (ASP) | 0.200 | Plastic | 1.669 | 19.5 | −5.19 |
| 6 | | 3.784 | (ASP) | 0.234 | | | | |
| 7 | Lens 3 | 2.937 | (ASP) | 0.255 | Plastic | 1.587 | 28.3 | −120.86 |
| 8 | | 2.730 | (ASP) | 0.366 | | | | |
| 9 | Lens 4 | −4.935 | (ASP) | 0.321 | Plastic | 1.587 | 28.3 | −108.90 |
| 10 | | −5.476 | (ASP) | 0.077 | | | | |
| 11 | Lens 5 | 1.480 | (ASP) | 0.376 | Plastic | 1.544 | 56.0 | 5.01 |
| 12 | | 2.946 | (ASP) | 0.511 | | | | |
| 13 | Lens 6 | 4.296 | (ASP) | 0.319 | Plastic | 1.534 | 55.9 | −3.54 |
| 14 | | 1.277 | (ASP) | 0.400 | | | | |
| 15 | Filter | Plano | | 0.210 | Glass | 1.517 | 64.2 | — |
| 16 | | Plano | | 0.277 | | | | |
| 17 | Image | Plano | | — | | | | |

Note:
Reference wavelength is 587.6 nm (d-line).
An effective radius of the stop 901 (Surface 4) is 0.875 mm.

TABLE 18

Aspheric Coefficients

| Surface # | 2 | 3 | 5 | 6 | 7 | 8 |
|---|---|---|---|---|---|---|
| k = | −8.0822E+00 | −9.5221E+01 | −8.7180E+01 | −2.7261E+01 | 1.8646E−01 | −6.9897E+00 |
| A4 = | 4.2379E−02 | 1.4055E−01 | 4.7771E−01 | 1.8292E−01 | −3.2132E−01 | −2.0633E−01 |
| A6 = | 1.6221E−01 | −1.4389E+00 | −1.7850E+00 | −4.3279E−02 | 2.5906E−01 | 2.7187E−02 |
| A8 = | −1.3804E+00 | 2.5674E+00 | 2.7828E+00 | −8.5678E−02 | −1.3373E−01 | −4.4755E−02 |
| A10 = | 4.3719E+00 | −9.0083E−01 | −1.4939E+00 | 1.9530E+00 | 3.0948E−01 | 4.3468E−01 |
| A12 = | −7.7132E+00 | −2.4296E+00 | −3.9518E−01 | −1.6782E+00 | −1.2328E+00 | −9.3693E−01 |
| A14 = | 7.1408E+00 | 2.8798E+00 | 4.7969E−01 | 5.0489E−01 | 1.6131E+00 | 7.8127E−01 |
| A16 = | −2.7206E+00 | −9.3858E−01 | — | — | −6.5658E−01 | −2.0524E−01 |

| Surface # | 9 | 10 | 11 | 12 | 13 | 14 |
|---|---|---|---|---|---|---|
| k = | 8.6353E+00 | 7.3813E+00 | −4.2135E−01 | −2.4023E+01 | 7.6475E−01 | −1.3857E+00 |
| A4 = | 3.5477E−01 | 2.2456E−01 | −4.0434E−02 | 2.2008E−01 | −3.9677E−01 | −4.7220E−01 |
| A6 = | −3.7288E−01 | −4.2423E−01 | −4.5871E−01 | −5.9557E−01 | 1.9919E−03 | 3.2706E−01 |
| A8 = | −4.0136E−01 | 2.8418E−01 | 6.3433E−01 | 6.2324E−01 | 2.7045E−01 | −1.4410E−01 |
| A10 = | 1.4491E+00 | 1.7858E−01 | −5.2801E−01 | −3.6590E−01 | −1.9815E−01 | 4.4384E−02 |
| A12 = | −1.6882E+00 | −4.9752E−01 | 3.0855E−01 | 1.3304E−01 | 6.9640E−02 | −1.0133E−02 |
| A14 = | 8.5675E−01 | 3.5865E−01 | −1.3663E−01 | −3.0872E−02 | −1.4045E−02 | 1.6859E−03 |
| A16 = | −1.5610E−01 | −1.1023E−01 | 4.2701E−02 | 4.4545E−03 | 1.6606E−03 | −1.8903E−04 |
| A18 = | — | 1.2349E−02 | −7.8057E−03 | −3.6171E−04 | −1.0716E−04 | 1.2486E−05 |
| A20 = | — | — | 6.0057E−04 | 1.2461E−05 | 2.9120E−06 | −3.6169E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 3.61 | TD/CT1 | 3.94 |
| Fno | 2.31 | TL/f | 1.24 |
| HFOV [deg.] | 41.1 | TL/ImgH | 1.37 |
| Nmax | 1.669 | (R1 + R2)/(R1 − R2) | −0.29 |

-continued

| 9th Embodiment | | | |
|---|---|---|---|
| (Vi/Ni)min | 11.65 | R10/R9 | 1.99 |
| V2 + V3 + V4 | 76.1 | Σ|f/fi| | 3.85 |
| Vmin | 19.5 | |f/f3| + |f/f4| | 0.06 |
| ΣCT/ΣAT | 1.96 | f/R1 | 1.68 |
| CT1/CT2 | 4.57 | EPD/CT1 | 1.74 |
| CT1/CT5 | 2.43 | ET1/ET2 | 2.08 |
| CT1/(CT2 + CT3) | 2.01 | Y11/CT1 | 0.88 |
| CT1/(CT2 + T23 + CT3) | 1.33 | Y11/ET1 | 1.24 |
| CT1/ET1 | 1.41 | Y62/Y11 | 3.11 |
| (CT5 + CT6)/T56 | 1.36 | Yc51/Yc52 | 0.84 |
| CT5/CT4 | 1.17 | Yc62/Y62 | 0.37 |

10th Embodiment

Figure 19:
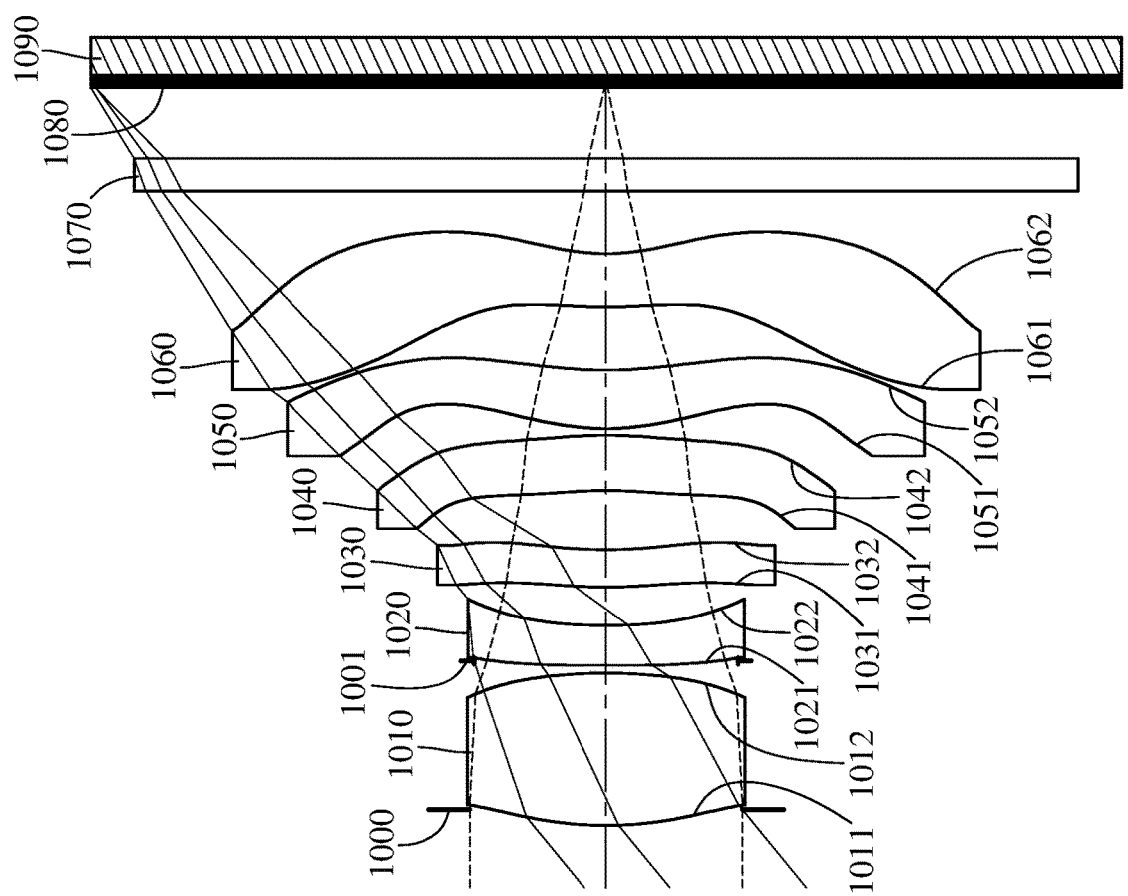
FIG. 19 is a schematic view of an image capturing unit according to the 10th embodiment of the present disclosure.
Figure 20:
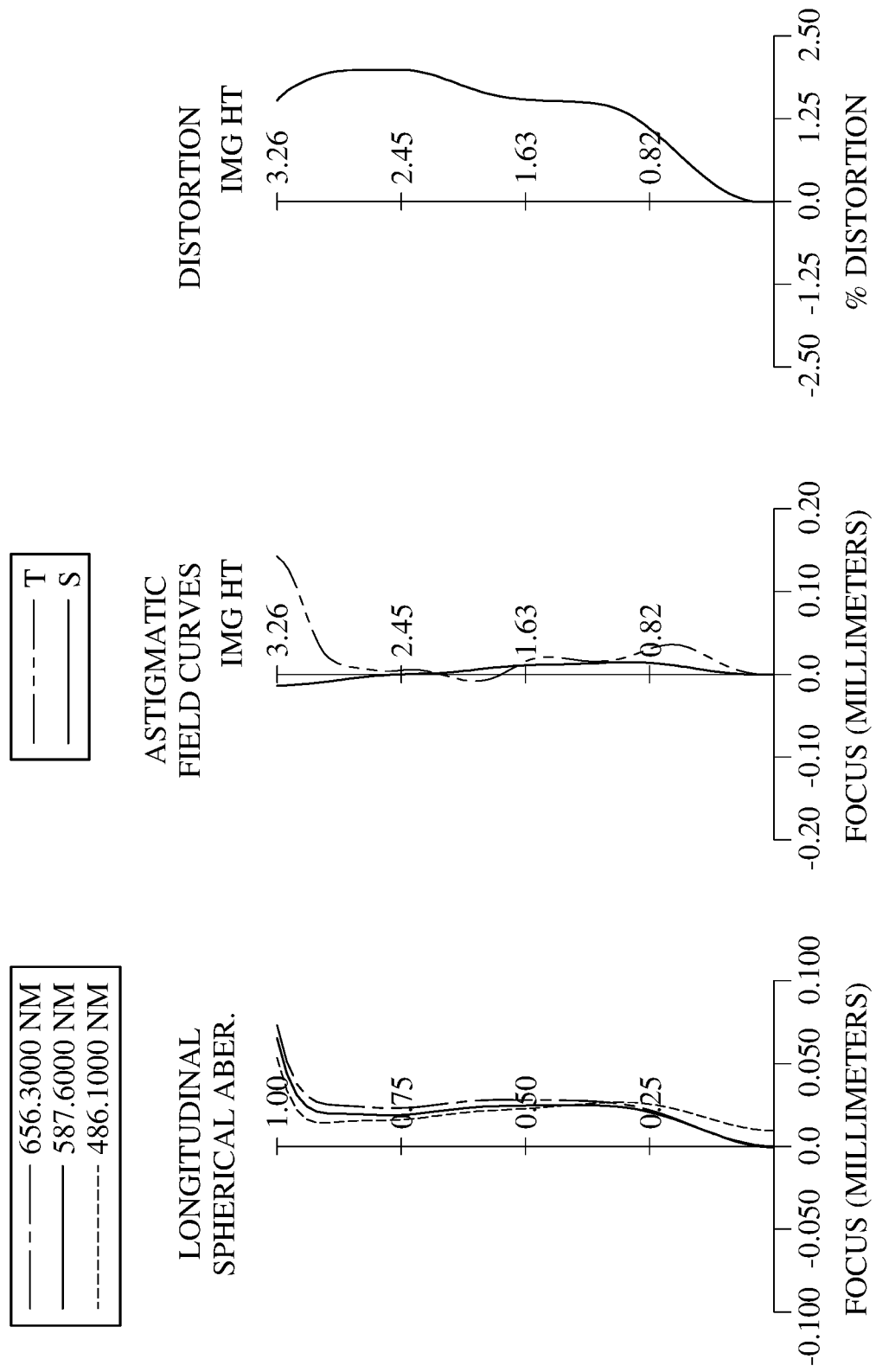
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing optical lens system (its reference numeral is omitted) of the present disclosure and an image sensor 1090. The photographing optical lens system includes, in order from an object side to an image side, an aperture stop 1000, a first lens element 1010, a stop 1001, a second lens element 1020, a third lens element 1030, a fourth lens element 1040, a fifth lens element 1050, a sixth lens element 1060, a filter 1070 and an image surface 1080. The photographing optical lens system includes six lens elements (1010, 1020, 1030, 1040, 1050 and 1060) with no additional lens element disposed between each of the adjacent six lens elements.

The first lens element 1010 with positive refractive power has an object-side surface 1011 being convex in a paraxial region thereof and an image-side surface 1012 being convex in a paraxial region thereof. The first lens element 1010 is made of plastic material and has the object-side surface 1011 and the image-side surface 1012 being both aspheric. The object-side surface 1011 of the first lens element 1010 has one inflection point.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has one inflection point. The object-side surface 1021 of the second lens element 1020 has one critical point in an off-axis region thereof.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric. The object-side surface 1031 of the third lens element 1030 has two inflection points. The image-side surface 1032 of the third lens element 1030 has two inflection points. The object-side surface 1031 of the third lens element 1030 has one critical point in an off-axis region thereof. The image-side surface 1032 of the third lens element 1030 has two critical points in an off-axis region thereof.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric. The object-side surface 1041 of the fourth lens element 1040 has three inflection points. The image-side surface 1042 of the fourth lens element 1040 has two inflection points.

The fifth lens element 1050 with positive refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The object-side surface 1051 of the fifth lens element 1050 has three inflection points. The image-side surface 1052 of the fifth lens element 1050 has one inflection point. The object-side surface 1051 of the fifth lens element 1050 has one critical point in an off-axis region thereof. The image-side surface 1052 of the fifth lens element 1050 has one critical point in an off-axis region thereof.

The sixth lens element 1060 with negative refractive power has an object-side surface 1061 being convex in a paraxial region thereof and an image-side surface 1062 being concave in a paraxial region thereof. The sixth lens element 1060 is made of plastic material and has the object-side surface 1061 and the image-side surface 1062 being both aspheric. The object-side surface 1061 of the sixth lens element 1060 has two inflection points. The image-side surface 1062 of the sixth lens element 1060 has two inflection points. The object-side surface 1061 of the sixth lens element 1060 has one critical point in an off-axis region thereof. The image-side surface 1062 of the sixth lens element 1060 has one critical point in an off-axis region thereof.

The filter 1070 is made of glass material and located between the sixth lens element 1060 and the image surface 1080, and will not affect the focal length of the photographing optical lens system. The image sensor 1090 is disposed on or near the image surface 1080 of the photographing optical lens system.

In this embodiment, an Abbe number of the i-th lens element is Vi, a refractive index of the i-th lens element is Ni, a minimum value of Vi/Ni is (Vi/Ni)min, and (Vi/Ni)min is equal to V2/N2 and V4/N4. In addition, an Abbe number of the second lens element 1020 is V2, an Abbe number of the fourth lens element 1040 is V4, a refractive index of the second lens element 1020 is N2, and a refractive index of the fourth lens element 1040 is N4.

The detailed optical data of the 10th embodiment are shown in Table 19 and the aspheric surface data are shown in Table 20 below.

TABLE 19

10th embodiment
f = 3.87 mm, Fno = 2.25, HFOV = 39.2 deg.

| Surface # |  | Curvature Radius |  | Thickness | Material | Index | Abbe # | Focal Length |
|---|---|---|---|---|---|---|---|---|
| 0 | Object | Plano |  | 400.000 |  |  |  |  |
| 1 | Ape. Stop | Plano |  | −0.100 |  |  |  |  |
| 2 | Lens 1 | 2.278 | (ASP) | 0.974 | Plastic | 1.545 | 56.1 | 2.50 |
| 3 |  | −2.886 | (ASP) | 0.079 |  |  |  |  |
| 4 | Stop | Plano |  | −0.028 |  |  |  |  |
| 5 | Lens 2 | −20.614 | (ASP) | 0.257 | Plastic | 1.669 | 19.5 | −4.86 |
| 6 |  | 3.877 | (ASP) | 0.244 |  |  |  |  |
| 7 | Lens 3 | 3.148 | (ASP) | 0.241 | Plastic | 1.584 | 28.2 | −36.33 |

TABLE 19-continued

10th embodiment
f = 3.87 mm, Fno = 2.25, HFOV = 39.2 deg.

| Surface # | | Curvature Radius | | Thickness | Material | Index | Abbe # | Focal Length |
|---|---|---|---|---|---|---|---|---|
| 8 | | 2.664 | (ASP) | 0.378 | | | | |
| 9 | Lens 4 | −2.580 | (ASP) | 0.356 | Plastic | 1.669 | 19.5 | 146.18 |
| 10 | | −2.652 | (ASP) | 0.041 | | | | |
| 11 | Lens 5 | 1.591 | (ASP) | 0.373 | Plastic | 1.544 | 56.0 | 7.15 |
| 12 | | 2.471 | (ASP) | 0.409 | | | | |
| 13 | Lens 6 | 3.314 | (ASP) | 0.340 | Plastic | 1.534 | 55.9 | −4.14 |
| 14 | | 1.278 | (ASP) | 0.400 | | | | |
| 15 | Filter | Plano | | 0.210 | Glass | 1.517 | 64.2 | — |
| 16 | | Plano | | 0.454 | | | | |
| 17 | Image | Plano | | — | | | | |

Note:
Reference wavelength is 587.6 nm (d-line).
An effective radius of the stop 1001 (Surface 4) is 0.845 mm.

TABLE 20

Aspheric Coefficients

| Surface # | 2 | 3 | 5 | 6 | 7 | 8 |
|---|---|---|---|---|---|---|
| k = | −1.0497E+01 | −6.1365E+01 | −4.5286E+01 | −3.6982E+00 | 2.9089E+00 | −3.9355E+00 |
| A4 = | 5.4899E−02 | −3.7865E−02 | 4.5588E−01 | 1.9834E−01 | −2.6575E−01 | −1.2353E−01 |
| A6 = | −1.3923E−02 | −4.4128E−01 | −1.3834E+00 | −2.2645E−01 | −9.6969E−02 | −3.8233E−01 |
| A8 = | −3.5338E−01 | 4.5018E−01 | 2.6274E+00 | 2.1441E−01 | 8.3135E−01 | 1.0712E+00 |
| A10 = | 9.4858E−01 | 1.0603E+00 | −3.0128E+00 | −1.5057E−01 | −1.4111E+00 | −1.4391E+00 |
| A12 = | −1.3966E+00 | −3.1640E+00 | 2.0125E+00 | 1.0836E−01 | 1.0988E+00 | 1.0345E+00 |
| A14 = | 1.0724E+00 | 3.0920E+00 | −5.7946E−01 | −1.6953E−02 | −3.2153E−01 | −3.4575E−01 |
| A16 = | −3.3953E−01 | −1.0914E+00 | — | — | — | 4.1334E−02 |

| Surface # | 9 | 10 | 11 | 12 | 13 | 14 |
|---|---|---|---|---|---|---|
| k = | −1.3656E+00 | −4.1862E+00 | −8.7086E−01 | −4.3404E+01 | 5.7361E−01 | −1.0270E+00 |
| A4 = | 5.8007E−01 | 3.9948E−01 | −2.3170E−01 | 1.7841E−03 | −4.0063E−01 | −4.3556E−01 |
| A6 = | −1.0727E+00 | −7.0850E−01 | 2.3911E−01 | −6.0440E−03 | 1.5069E−01 | 3.0396E−01 |
| A8 = | 1.0925E+00 | 6.4357E−01 | −3.8765E−01 | −7.3126E−02 | −5.0148E−01 | −1.7108E−01 |
| A10 = | −5.5497E−01 | −2.6033E−01 | 3.6662E−01 | 8.2995E−02 | −9.7713E−04 | 7.3393E−02 |
| A12 = | −8.0327E−02 | −6.6144E−02 | −1.9585E−01 | −4.1545E−02 | −7.2214E−03 | −2.2300E−02 |
| A14 = | 1.8020E−01 | 9.9468E−02 | 5.2623E−02 | 1.1450E−02 | 4.0566E−03 | 4.4878E−03 |
| A16 = | −4.4207E−02 | −3.0673E−02 | −3.7941E−03 | −1.7983E−03 | −9.4247E−04 | −5.6251E−04 |
| A18 = | — | 2.8446E−03 | −1.0112E−03 | 1.5142E−04 | 1.0521E−04 | 3.9670E−05 |
| A20 = | — | — | 1.5646E−04 | −5.3587E−06 | −4.6672E−06 | −1.2011E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 3.87 | TD/CT1 | 3.76 |
| Fno | 2.25 | TL/f | 1.22 |
| HFOV [deg.] | 39.2 | TL/ImgH | 1.45 |
| Nmax | 1.669 | (R1 + R2)/(R1 − R2) | −0.12 |
| (Vi/Ni)min | 11.65 | R10/R9 | 1.55 |
| V2 + V3 + V4 | 67.1 | Σ|f/fi| | 3.95 |
| Vmin | 19.5 | |f/f3| + |f/f4| | 0.13 |
| ΣCT/ΣAT | 2.26 | f/R1 | 1.70 |
| CT1/CT2 | 3.79 | EPD/CT1 | 1.79 |
| CT1/CT5 | 2.61 | ET1/ET2 | 1.82 |
| CT1/(CT2 + CT3) | 1.96 | Y11/CT1 | 0.90 |
| CT1/(CT2 + T23 + CT3) | 1.31 | Y11/ET1 | 1.27 |

-continued

| 10th Embodiment | | | |
|---|---|---|---|
| CT1/ET1 | 1.42 | Y62/Y11 | 2.73 |
| (CT5 + CT6)/T56 | 1.74 | Yc51/Yc52 | 1.04 |
| CT5/CT4 | 1.05 | Yc62/Y62 | 0.42 |

11th Embodiment

Figure 21:
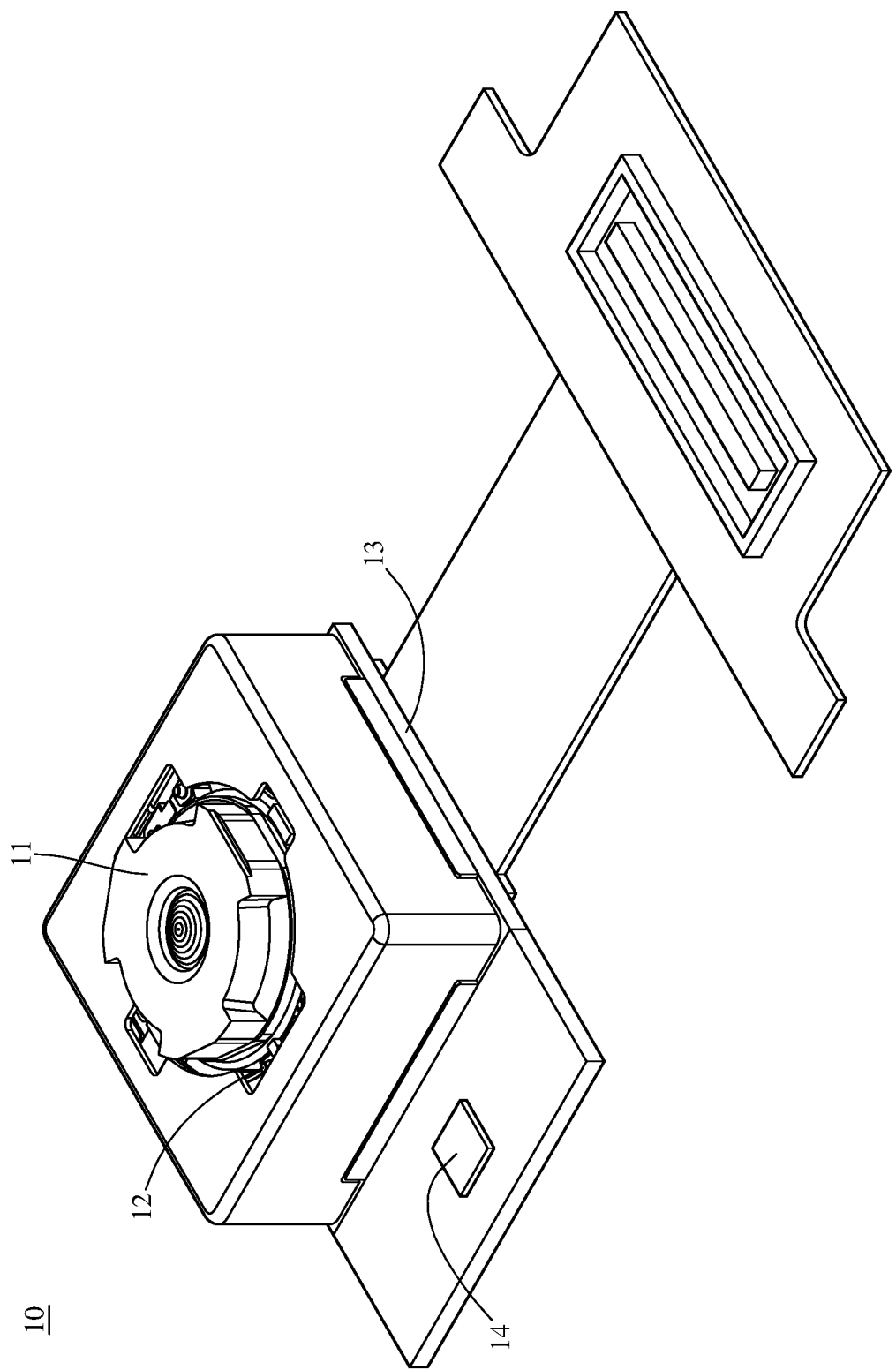
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing optical lens system disclosed in the 1st embodiment, a barrel and a holder member (their reference numerals are omitted) for holding the photographing optical lens system. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing optical lens system to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
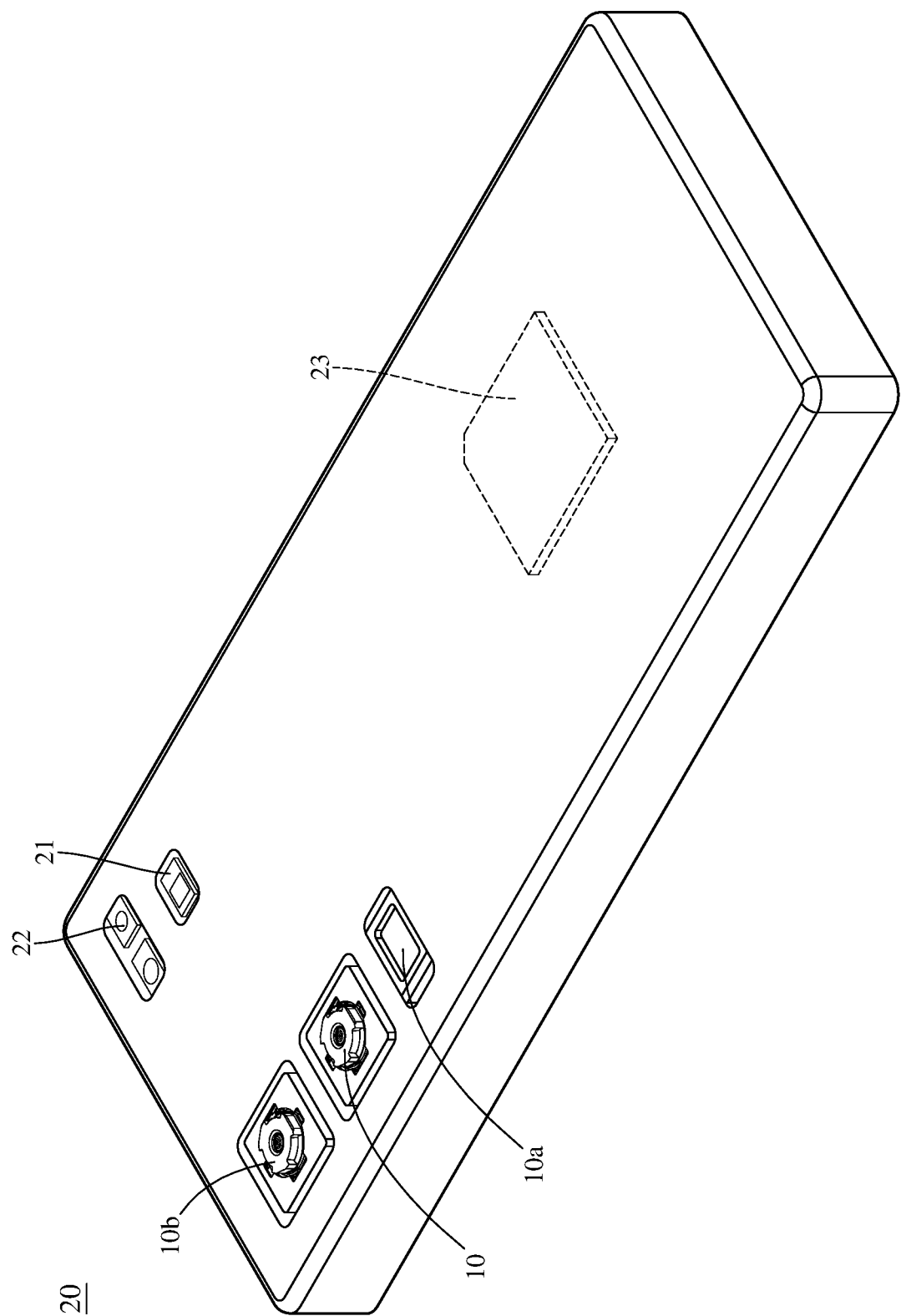
FIG. 22 is one perspective view of an electronic device according to the 12th embodiment of the present disclosure.
Figure 23:
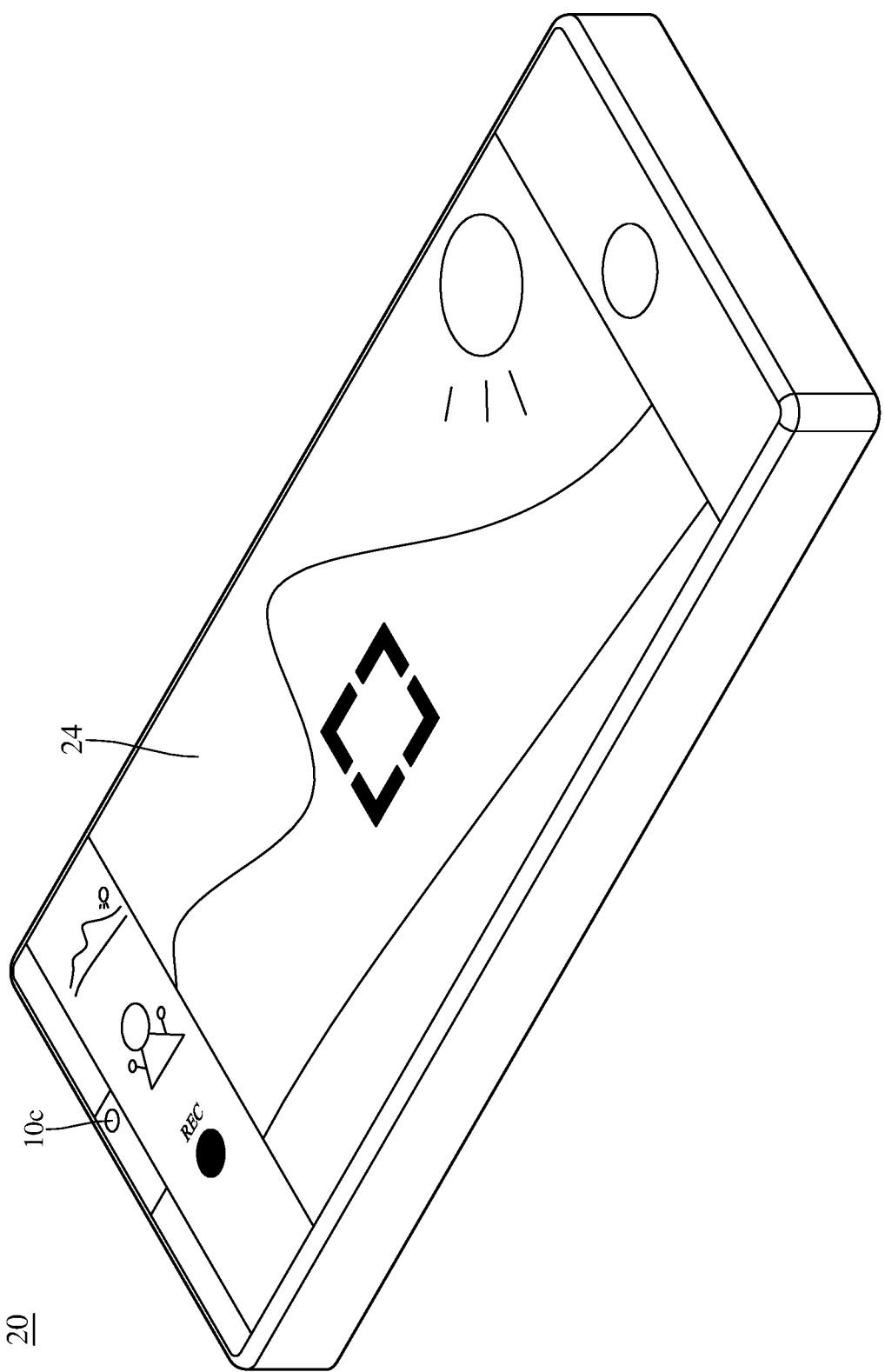
FIG. 23 is another perspective view of the electronic device in FIG. 22.
Figure 24:
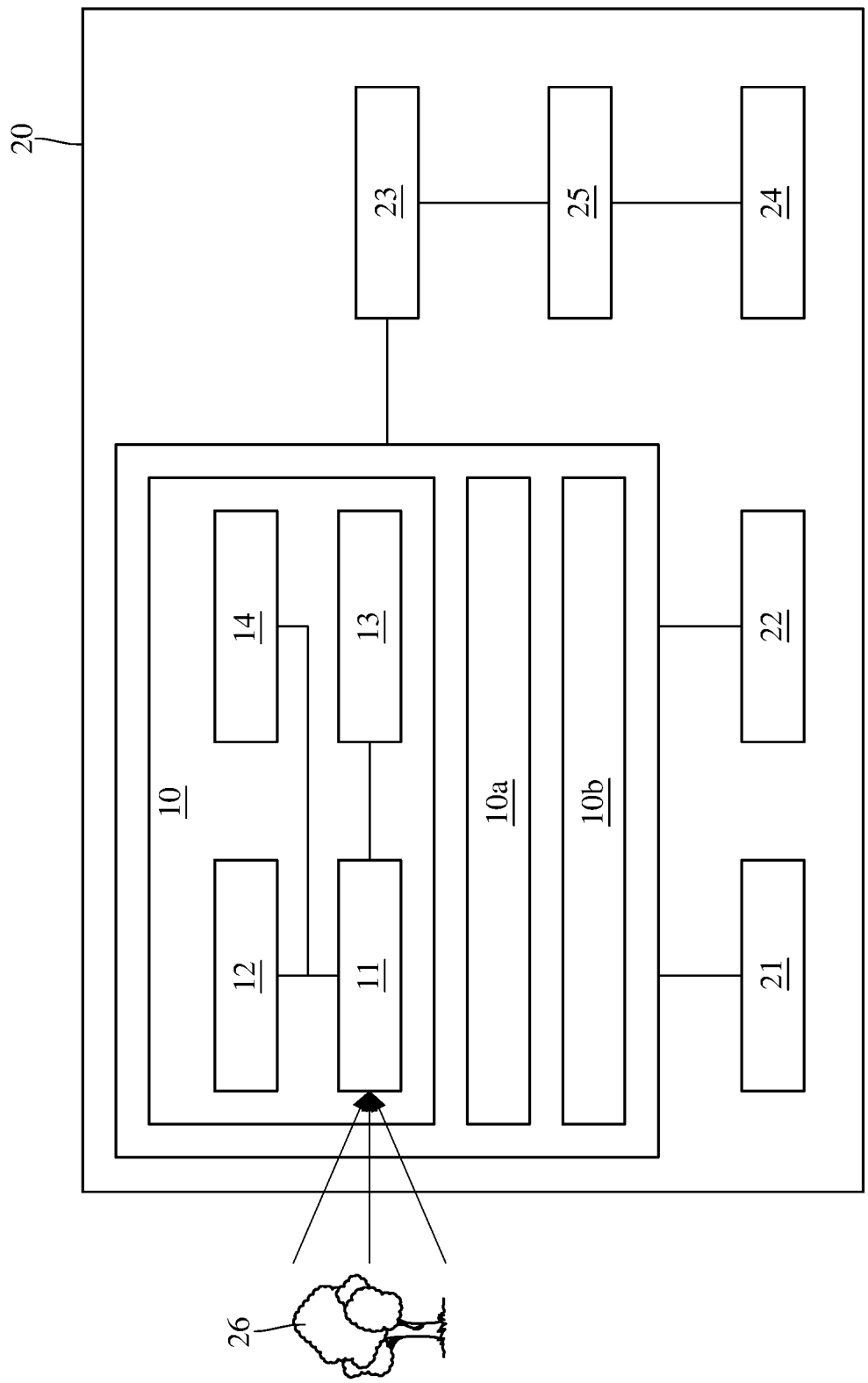
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22.

In this embodiment, an electronic device 20 is a smartphone including the image capturing unit 10 disclosed in the 11th embodiment, an image capturing unit 10a, an image capturing unit 10b, an image capturing unit 10c, a flash module 21, a focus assist module 22, an image signal processor 23, a user interface 24 and an image software processor 25. The image capturing unit 10c is located on the same side as the user interface 24, and the image capturing unit 10c is a front-facing camera of the electronic device 20 for taking selfies. The image capturing unit 10, the image capturing unit 10a and the image capturing unit 10b are located on the opposite side and all face the same direction. Furthermore, each of the image capturing unit 10a, the image capturing unit 10b and the image capturing unit 10c has a configuration similar to that of the image capturing unit 10. In detail, each of the image capturing unit 10a, the image capturing unit 10b and the image capturing unit 10c includes a lens unit, a driving device, an image sensor and an image stabilizer, and the lens unit includes a lens system assembly, a barrel and a holder member for holding the lens system assembly. In addition, the lens system assembly of the image capturing unit 10c is the photographing optical lens system disclosed in the 1st embodiment.

In this embodiment, the image capturing unit 10a is a telephoto image capturing unit, the image capturing unit 10b is an ultra-wide-angle image capturing unit and the image capturing unit 10 has a maximum field of view ranging between that of the image capturing unit 10a and that of the image capturing unit 10b. The image capturing units 10, 10a and 10b have different fields of view, such that the electronic device 20 has various magnification ratios so as to meet the requirement of optical zoom functionality. In this embodiment, the electronic device 20 includes multiple image capturing units 10, 10a, 10b and 10c, but the present disclosure is not limited to the number and arrangement of image capturing units.

When a user captures images of an object 26, the light rays converge in the image capturing unit 10, the image capturing unit 10a or the image capturing unit 10b to generate an image(s), and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. In addition, the electronic device 20 can capture images of the object 26 via the image capturing unit 10c. The user interface 24 can be a touch screen or a physical button. The user is able to interact with the user interface 24 and the image software processor 25 having multiple functions to capture images and complete image processing. The image processed by the image software processor 25 can be displayed on the user interface 24.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing optical lens system of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has negative refractive power, the image-side surface of the fifth lens element is concave in a paraxial region thereof, the sixth lens element has negative refractive power, and at least one lens surface of at least one lens element of the photographing optical lens system has at least one critical point in an off-axis region thereof;

wherein an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fifth lens element is CT5, a central thickness of the sixth lens element is CT6, an axial distance between the second lens element and the third lens element is T23, an axial distance between the fifth lens element and the sixth lens element is T56, half of a maximum field of view of the photographing optical lens system is HFOV, a distance in parallel with an optical axis between a maximum effective radius position of the object-side surface of the first lens element and a maximum effective radius position of the image-side surface of the first lens element is ET1, and the following conditions are satisfied:

30.0<$V2+V3+V4$<90.0;

1.00<$CT1/(CT2+T23+CT3)$;

30.0 [deg.]<$HFOV$;

$(CT5+CT6)/T56$<10.0;

3.5<$CT1/CT2$<10; and 1.10<$CT1/ET1$<1.80.

2. The photographing optical lens system of claim 1, wherein the following conditions are satisfied:

40.0<$V2+V3+V4$<85.0; and 1.10<$CT1/(CT2+T23+CT3)$<2.40.

3. The photographing optical lens system of claim 1, wherein the following conditions are satisfied:

35.0[deg.]<$HFOV$<45.0 [deg.]; and 0.60<$(CT5+CT6)/T56$<6.0.

4. The photographing optical lens system of claim 1, wherein an Abbe number of the first lens element is V1, an Abbe number of the sixth lens element is V6, an Abbe number of the i-th lens element is Vi, a refractive index of the first lens element is N1, a refractive index of the second lens element is N2, a refractive index of the third lens element is N3, a refractive index of the fourth lens element is N4, a refractive index of the fifth lens element is N5, a refractive index of the sixth lens element is N6, a refractive index of the i-th lens element is Ni, a minimum value of Vi/Ni is (Vi/Ni)min, a maximum effective radius of the object-side surface of the first lens element is Y11, a maximum effective radius of the image-side surface of the sixth lens element is Y62, and the following conditions are satisfied:

6.0<$(Vi/Ni)min$<12.0, wherein $i$=1,2,3,4,5 or 6; and 2.2<$Y62/Y11$<5.0.

5. The photographing optical lens system of claim 1, wherein a focal length of the photographing optical lens system is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, a focal length of the i-th lens element is fi, an f-number of the photographing optical lens system is Fno, and the following conditions are satisfied:

$\Sigma|f/fi|$<5.0, wherein $i$=1,2,3,4,5 and 6; and 1.70<$Fno$<2.50.

6. The photographing optical lens system of claim 1, wherein the object-side surface of the fifth lens element is convex in a paraxial region thereof, a curvature radius of the object-side surface of the fifth lens element is R9, a curvature radius of the image-side surface of the fifth lens element is R10, and the following condition is satisfied:

0.50<$R10/R9$<2.2;

wherein a vertical distance between a non-axial critical point on the object-side surface of the fifth lens element and the optical axis is Yc51, a vertical distance between a non-axial critical point on the image-side surface of the fifth lens element and the optical axis is Yc52, and the object-side surface and the image-side surface of the fifth lens element each have at least one critical point in an off-axis region thereof satisfying the following condition:

0.70<$Yc51/Yc52$<1.4.

7. A photographing optical lens system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the object-side surface of the first lens element is convex in a paraxial region thereof, the image-side surface of the first lens element is convex in a paraxial region thereof, the second lens element has negative refractive power, the sixth lens element has negative refractive power, the image-side surface of the sixth lens element is concave in a paraxial region thereof, and at least one lens surface of at least one lens element of the photographing optical lens system has at least one critical point in an off-axis region thereof;
wherein an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, half of a maximum field of view of the photographing optical lens system is HFOV, a focal length of the photographing optical lens system is f, a curvature radius of the object-side surface of the first lens element is R1, and the following conditions are satisfied:

30.0<$V2+V3+V4$<90.0;

1.00<$CT1/(CT2+T23+CT3)$;

30.0 [deg.]<$HFOV$;

$CT5/CT4$<1.80; and 1.0<$f/R1$<2.0;

wherein a vertical distance between a non-axial critical point on the image-side surface of the sixth lens element and an optical axis is Yc62, a maximum effective radius of the image-side surface of the sixth lens element is Y62, and the image-side surface of the sixth lens element has at least one critical point in an off-axis region thereof satisfying the following condition:

0.15<Yc62/Y62<0.65.

8. The photographing optical lens system of claim 7, wherein the following conditions are satisfied:

40.0<V2+V3+V4<85.0; and 35.0 [deg.]<HFOV<45.0 [deg.].

9. The photographing optical lens system of claim 7, wherein an axial distance between the object-side surface of the first lens element and the image-side surface of the sixth lens element is TD, and the following conditions are satisfied:

0.60<CT5/CT4<1.55; and 2.5<TD/CT1<5.0.

10. The photographing optical lens system of claim 7, wherein an entrance pupil diameter of the photographing optical lens system is EPD, and the following condition is satisfied:

1.4<EPD/CT1<2.5.

11. The photographing optical lens system of claim 7, wherein a maximum effective radius of the object-side surface of the first lens element is Y11, a distance in parallel with the optical axis between a maximum effective radius position of the object-side surface of the first lens element and a maximum effective radius position of the image-side surface of the first lens element is ET1, and the following condition is satisfied:

0.80<Y11/ET1<2.2.

12. A photographing optical lens system comprising six lens elements, the six lens elements being, in order from an object side to an image side, a first lens element, a second lens element, a third lens element, a fourth lens element, a fifth lens element and a sixth lens element, and each of the six lens elements having an object-side surface facing toward the object side and an image-side surface facing toward the image side;
wherein the first lens element has positive refractive power, the second lens element has negative refractive power, the sixth lens element has negative refractive power, and at least one lens surface of at least one lens element of the photographing optical lens system has at least one critical point in an off-axis region thereof;
wherein an Abbe number of the second lens element is V2, an Abbe number of the third lens element is V3, an Abbe number of the fourth lens element is V4, a central thickness of the first lens element is CT1, a central thickness of the second lens element is CT2, a central thickness of the third lens element is CT3, a central thickness of the fourth lens element is CT4, a central thickness of the fifth lens element is CT5, an axial distance between the second lens element and the third lens element is T23, half of a maximum field of view of the photographing optical lens system is HFOV, a distance in parallel with an optical axis between a maximum effective radius position of the object-side surface of the first lens element and a maximum effective radius position of the image-side surface of the first lens element is ET1, and the following conditions are satisfied:

30.0<V2+V3+V4<90.0;

1.00<CT1/(CT2+T23+CT3);

35.0 [deg.]<HFOV;

CT5/CT4<1.35;

3.5<CT1/CT2<10; and 1.10<CT1/ET1<1.80.

13. The photographing optical lens system of claim 12, wherein a minimum value among Abbe numbers of all lens elements of the photographing optical lens system is Vmin, a maximum value among refractive indices of all lens elements of the photographing optical lens system is Nmax, and the following conditions are satisfied:

40.0<V2+V3+V4<85.0;

10.0<Vmin<20.0; and 1.66<Nmax<1.75.

14. The photographing optical lens system of claim 12, wherein the following conditions are satisfied:

1.10<CT1/(CT2+T23+CT3)<2.00; and 1.5<CT1/(CT2+CT3)<5.0.

15. The photographing optical lens system of claim 12, wherein and the following conditions are satisfied:

0.75<CT5/CT4<1.25; and 1.8<CT1/CT5<3.2.

16. The photographing optical lens system of claim 12, wherein a curvature radius of the object-side surface of the first lens element is R1, a curvature radius of the image-side surface of the first lens element is R2, and the following condition is satisfied:

−0.75<(R1+R2)/(R1−R2)<0.

17. The photographing optical lens system of claim 12, wherein a sum of central thicknesses of all lens elements of the photographing optical lens system is ΣCT, a sum of axial distances between each of all adjacent lens elements of the photographing optical lens system is ΣAT, a distance in parallel with the optical axis between a maximum effective radius position of the object-side surface of the second lens element and a maximum effective radius position of the image-side surface of the second lens element is ET2, and the following conditions are satisfied:

1.50<ΣCT/ΣAT<3.50; and 1.2<ET1/ET2<6.0.

18. The photographing optical lens system of claim 12, wherein at least one lens surface of each of at least two lens elements of the photographing optical lens system has at least one inflection point, a maximum effective radius of the object-side surface of the first lens element is Y11, and the following condition is satisfied:

0.70<Y11/CT1<1.2.

19. The photographing optical lens system of claim 12, further comprising an aperture stop, wherein the aperture stop is disposed between the first lens element and an imaged object, an axial distance between the object-side surface of the first lens element and an image surface is TL, a focal length of the photographing optical lens system is f, a maximum image height of the photographing optical lens system is ImgH, and the following conditions are satisfied:

$1.05 < TL/f < 1.50$; and $1.0 < TL/ImgH < 1.6$.

20. The photographing optical lens system of claim 12, wherein the object-side surface of the third lens element is convex in a paraxial region thereof, the image-side surface of the third lens element is concave in a paraxial region thereof, the object-side surface of the fourth lens element is concave in a paraxial region thereof, the image-side surface of the fourth lens element is convex in a paraxial region thereof, a focal length of the photographing optical lens system is f, a focal length of the third lens element is f3, a focal length of the fourth lens element is f4, and the following condition is satisfied:

$|f/f3| + |f/f4| < 0.70$.

21. An image capturing unit, comprising:
the photographing optical lens system of claim 12; and
an image sensor disposed on an image surface of the photographing optical lens system.
22. An electronic device, comprising:
the image capturing unit of claim 21.

\* \* \* \* \*